(12) United States Patent
Yaakoby

(10) Patent No.: US 11,846,241 B2
(45) Date of Patent: Dec. 19, 2023

(54) SYSTEM AND METHOD FOR CONTROLLING ENGINE

(71) Applicant: Aquarius Engines Central Europe Sp. z o.o., Cracow (PL)

(72) Inventor: Shaul Haim Yaakoby, Alsdorf (DE)

(73) Assignee: AQUARIUS ENGINES CENTRAL EUROPE SP. Z O.O., Cracow (PL)

( * ) Notice: Subject to any disclaimer, the term of this patent is extended or adjusted under 35 U.S.C. 154(b) by 390 days.

(21) Appl. No.: 17/060,941

(22) Filed: Oct. 1, 2020

(65) Prior Publication Data

US 2021/0017919 A1  Jan. 21, 2021

Related U.S. Application Data

(62) Division of application No. 16/456,301, filed on Jun. 28, 2019, now Pat. No. 11,008,959.

(51) Int. Cl.
F02D 35/02 (2006.01)
F02B 71/04 (2006.01)
F02D 37/00 (2006.01)

(52) U.S. Cl.
CPC ............ F02D 35/02 (2013.01); F02B 71/04 (2013.01); F02D 37/00 (2013.01)

(58) Field of Classification Search
CPC ........ F02D 35/02; F02D 37/00; F02D 41/401; F02D 2400/04; F02D 41/009;
(Continued)

(56) References Cited

U.S. PATENT DOCUMENTS 1,040,472 A  10/1912 Wade
1,707,035 A   3/1929 Wurfe
(Continued)

FOREIGN PATENT DOCUMENTS

CN  101328856 A  12/2008
DE    3149930 A1   8/1982
(Continued)

OTHER PUBLICATIONS

International Search Report and Written Opinion for International Application No. PCT/IB2020/000742 dated Feb. 4, 2021, 19 pages.
(Continued)

*Primary Examiner* — Xiao En Mo
(74) *Attorney, Agent, or Firm* — ArentFox Schiff LLP

(57) ABSTRACT

A system may be used for determining a parameter relating to a piston in an engine. The parameter may be the piston position, speed, etc., which may be determined at a reference point in a cylinder. The system may be controlled based on the determined parameter. The engine may be a linear reciprocating engine, opposed piston engine, etc. The system may include a first sensor provided on a base connected to the engine, and a second sensor provided on the base. The first sensor may be configured to generate a signal in response to a component coupled to the piston being in a region of the first sensor. The second sensor may be configured to generate a signal in response to a component coupled to the piston interacting with the second sensor. The system may include an energy transformer configured to transform motion of the engine to electrical power.

24 Claims, 41 Drawing Sheets

(58) Field of Classification Search
CPC ........ F02D 29/06; F02B 71/04; F02B 63/041; F02B 71/00; F02B 75/002; F01B 9/047; F02P 7/07; F02P 5/1502; F02N 11/006; F02N 11/04

See application file for complete search history.

(56) References Cited

U.S. PATENT DOCUMENTS

| | | | |
|---|---|---|---|
| 1,720,504 | A | 7/1929 | Williams |
| 1,755,673 | A | 4/1930 | Solenberger |
| 1,764,815 | A | 6/1930 | Williams |
| 1,796,882 | A | 3/1931 | Bowers |
| 2,028,331 | A | 1/1936 | Janicke |
| 2,187,979 | A | 1/1940 | Malpas |
| 2,392,052 | A | 1/1946 | Matheisel |
| 2,399,683 | A | 5/1946 | Loeb |
| 2,407,790 | A | 9/1946 | Le Tourneau |
| 2,831,738 | A | 4/1958 | Marien |
| 2,874,012 | A | 2/1959 | Stern |
| 3,146,940 | A | 9/1964 | McCrory et al. |
| 3,358,656 | A | 12/1967 | Panhard |
| 3,365,879 | A | 1/1968 | Panhard |
| 3,369,733 | A | 2/1968 | Campbell |
| 3,465,161 | A | 9/1969 | Cutkosky |
| 3,610,217 | A | 10/1971 | Braun |
| 3,791,227 | A | 2/1974 | Cherry |
| 3,797,466 | A | 3/1974 | Nambu |
| 3,914,574 | A | 10/1975 | Hill et al. |
| 4,156,410 | A | 5/1979 | Ramsey |
| 4,385,597 | A | 5/1983 | Stelzer |
| 4,414,927 | A | 11/1983 | Simon |
| 4,489,554 | A | 12/1984 | Otters |
| 4,653,274 | A | 3/1987 | David |
| 4,658,768 | A | 4/1987 | Carson |
| 4,803,960 | A | 2/1989 | Köppen |
| 4,831,972 | A | 5/1989 | Barnwell |
| 4,854,218 | A | 8/1989 | Stoll |
| 4,876,991 | A | 10/1989 | Galitello et al. |
| 5,123,245 | A | 6/1992 | Vilenius et al. |
| 5,158,046 | A | 10/1992 | Rucker |
| 5,285,752 | A | 2/1994 | Reed et al. |
| 5,351,659 | A | 10/1994 | Chao |
| 5,676,097 | A | 10/1997 | Montresor |
| 5,710,514 | A | 1/1998 | Crayton et al. |
| 5,816,202 | A | 10/1998 | Montresor |
| 6,035,637 | A | 3/2000 | Beale et al. |
| 6,065,438 | A | 5/2000 | Kiesel |
| 6,164,250 | A | 12/2000 | Bailey et al. |
| 6,170,442 | B1 | 1/2001 | Beale |
| 6,199,519 | B1 | 3/2001 | Van Blarigan |
| 6,240,828 | B1 | 6/2001 | Fujimoto |
| 6,298,941 | B1 | 10/2001 | Spadafora et al. |
| 6,467,397 | B1 | 10/2002 | Fuchs et al. |
| 6,722,322 | B2 | 4/2004 | Tse |
| 6,854,429 | B2 | 2/2005 | Gelfand |
| 6,948,459 | B1 | 9/2005 | Laumen et al. |
| 6,989,669 | B2 * | 1/2006 | Low ...................... F16F 9/3292 324/213 |
| 7,032,548 | B2 | 4/2006 | Tusinean |
| 7,194,989 | B2 | 3/2007 | Hallenbeck |
| 7,207,299 | B2 | 4/2007 | Hofbauer |
| 7,318,506 | B1 | 1/2008 | Meic |
| 7,412,949 | B1 | 8/2008 | Cillessen et al. |
| 9,010,287 | B2 | 4/2015 | Morreim |
| 9,206,900 | B2 | 12/2015 | Smith et al. |
| 2002/0189433 | A1 | 12/2002 | Unger et al. |
| 2004/0222788 | A1 | 11/2004 | Low et al. |
| 2004/0244765 | A1 | 12/2004 | Elmer |
| 2005/0284426 | A1 | 12/2005 | Tusinean |
| 2006/0157003 | A1 | 7/2006 | Lemke et al. |
| 2006/0232268 | A1 | 10/2006 | Arms |
| 2007/0017684 | A1 | 1/2007 | Stirm et al. |
| 2008/0251050 | A1 | 10/2008 | Jacobsen et al. |
| 2009/0114391 | A1 | 5/2009 | Smith et al. |
| 2011/0073419 | A1 | 3/2011 | Matsuza et al. |
| 2011/0239642 | A1 | 10/2011 | Schwiesow et al. |
| 2012/0160190 | A1 | 6/2012 | Klopzig |
| 2012/0192438 | A1 | 8/2012 | Aoki et al. |
| 2012/0266842 | A1 | 10/2012 | Cockerill |
| 2012/0280513 | A1 | 11/2012 | Cockerill |
| 2013/0276740 | A1 | 10/2013 | Wandrie et al. |
| 2013/0298874 | A1 | 11/2013 | Sun et al. |
| 2014/0116389 | A1 | 5/2014 | Khurgin |
| 2015/0114352 | A1 | 4/2015 | McAlister et al. |
| 2016/0208686 | A1 | 7/2016 | Gadda et al. |
| 2019/0153936 | A1 | 5/2019 | Johnson |
| 2020/0408159 | A1 * | 12/2020 | Yaakoby ............... F02D 41/009 |

FOREIGN PATENT DOCUMENTS

| | | |
|---|---|---|
| DE | 3347859 A1 | 6/1985 |
| DE | 3518982 A1 | 11/1986 |
| DE | 4136331 A1 | 5/1992 |
| DE | 4447040 C1 | 5/1996 |
| DE | 19625182 A1 | 1/1998 |
| DE | 20 2006018097 U1 | 6/2008 |
| DE | 102008004879 A1 | 7/2009 |
| FR | 1 437 474 A | 5/1996 |
| GB | 337248 | 10/1930 |
| GB | 602310 A | 5/1948 |
| GB | 2183726 A | 6/1987 |
| GB | 2232718 A | 12/1990 |
| GB | 2353562 A | 2/2001 |
| GB | 2518238 A | 3/2015 |
| JP | S62-38833 A | 2/1987 |
| JP | 63-192916 | 10/1988 |
| RU | 2 500 905 C1 | 12/2013 |
| WO | WO 93/06349 A1 | 4/1993 |
| WO | WO 2015/155912 A1 | 10/2015 |

OTHER PUBLICATIONS

International Search Report and Written Opinion for International Application No. PCT/IB2020/058067 dated Feb. 4, 2021, 19 pages.
Jan Ridders, "Dual 2stroke model engine," available at URL: https://www.youtube.com/watch?v=gLwHEUJ752s, uploaded May 22, 2013.
Extended European search report in Application No. 16823945.7-1004 / 3322884 PCT/IB2016001189 dated Jan. 24, 2019.
European examination report in Application No. 15782938.3-1004 dated Oct. 24, 2019.

* cited by examiner

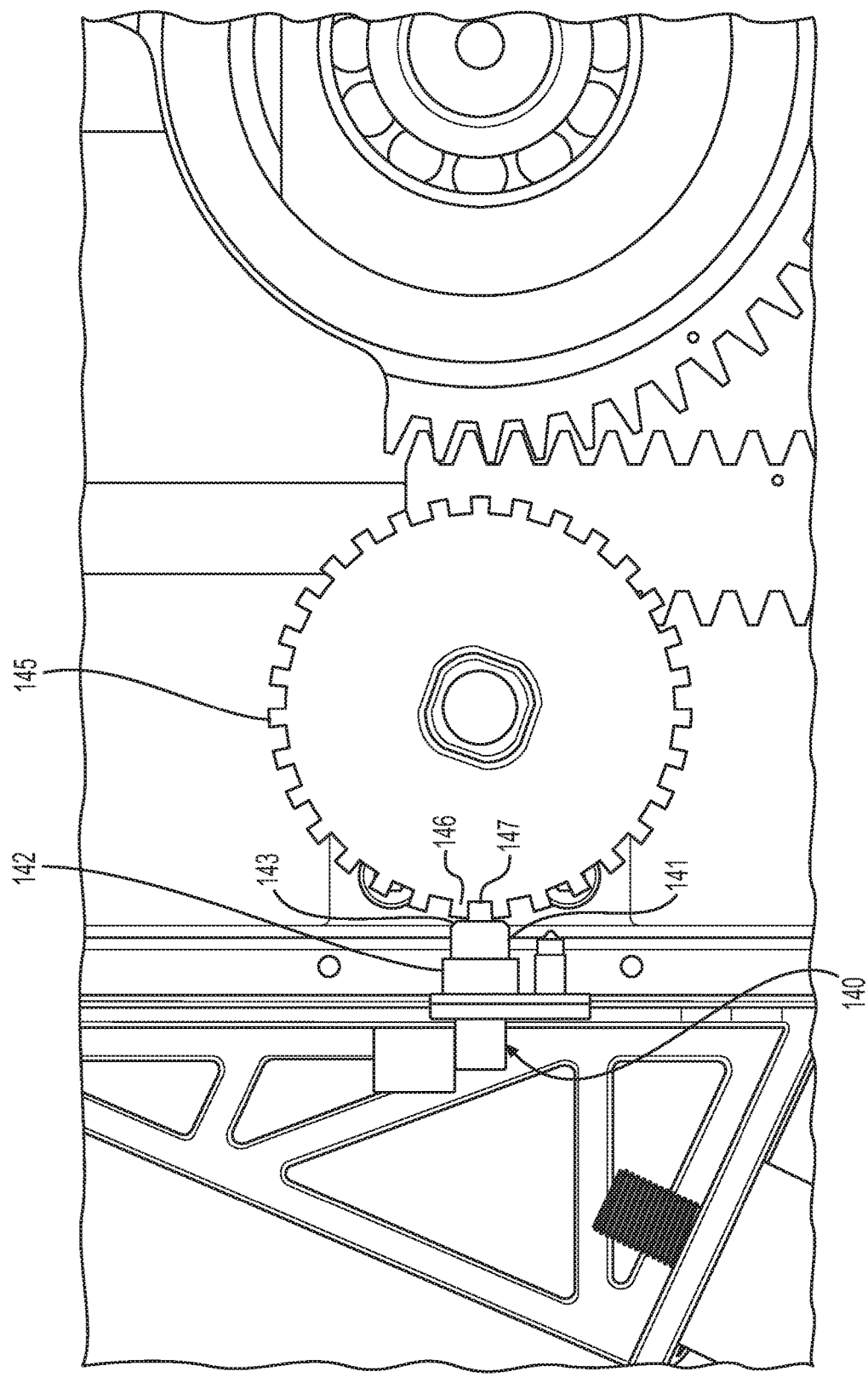

|  | FIRST MODE |
|---|---|
| INJECTION | ✗ |
| IGNITION | ✗ |
| ENERGY TRANSFORMER | ENERGY SUPPLY |

*FIG. 9*

|  | FIRST SENSOR | ACTION | FIRST MODE | | | |
|---|---|---|---|---|---|---|
|  |  |  | INJECTION | SECOND SENSOR | IGNITION | ENERGY TRANSFORMER |
| A-POSITION | 0 | MOVE FROM 0 TO 1 + (X) | 0 | (X) | 0 | 1 |
| B-POSITION | 1 | MOVE FROM 1 TO 0 + (X) | 0 | (X) | 0 | 1 |

*FIG. 10C*

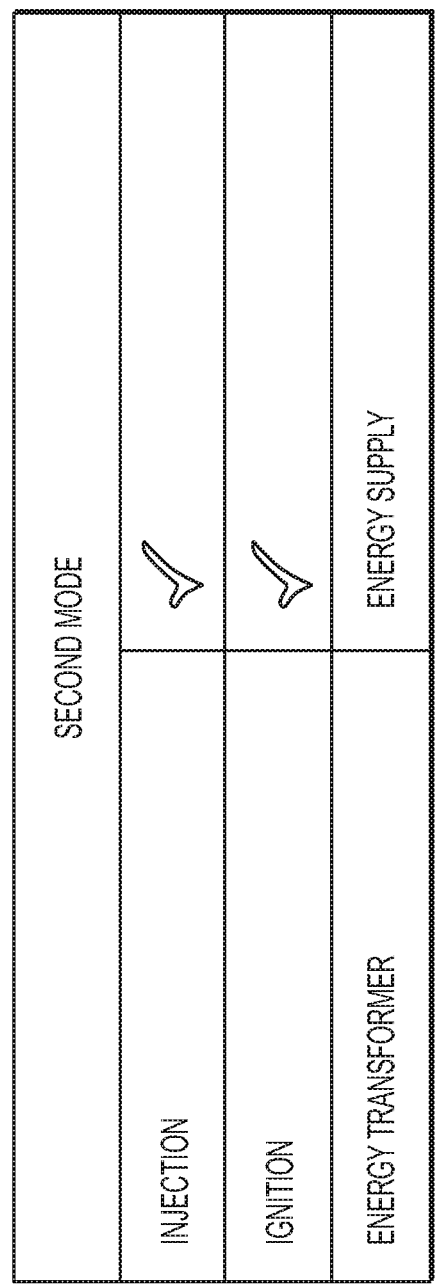

|  | FIRST SENSOR | ACTION | SECOND MODE | | | |
|---|---|---|---|---|---|---|
|  |  |  | INJECTION | SECOND SENSOR | IGNITION | ENERGY TRANSFORMER |
| A-POSITION | 1 | MOVE FROM 1 TO 0 | 1 (FIRST CHAMBER) | (Y) | 1 (FIRST CHAMBER) | 1 |
| B-POSITION | 0 | MOVE FROM 0 TO 1 | 1 (SECOND CHAMBER) | (Y) | 1 (SECOND CHAMBER) | 1 |

*FIG. 12E*

| THIRD MODE | | | |
|---|---|---|---|
| INJECTION | ↷ | | |
| IGNITION | | ↷ | |
| ENERGY TRANSFORMER | | | GENERATOR |

FIG. 13

| | | THIRD MODE | | | | |
|---|---|---|---|---|---|---|
| | FIRST SENSOR | ACTION | INJECTION | SECOND SENSOR | IGNITION | ENERGY TRANSFORMER |
| A-POSITION | 1 | MOVE FROM 1 TO 0 | 1 (FIRST CHAMBER) | (Y) | 1 (FIRST CHAMBER) | 2 |
| B-POSITION | 0 | MOVE FROM 0 TO 1 | 1 (SECOND CHAMBER) | (Y) | 1 (SECOND CHAMBER) | 2 |

*FIG. 14E*

SYSTEM AND METHOD FOR CONTROLLING ENGINE

This application is a division of application Ser. No. 16/456,301, filed Jun. 28, 2019 which is incorporated herein by reference.

TECHNICAL FIELD

The present disclosure relates to the field of internal combustion engines, and may more particularly relate to the field of internal combustion engines having a free piston reciprocating in a linear path.

BACKGROUND

Internal combustion engines are known. Some engine configurations include single or multi-cylinder piston engines, opposed-piston engines, and rotary engines, for example. The most common types of piston engines are two-stroke engines and four-stroke engines. These types of engines include a relatively large number of parts, and require numerous auxiliary systems, e.g., lubrication systems, cooling systems, intake and exhaust valve control systems, and the like, for proper functioning.

An engine may be controlled based on an operational state of the engine, such as how far along the engine is in a stroke. Controlling the engine may include positioning a piston or other components in a system including the engine. An engine may be provided with sensors configured to determine various parameters relating to the operational state. Information derived from sensors may be used to identify an operational state and then control the engine. For example, ignition in a cylinder of the engine may be triggered when it is determined that a piston is at a particular position. Other operations may also be performed, such as adjusting operational parameters of auxiliary systems, in response to sensor output.

A free piston engine may be useful as a power generation source because it is not constrained by a crankshaft and may simplify some aspects of design. A free piston engine may also allow for enhanced flexibility in ignition timing and may be well-suited for generating electric power by way of coupling to an energy transformation device.

However, because a free piston engine is not constrained by a crankshaft, the position of a piston within a cylinder at a given time may be difficult to determine. For example, a free piston engine may lack a crank angle sensor. Proper ignition timing may be difficult to determine because the position of the piston is unknown, and thus, a stage of intake, compression, combustion, or exhaust may not be precisely known. A sensor configured to determine a position of the piston by way of, for example, optically observing the location of a piston rod connected to the piston may face limitations due to complexity, high cost, and packaging constraints. Furthermore, a sensor configured to determine a position of an object using magnetism may require a strong magnet to generate a large magnetic field, and its accuracy may be impeded by the influence of external magnetic or electric fields. Optical or magnetic encoders for determining parameters of a moving system may be known, however, such encoders have drawbacks, such as those noted above when applied to an engine.

Furthermore, under some circumstances, energy of the oscillating mass of an engine may be wasted as the piston changes direction. For example, in a free piston engine, combustion may occur in a cylinder before the piston is able to expend all of its kinetic energy traveling in one direction during a stroke. It would be advantageous to capture all of the kinetic energy of a moving piston before it changes direction. Various improvements in systems and methods for controlling an engine are desired.

SUMMARY

Some embodiments may relate to an internal combustion engine, such as a linear reciprocating engine or an opposed piston engine. A system for determining a position of a piston in an engine may include a sensor configured to determine whether the piston is in a first region of a cylinder or a second region of the cylinder, a sensor configured to determine a distance traveled by the piston based on a number of increments detected, and a controller configured to determine the position of the piston in the engine based on sensor output upon the piston reaching a reference point in the cylinder. The system may determine the position of the reference point. The reference point may be the midpoint of the cylinder, or another location that may be determined in real-time.

In some embodiments, a method may be provided for controlling an engine, such as a linear reciprocating engine or an opposed piston engine. The method may include determining, by a first sensor, whether a piston of the linear reciprocating engine is in a first half of a cylinder or a second half of the cylinder, determining a distance traveled by the piston based on a number of increments detected by a second sensor, and determining a speed of the piston based on a number of increments detected in a time period. Controlling the engine may include moving the piston to a particular location in the cylinder.

Exemplary advantages and effects of the present invention will become apparent from the following description taken in conjunction with the accompanying drawings wherein certain embodiments are set forth by way of illustration and example. The examples described herein are just a few exemplary aspects of the disclosure. It is to be understood that both the foregoing general description and the following detailed description are exemplary and explanatory only and are not restrictive of the invention.

BRIEF DESCRIPTION OF THE DRAWINGS

FIG. 7A and FIG. 7B are detailed views of a base of the power generation system of FIG. 1, according to embodiments of the present disclosure;

FIG. 9 is a chart representing running conditions of a power generation system in a first operational mode, according to embodiments of the present disclosure;

FIG. 10C is a table representing operational aspects of a power generation system in a first operational mode, according to embodiments of the present disclosure;

FIG. 11 is a chart representing running conditions of a power generation system in a second operational mode, according to embodiments of the present disclosure;

FIG. 12E is a table representing operational aspects of a power generation system in a second operational mode, according to embodiments of the present disclosure;

FIG. 13 is a chart representing running conditions of a power generation system in a third operational mode, according to embodiments of the present disclosure;

FIG. 14E is a table representing operational aspects of a power generation system in a third operational mode, according to embodiments of the present disclosure;

DETAILED DESCRIPTION

Figure 1:
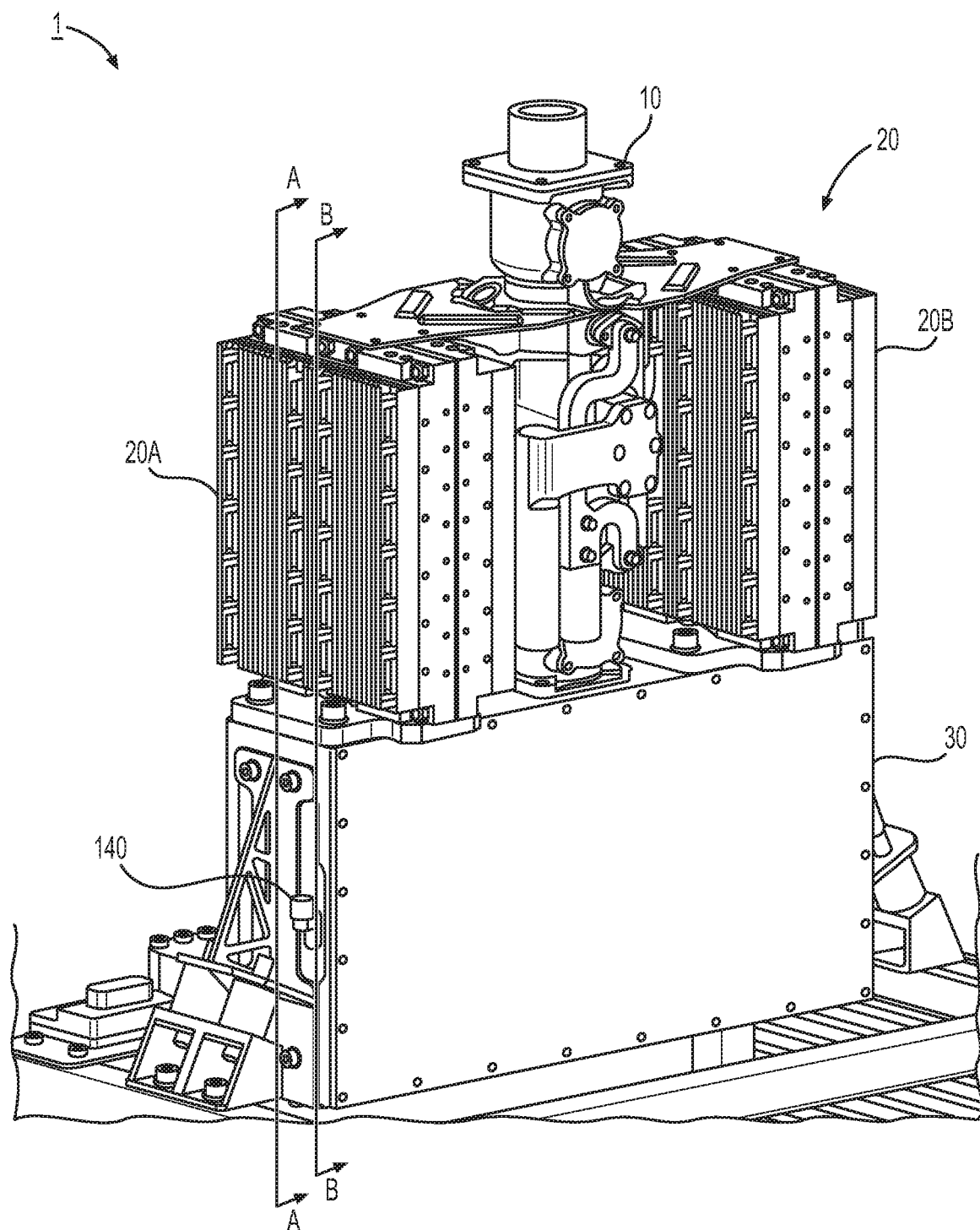
FIG. 1 is a perspective view of a power generation system, according to embodiments of the present disclosure.

Reference will now be made in detail to exemplary embodiments, examples of which are illustrated in the accompanying drawings. The following descriptions refer to the accompanying drawings in which the same numbers in different drawings may represent the same or similar elements unless otherwise represented. The implementations set forth in the following description of exemplary embodiments do not represent all implementations consistent with the invention. Instead, they are merely examples of systems, apparatuses, and methods consistent with aspects related to the invention as may be recited in the claims. Relative dimensions of elements in drawings may be exaggerated for clarity.

Running of an engine may involve various operations, such as drawing in air, adding fuel, combusting an air/fuel mixture, and exhausting burned combustion products. Engine performance may be adjusted by controlling operational parameters, such as when to inject fuel, when to trigger ignition, etc. As a prerequisite to controlling some operations of an engine, it may be beneficial to ascertain a state of the engine. For example, an optimal point of triggering ignition may be related to the position of a piston in the engine. An optimal amount of fuel to inject into a combustion chamber may be related to the speed of the piston measured at a certain point. Various operations may be dependent on a state of the engine, which may relate to piston position, speed, or other parameters, and thus ascertaining the location of the piston at any given time may be useful for controlling the engine.

An engine may have a reciprocating mass that is connected to an energy transformer to convert motion from the engine into useful work. The energy transformer may include any device configured to convert energy generated by the engine into work. The energy transformer may include a generator. The energy transformer may include a compressor. A generator may be configured to convert power of mechanical motion of the reciprocating mass into electrical power, such as current output at a particular voltage. A generator may be configured to power an air pump. In one configuration, a piston may be connected to an actuator at one end via a piston rod. Electric power may be generated from the back-and-forth movement of the piston and piston rod. The generator may be configured to extract energy by resisting the back-and-forth movement of the piston and transform it into electrical energy.

Sensors may be provided to monitor various aspects of the engine or generator. Sensors may detect the physical status of components, such as their position relative to other components. Because a piston in an engine may be enclosed in a cylinder, there may be a concern that the position of the piston in the cylinder cannot be determined with precision in real time. Determining desired operation parameters of the engine may be dependent on piston position. Sensors may be provided to help determine the piston position. Based on sensor output, the engine may be controlled, for example, by moving the piston to a particular location in the cylinder.

A controller may be provided that may collect and analyze data, such as sensor output. The controller may be used to control the operation of the engine. The controller may also control operation of a generator connected to the engine. The controller may be configured to operate the engine or generator in an operation mode, which may be one of a plurality of different operation modes. For example, the controller may include an electronic control unit and may be programmed to implement a control routine for starting the engine (e.g., a "starter" mode).

Operation modes may include the following exemplary modes. A first mode may involve identification. The first mode may identify the location of a piston in a system including an engine and generator. The first mode may be useful to determine piston position, piston speed, or other parameters based on sensor output. The first mode may be running at all times in an engine system while the system is on and may be used as the basis for other modes of operation. For example, as will be discussed below, a second mode may be based on information gathered from the first mode.

The first mode may also involve positioning. The first mode may use the generator as a power supply and may cause the piston to move to be positioned at a desired location in a cylinder. Positioning the piston may be helpful to more precisely determine the location of the piston. For example, the piston may be caused to travel in a direction toward an opposite side of the cylinder. Upon crossing a certain point, such as the midpoint of the cylinder, the piston may be caused to further travel by a predetermined distance. After this stage, it may become known where the piston is relative to the midpoint of the cylinder.

A second mode may involve starting the engine. The generator may be used as a power supply and may cause the piston to begin a compression stroke. The generator may move the piston toward an opposite side of the cylinder. Upon reaching a certain point, such as the midpoint of the cylinder, fuel may be injected into a combustion chamber of the cylinder. Air may also be supplied to the combustion chamber. The generator may move the piston so as to cause compression in the combustion chamber. Upon reaching a stroke end point, such as a position determined to be the maximum compression point achievable by the generator, ignition may be triggered. For example, a spark may be triggered by the controller. Upon ignition in the combustion chamber, the piston may be caused to travel in the opposite direction in the cylinder. The second mode may be used repeatedly, with the piston moving faster with each repetition. The piston may be caused to move a further distance with each stroke, and may allow greater compression in the cylinder. In the second mode, the generator may be turned off immediately upon ignition so that it will not work against the motion caused by combustion in the cylinder. In some cases, the generator may be turned off so that motion of the piston in further strokes is caused only by combustion.

A third mode may involve running the generator so as to resist mechanical motion of the engine. The generator may skim off power via the motion of the piston. The third mode may be performed in increments. For example, the generator may be configured to resist the motion of the piston with a set resistance. If the piston continues to increase in speed or acceleration, the generator may increment the resistance. If the piston starts to slow down, the generator may decrement the resistance. Incrementing/decrementing may occur on a stroke-by-stoke basis, or with other levels of granularity. A feedback loop may be provided to adjust resistance depending on piston speed, acceleration, or other parameters. Parameters may be determined from the sensors, such as those discussed above with respect to the first mode. The parameters may include quantities related to energy of the oscillating mass.

In the third mode, adjustments to operational parameters of the engine may also be used. For example, if the piston starts to slow down, additional fuel may be injected. In some embodiments, an amount of compression may be modified.

The first to third modes may be mixed or varied. Variations of the first to third modes may include an assist mode, variable-resistance running mode, or spontaneous combustion mode. For example, in assist mode, if it is determined that the piston lacks sufficient energy to reach a point of optimal compression (e.g., the piston has less than a predetermined amount of momentum upon crossing the cylinder midpoint), a spark timing may be advanced so that the engine continues running without encountering misfire or some other abnormal operation. The spark timing may be adjusted to correspond to a piston position where it is determined that the piston will reach zero speed, regardless of whether such a point is optimal for power extraction.

In spontaneous combustion mode, homogeneous charge compression ignition (HCCI), or the like, may be used. Spontaneous combustion mode may allow the piston to cause combustion on its own, while ignition may be set to be triggered only as a back-up. Entering spontaneous combustion mode may be reliant on input from other sensors, e.g., a temperature sensor. For example, entering spontaneous combustion mode may be prohibited in a cold start situation.

Spontaneous combustion mode may be useful because a free piston engine may be well-suited for adapting combustion points in a cylinder. An optimal combustion point may vary from stroke to stroke depending on, for example, piston energy, injected fuel amount, air intake amount and air quality, and so on. Furthermore, providing an engine with a variable combustion point may be useful to enable usage of the engine with various kinds of fuels and without requiring expensive sensors.

Some of the modes may be used together. For example, variable resistance running may be used together with assist mode. Priority may be given to smooth engine running over electrical power generation. Some modes may use the energy transformer as a starter or as a generator. For example, in one mode, the energy transformer may be configured to adjust resistance in accordance with piston speed, may turn the resistance off, or may change the resistance to an assistive force. The modes mentioned above and other modes will be discussed in further detail below.

A power generation system including sensors arranged to monitor conditions of an engine may be enabled by providing relatively simple sensors interacting with an actuator attached to an engine and may allow for economic construction. Furthermore, high bandwidth may be achieved. Sensor output may be based on basic signals, and sensors may be configured with, for example, a single-bit channel output. A sensor may be configured to detect whether a piston is in a north or south region of a cylinder. A sensor may be configured to set a flag in response to an event. An event may correspond to a component being within a sensing range of a sensor. The flag may be a numerical output value. A sensor may output, for example, 1 when the piston is in a first side of the cylinder (e.g., north side), and otherwise 0. The output value of 0 may correspond to when the piston is in a second side of the cylinder (e.g., south side). The output value of 1 may correspond to a situation where a component is in a proximity of a sensor. The output value of 0 may correspond to a situation where the component is spaced apart from the sensor. An event may also correspond to a component passing by a sensor. For example, a sensor may output 1 when it is determined that a tooth of a wheel, such as a trigger disk, passes by the sensor. A sensor may be connected to a counting circuit that increments a counter upon detection of events. A circuit may count the number of teeth of a trigger disk. A distance that the piston has traveled may be determined based on a number of counted teeth. A piston speed may be determined based on a number of counted teeth over an interval.

High precision may be achieved because sensors may measure components that are directly mechanically coupled to an engine. For example, a rack may be attached to a piston rod that moves with a piston in the engine, and the rack may interact with gears and other components, including a trigger disk. A first sensor may determine a north/south position of a piston by detecting whether the rack overlaps with the first sensor. A second sensor may determine a distance the piston has moved by detecting a number of teeth of the trigger disk, which may correspond to a predetermined distance. A power generation system may be achieved with high reliability and durability. The system may be robust, compact, economical, and resistant to heat and contamination.

The present disclosure relates to internal combustion engines. While the present disclosure provides examples of free piston engines, it should be noted that aspects of the disclosure, in their broadest sense, are not limited to free piston engines. Rather, it is contemplated that the principles discussed herein may be applied to other internal combustion engines, or other power generation systems, as well. For example, a power system may be used with an opposed piston arrangement. A power system may also be used with a single sided piston arrangement.

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

An internal combustion engine in accordance with the present disclosure may include an engine block. The term "engine block," also used synonymously with the term "cylinder block," may include an integrated structure that includes at least one cylinder housing a piston. In the case of a free piston engine block, the engine block may include a single cylinder. The cylinder may be double-sided in that there may be two combustion chambers, one on either side of the piston. In some embodiments, the engine block may include multiple cylinders. In some embodiments, two opposed combustion chambers may be provided with a common mover provided between them, for example.

According to the present disclosure, a cylinder may define at least one combustion chamber in the engine block. In some internal combustion engines according to the present disclosure, a combustion chamber may be located on a single side of a cylinder within an engine block. In some internal combustion engines according to the present disclosure, the internal combustion engine may include two combustion chambers, one on each side of a cylinder within an engine block.

Embodiments of the present disclosure may further include a piston in the cylinder. According to some embodiments of the disclosure used in a free piston engine, the piston may include two faces on opposite sides. In some embodiments, the piston may be considered to be "slidably mounted" in the cylinder. This refers to the fact that the piston may slide through a plurality of positions in the cylinder from one side of the cylinder to the other. While the present disclosure describes some piston examples, the invention, in its broadest sense, is not limited to a particular piston configuration or construction.

FIG. 1 illustrates a power system 1. Power system 1 may include an engine 10, an energy transformer 20, and a base 30. Engine 10 may be a free piston engine that includes an oscillating mass configured to reciprocate in a linear direction. Engine 10 may be coupled to base 30. Base 30 may include an actuator that is configured to input the mechanical motion generated by engine 10 into energy transformer 20, or vice versa. Energy transformer 20 may include an electric generator, and may be connected to an energy storage device, such as a battery. Energy transformer 20 may include a first bank 20A and a second bank 20B. The first and second banks 20A, 20B may be arranged to the sides of engine 10 and may each include an electric generator. Each of the first and second banks 20A, 20B may include cooling fins that may be used for heat dissipation.

Figure 2:
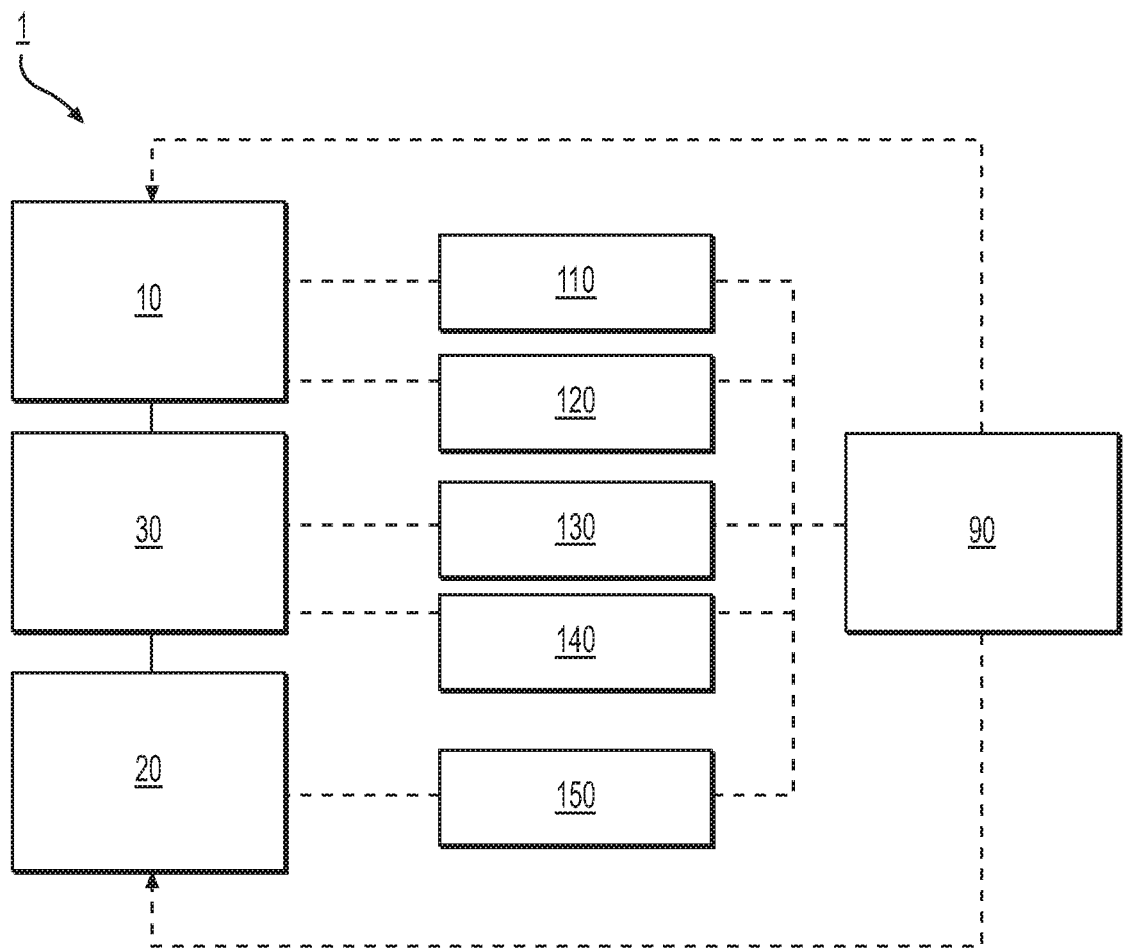
FIG. 2 is a schematic view of a power generation system, according to embodiments of the present disclosure.

FIG. 2 is a schematic representation of power system 1. Power system 1 may include a controller 90. Although not shown in FIG. 1, it is appreciated that controller 90 may be part of the structure of power system 1 that forms engine 10, energy transformer 20, and base 30. In FIG. 2, as indicated by solid lines, engine 10, base 30, and energy transformer 20 may be connected by way of being mechanically coupled to one another. As indicated by dashed lines, electrical connections may be provided to other components. Power system 1 may include sensors. For example, FIG. 2 shows a plurality of sensors including sensor 110, sensor 120, sensor 130, sensor 140, and sensor 150.

Controller 90 may include a computer, electronic control unit (ECU), or the like. For example, controller 90 may include an ECU configured as a microprocessor based on a CPU and may include a ROM for storing a processing program, a RAM in which data may be temporarily stored, and communication ports, such as input and output ports. Controller 90 may include separate ECUs, each of which may be provided as a dedicated control unit for various system components. For example, an engine ECU may be provided separately from an electric power management ECU. In some embodiments, controller 90 may be a single ECU that combines functions of controlling various system components. Controller 90 may receive input from components, such as sensors 110 through 150, for example by input ports. Controller 90 may output instructions to components, such as engine 10 or energy transformer 20. Controller 90 may issue instructions to a spark plug to cause a spark to be generated in engine 10. Controller 90 may adjust air intake. For example, controller 90 may control a throttle opening degree.

Sensor 110 may include a temperature sensor that may be configured to determine a temperature of engine 10. Sensor 120 may be connected to a coolant system of engine 10, for example. Sensor 110 may determine the temperature of coolant flowing in a cooling jacket around a cylinder of engine 10. Coolant may flow through fluid port 5, for example (see FIG. 3). Sensor 120 may include a flow sensor, such as a manifold absolute pressure (MAP) sensor, or a mass air flow (MAF) sensor, or the like. Sensor 110 may determine an amount of gas flowing into engine 10. Sensor 110 may be connected to an air intake system of engine 10, which may be connected to, for example, an inlet chamber 32.

Sensor 130 may include a first position sensor. Sensor 140 may include a second position sensor. The first and second position sensors may be arranged on base 30 and may be configured to determine a position of a component coupled to engine 10. Sensor 130 and sensor 140 may be used to derive position information of engine components directly or indirectly. Sensor 130 and sensor 140 may be configured to determine position information with different granularity. For example, sensor 130 may be configured to determine a position of a piston in engine 10 as one of a first region or a second region of a cylinder. The first and second regions may be respective halves of the cylinder. A transition point of an output of sensor 130 may correspond to a midpoint of the cylinder. Meanwhile, sensor 140 may be configured to determine a position of the piston with relatively greater precision, such as by determining a unit distance of piston movement. Sensor 140 may count a number of increments that the piston has moved. Each of the increments may correspond to a predetermined distance. The predetermined distance may be smaller than half the length of the cylinder. Thus, the granularity of sensor 140 may be finer than that of sensor 130. Sensor 140 may determine how many unit distances the piston has moved past a known position, such as the midpoint of the cylinder based on output of sensor 130. For example, sensor 140 may count a number of teeth of a gear that is caused to move by movement of the piston. A precise distance that the piston has moved in a time interval may be determined, which may correspond to the number of teeth counted in that time interval. Sensor 130 and sensor 140 may each include a proximity sensor.

Sensor 150 may be configured to monitor operating conditions of energy transformer 20. Sensor 150 may include an ammeter or a voltmeter. Other sensors may also be provided for monitoring other parameters of a generator, such as a level of resistance. Energy transformer 20 may be provided with a temperature sensor.

Power system 1 may include other sensors. For example, a fuel level sensor, fuel pressure sensor, coolant pressure sensor, etc. may also be provided. Sensors may be provided to analyze exhaust flow.

Sensors may be connected to controller 90. Controller 90 may be coupled to components wirelessly or by wired connections.

Figure 3:
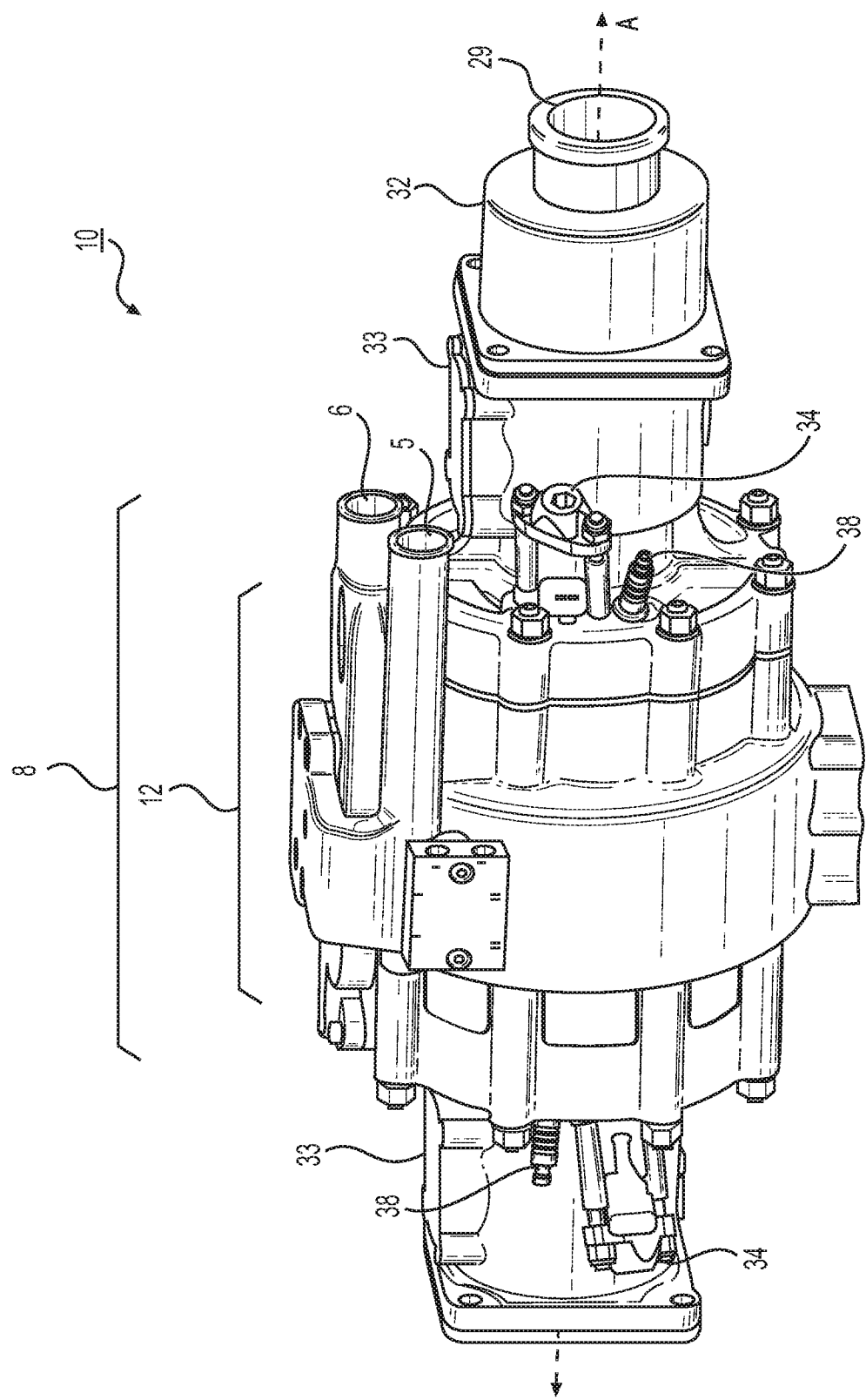
FIG. 3 is a perspective view of a free piston engine, according to embodiments of the present disclosure.
Figure 4:
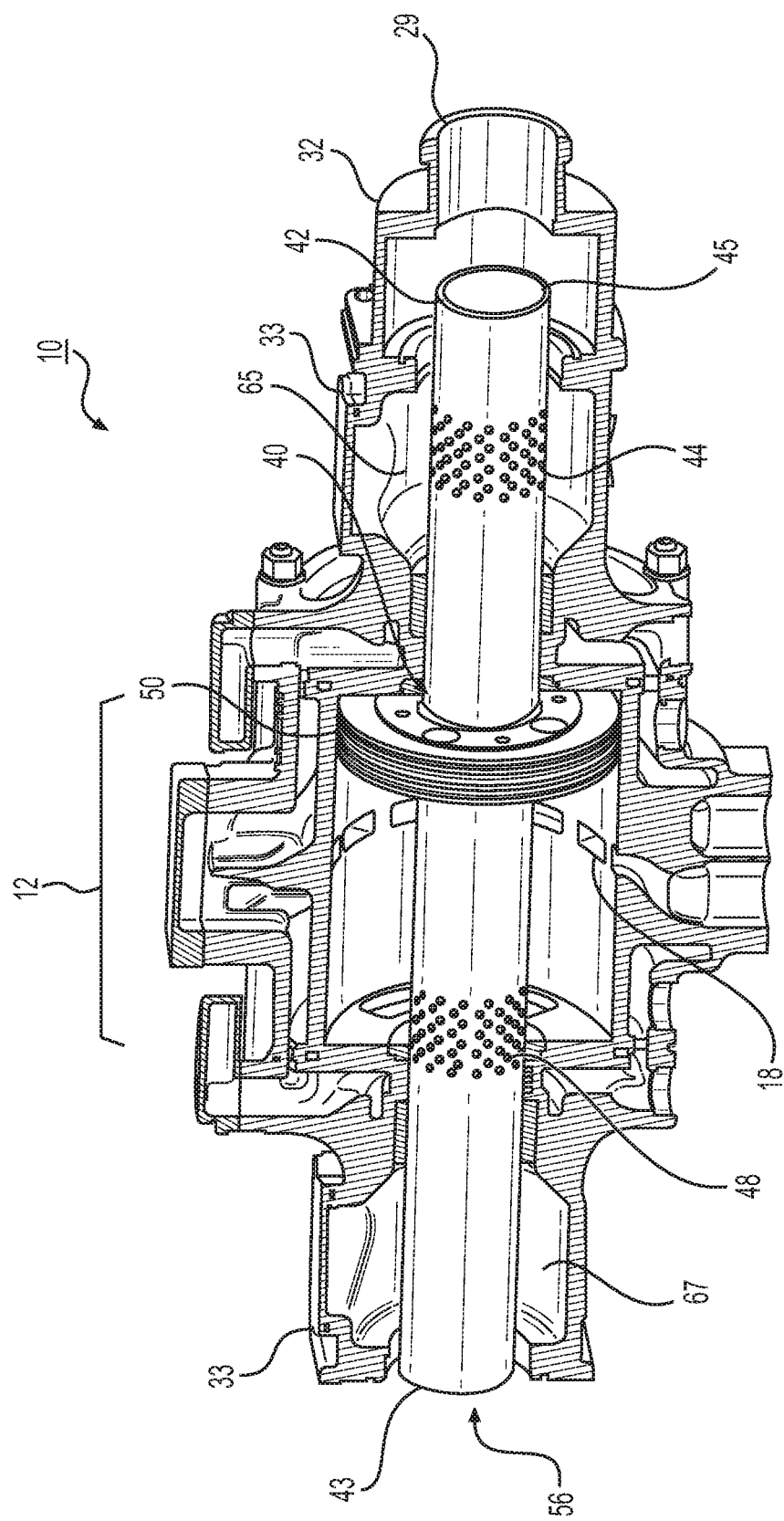
FIG. 4 is a perspective partial cross-sectional view of the engine of FIG. 3 with the piston at a first end point on a right side of the cylinder, according to embodiments of the present disclosure.

FIG. 3 illustrates an exemplary embodiment of engine 10 according to the present disclosure. Engine 10 may be a free piston engine, which is one example of an internal combustion engine. Engine 10 includes an engine block 8. A cylinder 12 defining at least one combustion chamber may be included in engine block 8 and may have a central, longitudinal axis A. As shown in FIG. 4, illustrating an interior of engine 10, engine 10 includes a double-faced piston 50 mounted in cylinder 12. Piston 50 may be configured to slide along axis A. Piston 50 may be configured to travel in a first stroke from a first end of the cylinder to an opposite second end of the cylinder, and in a second stroke from the second end of the cylinder back to the first end of the cylinder. FIG. 4 is a cutaway view showing a perspective partial cross-sectional view of the engine of FIG. 3. Piston 50 is attached to piston rod 40, which may include a first piston rod portion 42 and a second piston rod portion 43. Piston rod portions 42 and 43 may be centered around a radial center of piston 50 and may be aligned with axis A. A piston kit 56 may include piston 50 and piston rod 40. Air may be supplied to engine 10 through inlet opening 29 of inlet chamber 32, and may be communicated into combustion chambers in cylinder 12 through passageways in piston rod 40. Air may communicate with a region 65 on a first side of engine 10 and a region 67 on a second side of engine 10. Each of the areas 65 and 67 may include a vestibule. Piston rod 40 may act as a sliding action valve. Exhaust gases may be exhausted from cylinder 12 through exhaust ports 18. Further details of examples of a free piston engine may be found in U.S. application Ser. No. 16/207,479, which is incorporated herein by reference in its entirety. In some embodiments, a throttle may be attached to inlet chamber 32.

Figure 5:
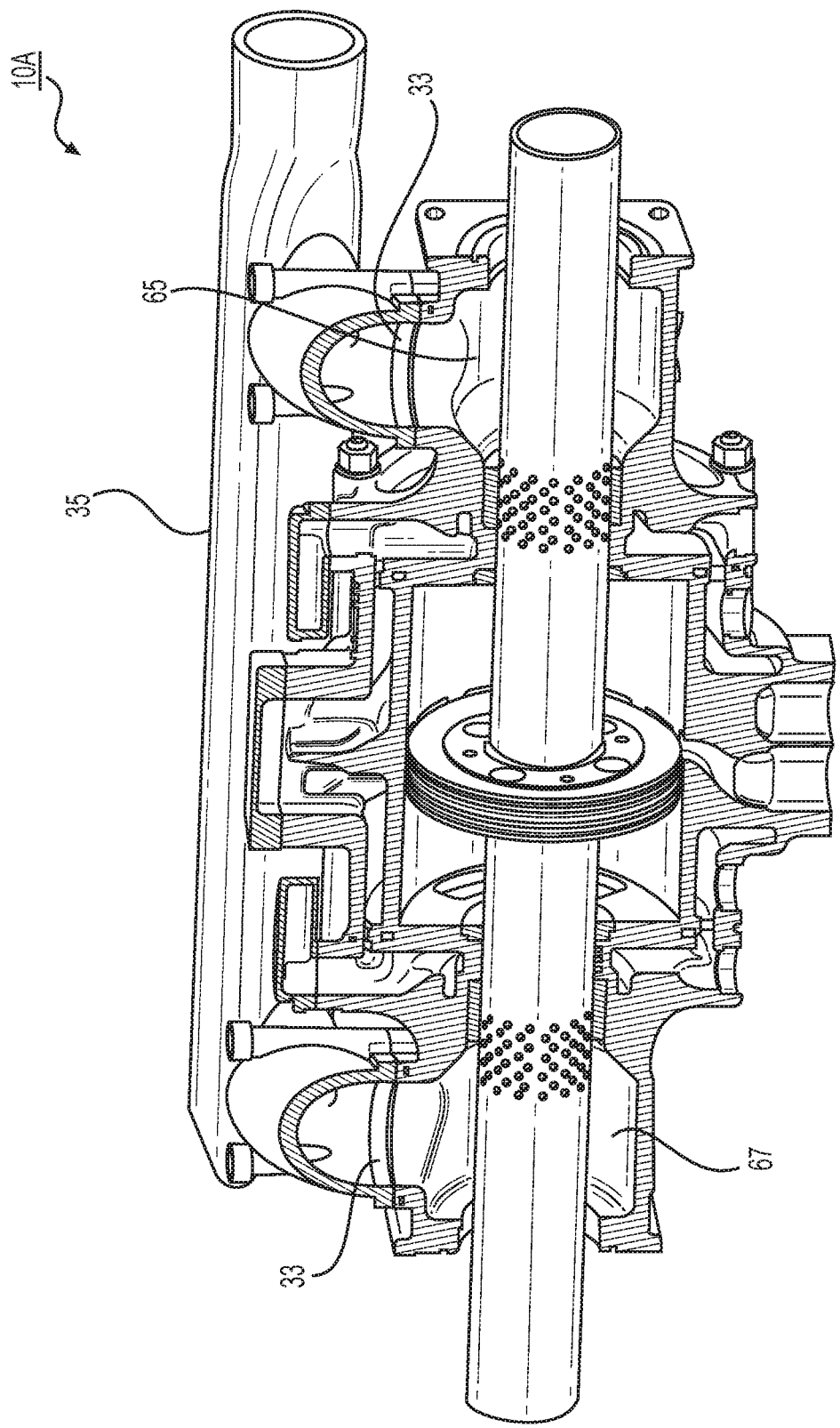
FIG. 5 is a perspective partial cross-sectional view of another embodiment of an engine, according to embodiments of the present disclosure.

FIG. 5 illustrates a perspective cutaway view of another embodiment of a free piston engine, consistent with the present disclosure. As shown in FIG. 5, an engine 10A may include an intake manifold 35. Intake manifold 35 may be connected to separate vestibules of engine 10A via respective side openings 33. In contrast to engine 10 as shown in FIG. 4, where side openings 33 may be sealed, engine 10A as shown in FIG. 5 may be open to communicate with intake manifold 35 through side openings 33. Engine 10A may be closed off at one end. For example, instead of having inlet chamber 32, as in FIG. 4, engine 10A may have a chamber that encloses piston rod portion 42 on one side of engine 10A (not shown in FIG. 5).

Figure 6:
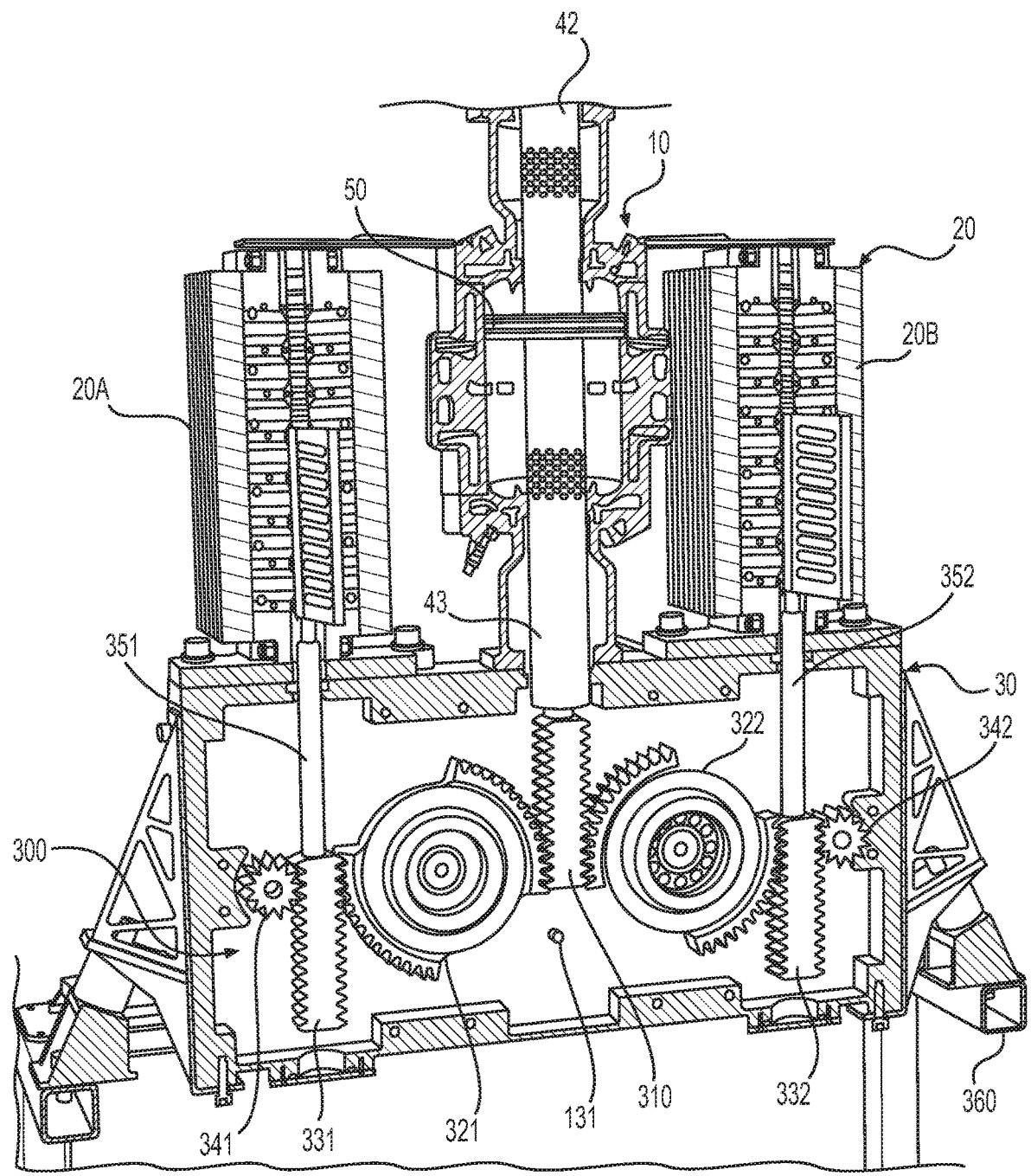
FIG. 6 is a perspective partial cross-sectional view of the power generation system of FIG. 1, according to embodiments of the present disclosure.

FIG. 6 is a partial cutaway view showing an interior of base 30 according to an embodiment of the disclosure. The view of FIG. 6 may correspond to a cross-section taken at plane A-A, as shown in FIG. 1. As shown in FIG. 6, base 30 may include an actuator 300.

Actuator 300 may transform reciprocating linear motion from engine 10 into mechanical motion that is input to energy transformer 20. Actuator 300 may also transform motion generated from electrical energy from energy transformer 20 into mechanical motion input to engine 10. Actuator 300 may include an energy transfer mechanism including a rack and gear. Actuator 300 may reverse the direction of motion of a body coupled to engine 10 and couple it directly to generators of energy transformer 20.

Actuator 300 includes rack 310. Rack 310 is coupled to piston rod portion 43 of piston rod 40. Rack 310 may be connected to piston rod portion 43 via a plug that occludes one end of piston rod 40. Base 30 may be sealed off from engine 10 in an air-tight manner such that gases from engine 10 do not enter base 30. Rack 310 is coupled to gears 321 and 322. Rack 310 may be a double-sided rack having teeth arranged on opposing sides. Gears 321 and 322 may be positioned on either side of rack 310. Actuator 300 may have two-dimensional reflection symmetry about a plane that is parallel to axis A of engine 10. For example, a plane of symmetry of actuator 300 may be aligned with axis A. Actuator 300 may enable base 30 to be balanced.

On one side of actuator 300, gear 321 is connected to rack 331. Rack 331 is coupled to first bank 20A of energy transformer 20 via rod 351. Rack 331 is also coupled to gear 341 which may spin together with movement of rack 331. In some embodiments, gear 341 may be coupled with a trigger wheel. Gear 341 may form a part of a component that is configured to be sensed by sensor 140.

Components of actuator 300 may be used for sensing. For example, sensor 130 (not shown in FIG. 6) may be provided attached to base 30, and sensor 130 may be configured to sense a proximity of rack 310 through a hole 131 provided in base 30. Sensor 130 may be configured to output a first signal when rack 310 overlaps with sensor 130, and to output a second signal when rack 310 does not overlap with sensor 130. In some embodiments, sensor 130 may be configured to output a signal in response to changing magnetic field, which may induce current in sensor 130. In some embodiments, sensor 130 may include a cylindrically-shaped inductive sensor having an electromagnetic coil. Sensor 130 may be fitted into hole 131 and may have a sensor face configured to face rack 331. When a metal object, such as rack 331, is moved into proximity of the sensor face, an output signal may be generated in the sensor. Sensor 130 may be arranged such that a gap is provided between a sensor face of sensor 130 and rack 331 when rack 331 is in an overlapping position. In some embodiments, the gap may be 1 mm or less.

As shown in FIG. 6, rod 351 may be aligned with a longitudinal central axis of first bank 20A of energy transformer 20. Sliding motion of rod 351 through first bank 20A may enable electrical energy to be generated. Energy transformer may include stator coils. Energy transformer 20, including first bank 20A, may include a magnetic polarity array of an electricity producing device. An example of an energy transformer is given in U.S. Pat. No. 9,995,212, which is incorporated herein by reference in its entirety.

Similar to the above, on another side of actuator 300, gear 322 is connected to rack 332. Rack 332 is coupled to second bank 20B of energy transformer 20 via rod 352. Rack 332 is also coupled to gear 342 which may spin together with movement of rack 332. In some embodiments, gear 342 may be coupled with a trigger wheel. Gear 342 may form a part of a component that is configured to be sensed by sensor 140.

Because actuator 300 may include left and right sides, and may have mirror-symmetry, power system 1 may be balanced with respect to the left and right sides relative to axis A. Energy transformer 20 may include first bank 20A and second bank 20B, and thus may be further balanced. Lateral forces acting through actuator 300 may be canceled out. Furthermore, piston 50 may have piston rod 40 aligned with axis A and may avoid side forces being applied to piston 50, for example as may occur when a piston is constrained by a rotating crankshaft.

Base 30 may be attached to other structures, such as a support fixture 360. Power system 1 may be mounted to other components, via, for example, fixture 360. In some embodiments, the entire overall structure of power system 1, including engine 10, energy transformer 20, and base 30, may be contained by an enclosure. Components 10, 20, and 30 may be packaged together as a generator unit.

Figure 7A:
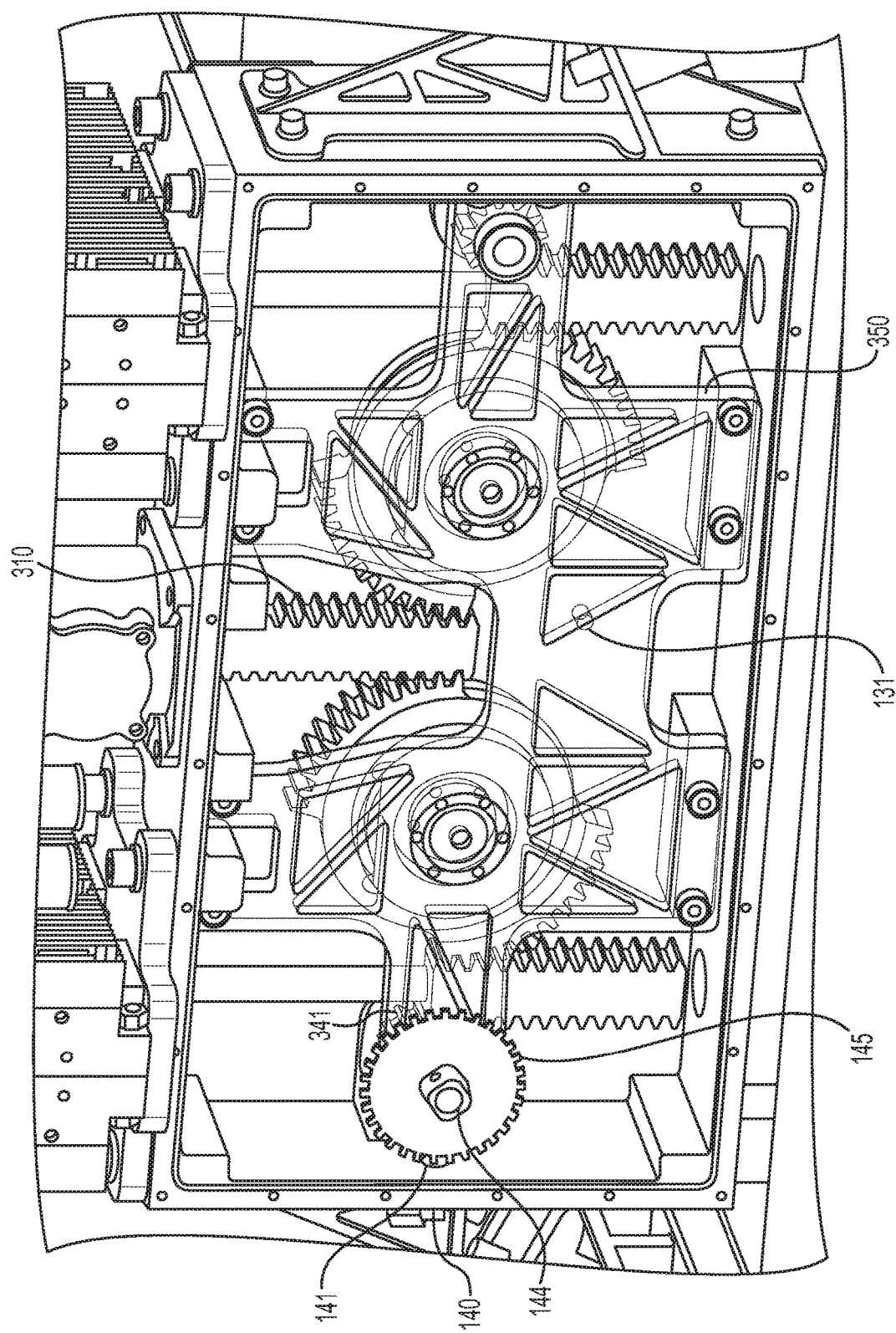

FIG. 7A is a partial cutaway view showing an interior of base 30 of an embodiment of the disclosure at a transverse position different from the position depicted in FIG. 6. The view of FIG. 7A may correspond to a cross-section taken at plane B-B, as shown in FIG. 1. FIG. 7A shows a partially transparent view of a brace 350 and a more detailed view of the interior of base 30.

Sensor 140 may be provided attached to base 30, and sensor 140 may be configured to sense a proximity of a component of actuator 300. A trigger disk 145 of sensor 140 is visible in the view of FIG. 7A. Trigger disk 145 is coupled to gear 341 of actuator 300 (see also FIG. 6), and trigger disk 145 may spin together with gear 341. Trigger disk 145 may be coupled to gear 341 by a shaft 144. In some embodiments, trigger disk 145 may be integral with gear 341. For example, trigger disk 145 may comprise a stepped structure wherein a first step portion of trigger disk 145 meshes with rack 331 and a second step portion of trigger disk 145 includes teeth configured to be sensed by sensor 140. Sensor 140 may be configured to sense trigger disk 145 through a hole 141 provided in base 30. Sensor 140 may be configured to output a first signal when a tooth of trigger disk 145 is adjacent to sensor 140, and to output a second signal when no tooth of trigger disk 145 is adjacent to sensor 140. In some embodiments, sensor 140 may include an inductive sensor. In some embodiments, sensor 140 may include a Hall effect sensor. Sensor 140 may be fitted into hole 141 and may have a sensor face configured to face trigger disk 145. When a metal object, such as a tooth of trigger disk 145, moves into proximity of the sensor face, an output signal may be generated in the sensor.

Figure 7C:
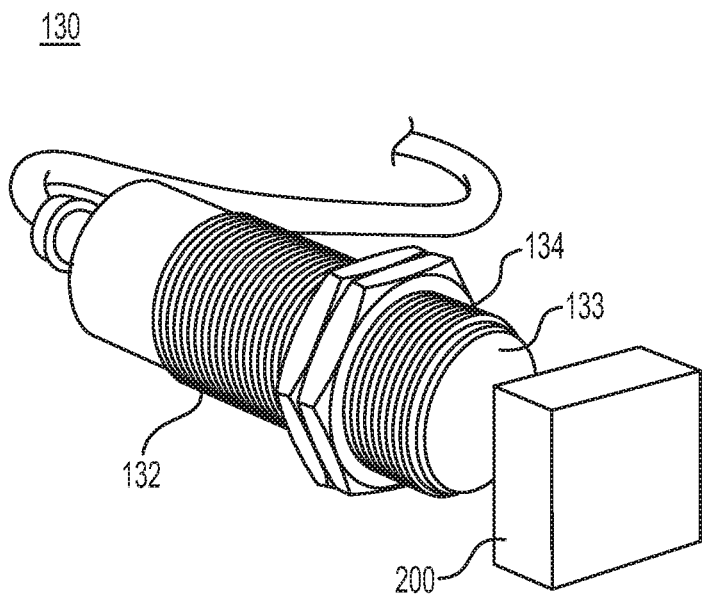
FIG. 7C-E are views of exemplary structures of sensors, according to embodiments of the present disclosure.

Sensor 130 may be provided attached to base 30, and sensor 130 may be configured to sense a proximity of a component of actuator 300. FIG. 7C illustrates an example of a structure of sensor 130. Sensor 130 may include a body 132. Body 132 may be an elongated, cylindrically shaped member. Body 132 may be configured to interact with fastening members, and, for example, may include threads so that nuts may be attached to the threads. Sensor 130 may be fitted into hole 131 in base 30. Body 132 may be inserted into hole 131 and nuts sandwiching a wall of base 30 may be tightened, thereby fixing sensor 130 to base 30. Sensor 130 may include coil 134. Coil 134 may be included inside body 132. Sensor 130 may have sensor face 133 that is configured to face an object 200. Object 200 may be a metal object that may influence an electrical circuit included in sensor 130. Sensor 130 and sensor 140 may include a magnetoelectric transducer. In a magnetoelectric transducer, electromotive force may change in accordance with a level of magnetic field detected. A magnetoelectric transducer may be directional.

Figure 7D:
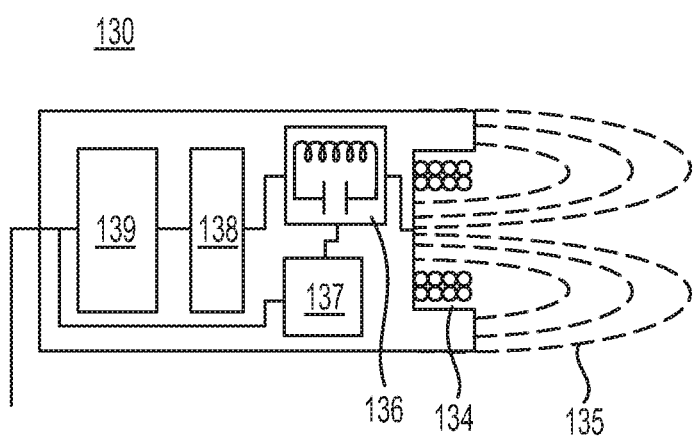

As shown in FIG. 7D, an electrical circuit may be included in sensor 130. The circuit may include various electrical components, such as an oscillator 136, a voltage regulator 137, and so on. Sensor 130 may include trigger 138 and outputter 139. Outputter 139 may be connected to an external load, for example. Sensor 130 may be operated such that a field 135 is generated from sensor 130. Field 135 may be an electromagnetic field. Sensor 130 may be configured such that object 200 interacts with field 135 and may cause a circuit included in sensor 130 to generate an output signal. Object 200 may be made of metal. The motion of object 200 in a region of sensor face 133 may affect an inductance in sensor 130. The sensor illustrated in FIG. 7C and FIG. 7D may represent an example of an inductive sensor.

Figure 7E:
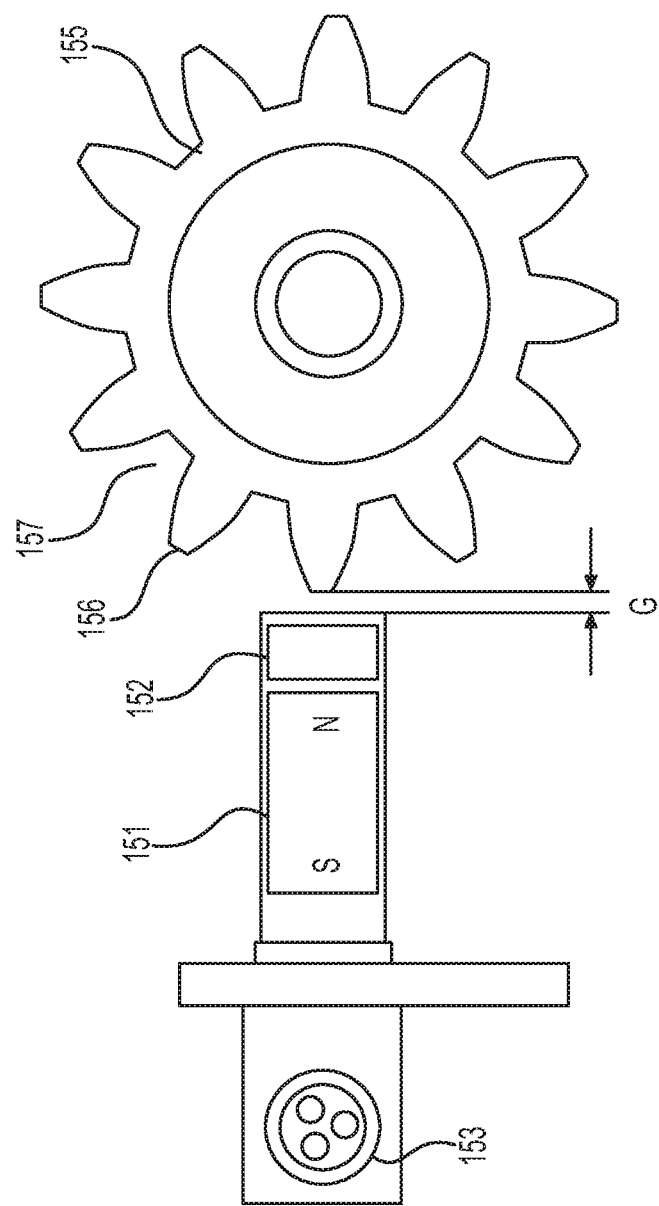

Reference is now made to FIG. 7E, which illustrates an exemplary configuration of a Hall effect sensor. A sensor may include a permanent magnet 151, sensing element 152, and output port 153. A wheel 155 may be provided, and wheel 155 may be configured to rotate. Sensing element 152 may be configured to interact with wheel 155. Wheel 155 may include teeth 156 and valleys 157. The sensor may be configured such that when one of teeth 156 approaches sensing element 152, an output signal is generated. The sensor may be configured such that a first output signal is generated when a tooth is adjacent to sensing element 152, and a second output signal is generated when a valley is adjacent to sensing element 152. Output signals may be transmitted via output port 153. The sensor may be configured such that there is a minimum gap G between a face of sensing element 152 and teeth 156. Sensor 140 may include a Hall effect sensor having a construction similar to or the same as that of the sensor represented in FIG. 7E.

Sensors 130 and 140 may be provided as the same or different type of sensor. In some embodiments, sensor 130 may include an inductive sensor. In some embodiments, sensor 130 may include a Hall effect sensor. Referring back to FIG. 7A, sensor 130 may be fitted into hole 131 so as to face rack 310. Sensor 130 may include an inductive sensor configured to respond to a change in magnetic field. The inductive sensor may be configured to output a signal when a state of overlap of rack 310 and sensor 130 changes. For example, the inductive sensor may be configured to output a signal when rack 310 transitions from not overlapping with sensor 130 to overlapping with sensor 130. The inductive sensor may output a signal when rack 310 also transitions from overlapping with sensor 130 to not overlapping with sensor 130. A Hall effect sensor may detect a static magnetic field. Thus, in some embodiments, a Hall effect sensor may be used to detect whether or not rack 310 is overlapping with sensor 130 at a given time. In some embodiments, to enhance packaging, sensor 130 may include an inductive sensor while sensor 140 may include a Hall effect sensor. Providing sensor 130 as an inductive sensor may enhance responsiveness.

FIG. 7B is a more detailed view of an embodiment of the disclosure showing a structure of sensor 140. In the view of FIG. 7B, brace 350 is not visible. Sensor 140 may be coupled with trigger disk 145 through hole 141 in base 30. Sensor 140 may include a Hall effect sensor. Sensor 140 may be configured to detect a proximity of a tooth of trigger disk 145 as it moves past its sensor face. When a tooth 146 is adjacent the Hall effect sensor, output of sensor 140 may be 1. When a valley 147 is adjacent the Hall effect sensor, output of sensor 140 may be 0.

In some embodiments, a minimum gap between a face of sensor 140 and teeth of trigger disk 145 may be set to, for example, 1 mm or less.

Sensor 140 may be configured to measure angular movement of a gear coupled to engine 10. Angular movement of gear 341 (not shown in FIG. 7B) may correspond to that of trigger disk 145. Trigger disk 145 may be larger than gear 341 so that counting of teeth may be enhanced. For example, signal-to-noise ratio (SNR) of a Hall effect sensor may be improved when relatively larger objects (e.g., teeth of a trigger wheel) are configured to be sensed.

Alternatives to a Hall effect sensor that uses a trigger disk may also be used. For example, an angular position sensor may be used for sensor 140.

A circuit may be connected to or included in sensor 130 or sensor 140. The circuit may include signal conditioning electronics. The circuit may be configured to process output of sensor 130 or sensor 140. The circuit may be configured to determine an engine position output signal on the basis of output from sensor 130 or sensor 140.

In some embodiments, a controller may be provided that is configured to process output of sensor 130 or sensor 140. For example, controller 90, identified in FIG. 2, may be configured to determine a position of a piston of engine 10 based on output of sensor 130 or sensor 140. Controller 90 may be configured to sample sensor 130 or sensor 140 at a predetermined sampling frequency. The predetermined sampling frequency may be, e.g., 100 MHz or higher. When an output of sensor 140 changes from 1 to 0, or 0 to 1, it may be determined that piston 50, as depicted in FIG. 4, for example, has moved at least a certain amount. The certain amount may be determined in advance by experiment. In some embodiments, the certain amount may be determined deterministically based on physical properties (e.g., dimensions) of components of engine 10 and actuator 300. Controller 90 may be configured to interpolate between data points. There may be a predetermined movement distance associated with one tooth. Controller 90 may be configured to determine that piston 50 has moved a distance less than the predetermined movement distance, such as a half-tooth length.

As shown in FIG. 7B, sensor 140 may include a cylindrical portion 142, and may have a face 143 that is configured to face trigger disk 145. Cylindrical portion 142 may be fitted into hole 141 in base 30. Face 143 may constitute the sensor face of sensor 140. Teeth of trigger disk 145 may be different from that of a gear, such as an involute gear. Instead of, for example, a pointed tooth that is configured to mesh with another gear, the teeth of trigger disk 145 may be relatively broad and have a substantially flat end face. Teeth of trigger disk 145 may be configured such that sensor 140 can easily detect when a tooth of trigger disk 145 is adjacent face 143.

Figure 8A:
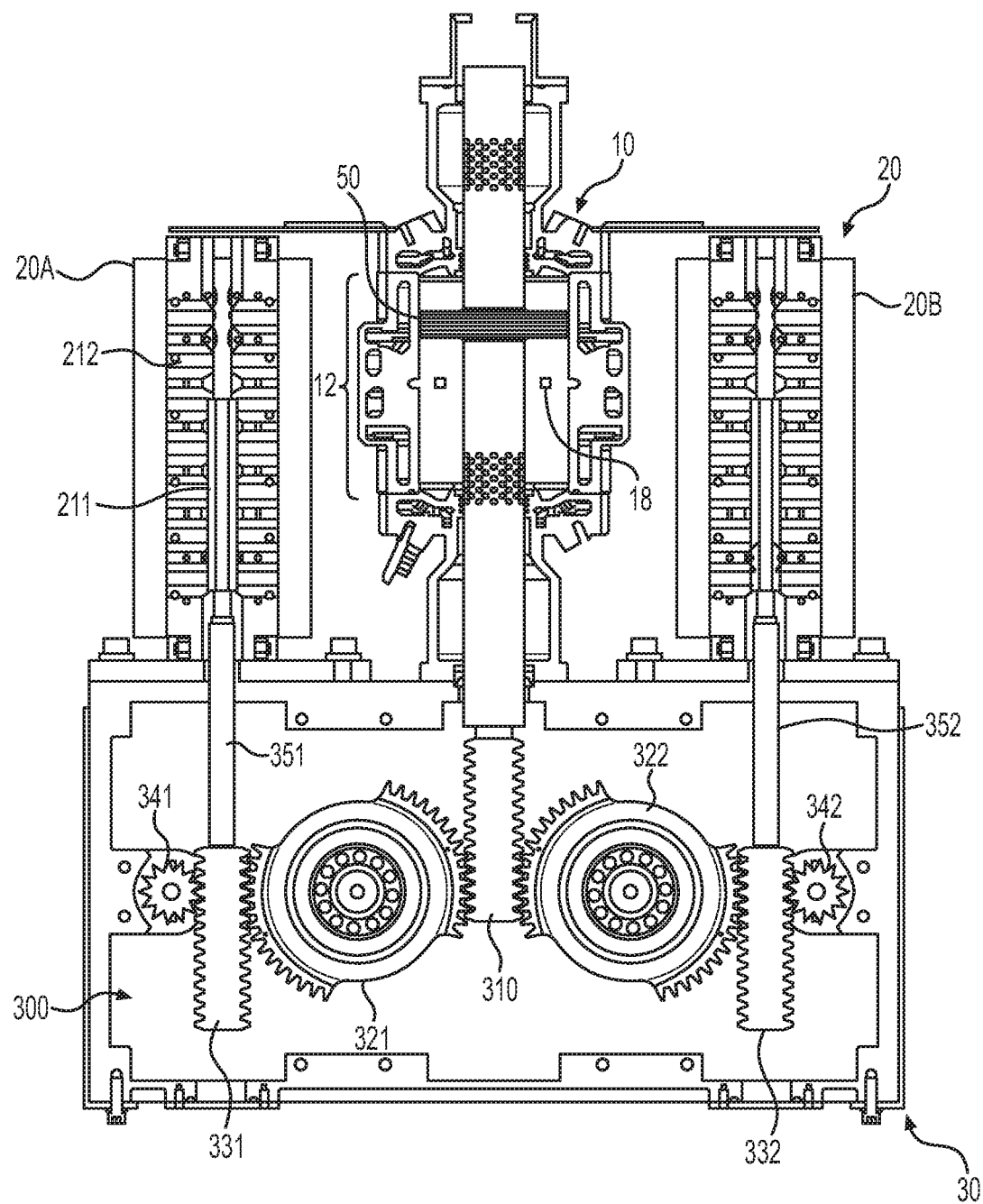
FIGS. 8A-8C are schematic cross-sectional views of the power generation system of FIG. 1 with the piston in different positions in the cylinder, according to embodiments of the present disclosure.
Figure 8B:
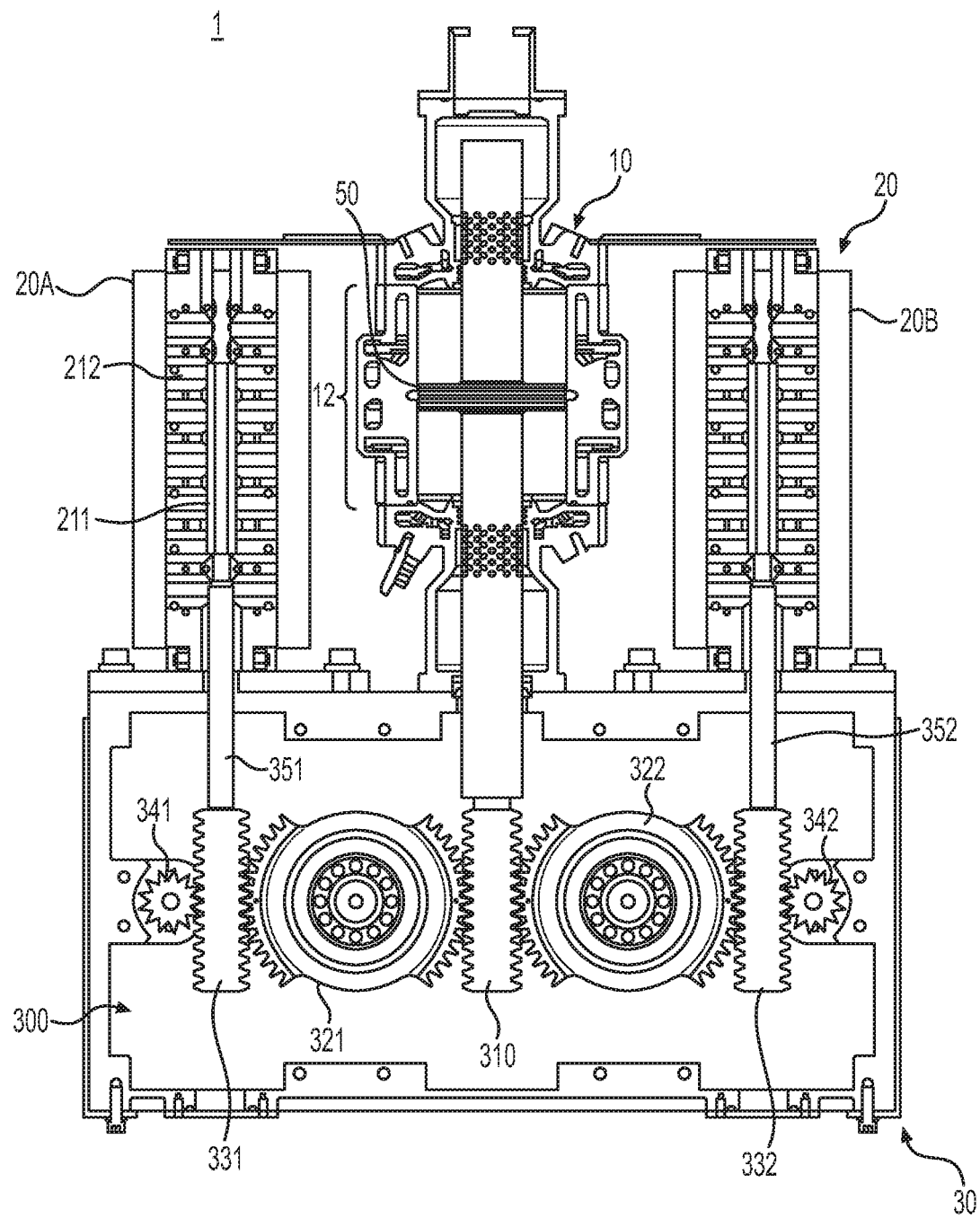
Figure 8C:
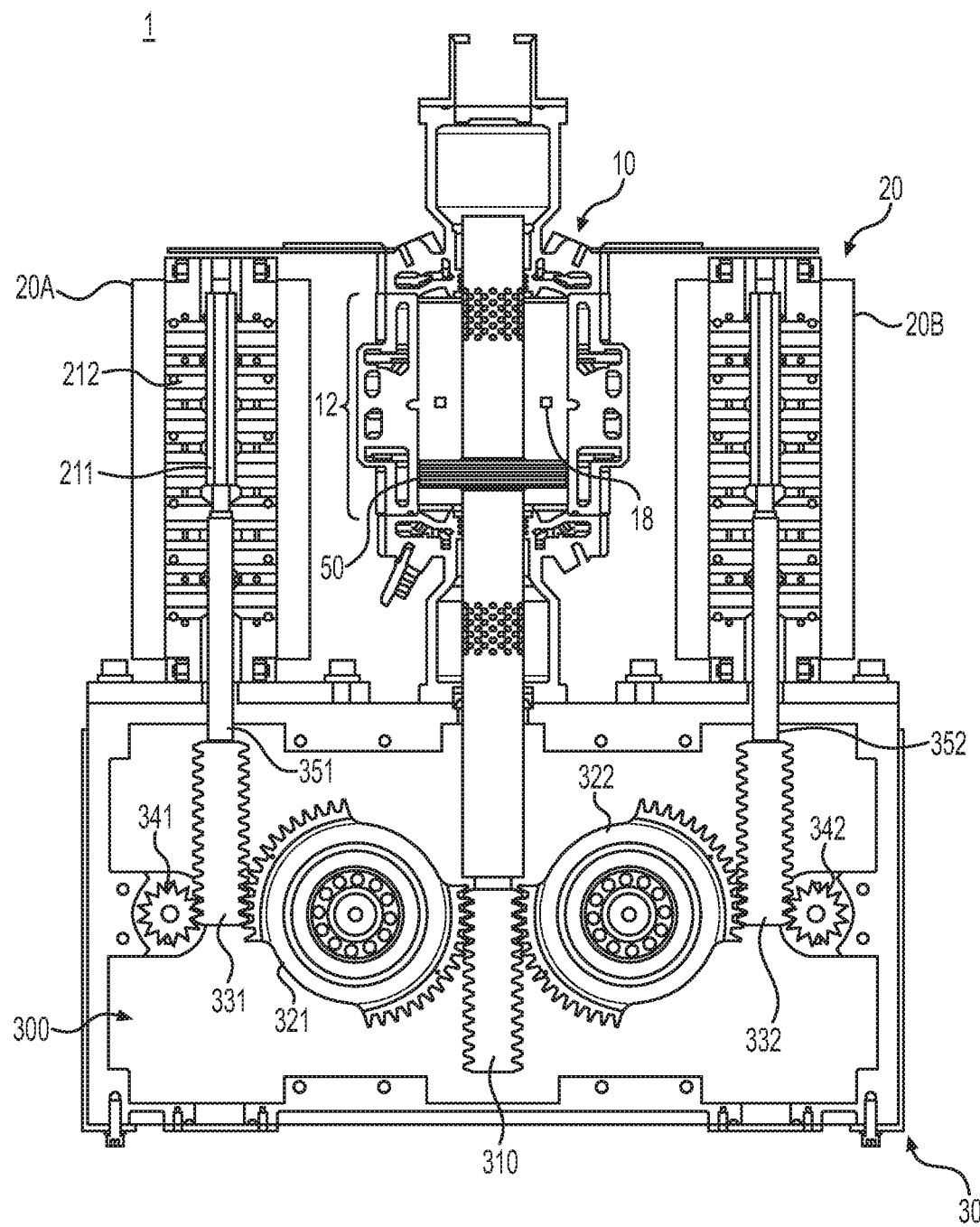

Reference is now made to FIGS. 8A-8C, which show the moving parts of engine 10, actuator 300, and energy transformer 20 at different stages. FIG. 8A is a view showing a position of power system 1 when piston 50 is at a first position. At the point illustrated in FIG. 8A, engine 10 may be at a first combustion point. This point may correspond to a start point of a first stroke of engine 10. In the first stroke, piston 50 may travel in a first direction, which may correspond to a downward direction in the view of FIG. 8A. At the beginning of the first stroke, energy transformer 20 may be at the beginning of a first electrical power generation stroke. An electrical power generation stroke of energy transformer 20 may correspond to the motion of a mover 211 through a stator 212. The beginning of the first electrical power generation stroke may correspond to a position of mover 211 at one end of stator 212, and the end of the first electrical power generation stroke may correspond to a position of mover 211 at an opposite end of stator 212.

FIG. 8B is a view showing a position of power system 1 when piston 50 is at a second position. At this point, piston 50 may be at a cylinder midpoint. The point illustrated in FIG. 8B may correspond to a midpoint of the first stroke of engine 10. This point may also correspond to a midway point of the first electrical power generation stroke.

FIG. 8C is a view showing a position of power system 1 when piston 50 is at a third position. At this point, engine 10 may be at a second combustion point. The point illustrated in FIG. 8C may correspond to an end point of the first stroke of engine 10, which may also correspond to a start point of a second stroke of engine 10. This point may also correspond to an end point of the first electrical power generation stroke and a start point of a second electrical power generation stroke.

After reaching the position shown in FIG. 8C, engine 10 may reciprocate in an opposite direction. In a second stroke of engine 10, piston 50 may travel in a second direction, which may correspond to an upward direction in the views of FIGS. 8A-8C. In the second stroke, the moving parts of engine 10, actuator 300, and energy transformer 20 may move in the reverse order to that of FIGS. 8A-8C. Power system 1 may operate with engine 10 reciprocating back and forth. In some embodiments, electrical energy may be generated in energy transformer 20 with each stroke. Chemical energy from a fuel may be converted into mechanical energy in engine 10. In some embodiments, energy transformer 20 may be used as a power supply and may cause actuator 300 and engine 10 to move.

In actuator 300, gears 321 and 322 may be configured to rotate in only a predetermined range. Therefore, teeth may be provided only partially around the circumference of gear 321 or gear 322. The predetermined range may correspond to end points of maximum piston travel within cylinder 12 of engine 10. The end points may be determined in consideration of a clearance volume between an engine head and a proximal face of piston 50. In some embodiments, gears 321 and 322 may include teeth provided around the entire circumference thereof. Providing teeth only partially around the circumference of gears may be beneficial for packaging. For example, components of rack 310 and piston rod portion 43 may be positioned closer together when teeth are not provided completely around gears 321 and 322.

Power system 1 may be configured to operate in a plurality of operation modes. As used herein, the term "first mode" may include or cover a "first operation mode" or a "first operational mode."

Reference is now made to FIG. 9, which is a table showing system running conditions for a first mode. The first mode may be an operational mode of running power system 1. The first mode may correspond to an engine position identification mode. FIG. 9 may indicate parameters for the first mode. Parameters may refer to various aspects of power system 1. A parameter such as "injection" may refer to fuel injection provided to engine 10. "Ignition" may refer to causing ignition in a cylinder of engine 10, such as causing a spark plug of engine 10 to fire. Other parameters may be set when power system 1 operates in the first mode. In the first mode, a setting of injection and ignition parameters may be set to an off state, as indicated by an X-mark in FIG. 9. The off state may indicate that injection or ignition is not allowed in the first operational mode. That is, engine 10 may be prohibited from injecting fuel or causing spark plugs to fire. Furthermore, energy transformer 20 may be set to "energy supply" mode. In energy supply mode, energy transformer 20 may be configured to transform electrical energy into mechanical motion. For example, energy transformer 20 may be configured to run as a motor. Energy transformer 20 may be configured to be a prime mover.

When power system 1 is in an operation mode, engine 10 and energy transformer 20 may be configured to operate in a certain way. A control device, such as controller 90 may be configured to send instructions to engine 10 or energy transformer 20. Controller 90 may receive information indicative of a state of engine 10. For example, controller 90 may receive output from sensors 130 and 140. Controller 90 may determine a position of piston 50 in engine 10. Power system 1 may be configured to perform certain functions in response to predetermined conditions being satisfied. Conditions may be related to a position of piston 50. Conditions may be based on output of sensors 130 or 140. Power system 1 may be configured to operate energy transformer 20 to move components of power system 1 in a certain way upon receiving specific output from sensors 130 or 140. As used herein, terms such as "output from sensor 130," "output from sensor 140," or "sensor output" may correspond to output of an electrical signal of a respective sensor or a circuit that is connected thereto.

Figure 10A:
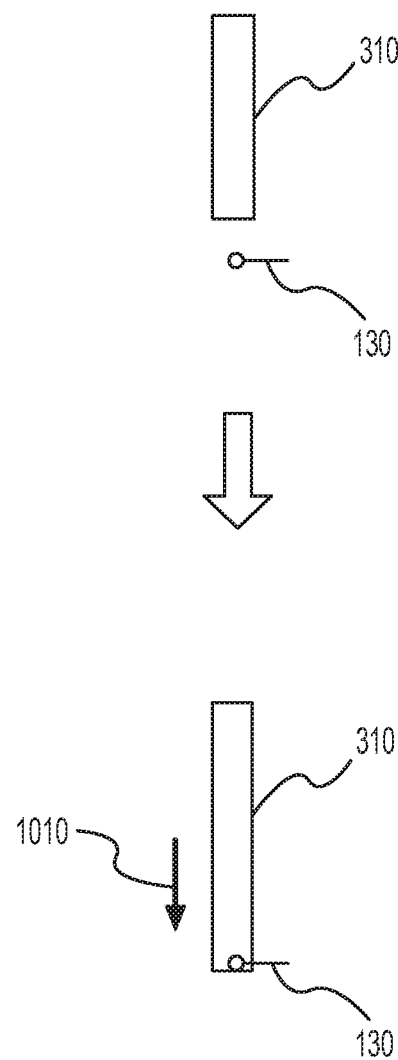
FIG. 10A and FIG. 10B are schematic views a rack of a power generation system operating in a first operational mode, according to embodiments of the present disclosure.

FIG. 10A is a schematic representation of operating power system 1 in a first operation mode in a state where engine 10 is initially at a first position, e.g., an "A-position." The A-position may correspond to a condition that rack 310 of actuator 300 does not overlap with sensor 130. In such a condition, output of sensor 130 may be 0.

Power system 1 may be configured to perform an action in response to a first condition being satisfied in the first operation mode. The first condition may be based on output of a first sensor, such as sensor 130. The first condition may be that rack 310 and sensor 130 do not overlap. Thus, the first condition may be that output of sensor 130 is 0. The action may be that actuator 300 is moved to cause rack 310 to move in a first direction. Due to action of actuator 300, piston 50 is moved toward an opposite side of cylinder 12. For example, piston 50 may be in a north side of cylinder 12 and energy transformer 20 may input power into actuator 300 in a predetermined direction. The predetermined direction may be one tending to cause rack 310 to move downward as shown in FIG. 10A. Input from energy transformer 20 and may cause piston 50 to move downward in cylinder 12 toward the south side. As used herein, the "north side" may correspond to a top side as shown in the figures. The "south side" may correspond to a bottom side in the figures. The "first direction" may correspond to piston movement from the north side to the south side. The "second direction" may correspond to piston movement from the south side to the north side. The first direction may be from top to bottom.

The second direction may be from bottom to top. As shown in FIG. 10A, rack 310 may undergo movement 1010 downwards in response to the first condition being satisfied.

Figure 10B:
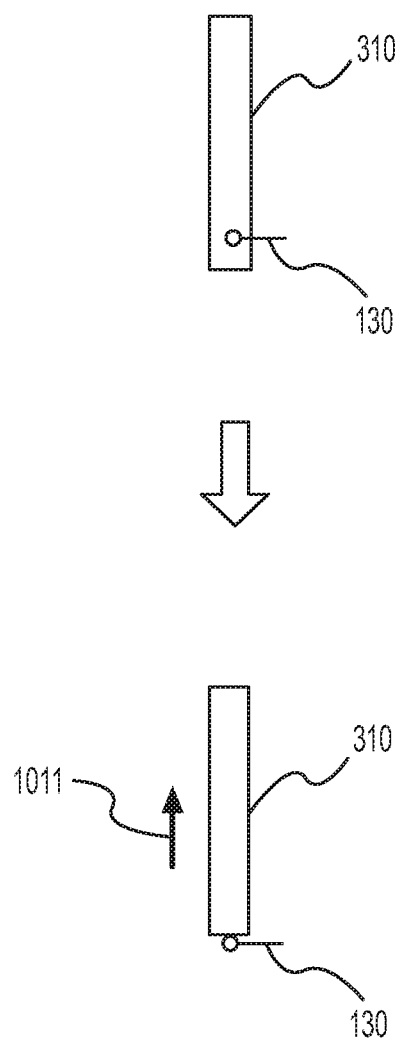

FIG. 10B is a schematic representation of operating power system 1 in the first operation mode in a state where engine 10 is initially at a second position, e.g., a "B-position." The B-position may correspond to a condition that rack 310 of actuator 300 overlaps with sensor 130. In such a condition, output of sensor 130 may be 1.

Power system 1 may be configured to perform an action in response to a second condition being satisfied in the first operation mode. The second condition may be that rack 310 and sensor 130 overlap. Thus, the second condition may be that output of sensor 130 is 1. The action may be that actuator 300 is moved to cause rack 310 to move in the second direction. Due to action of actuator 300, piston 50 is moved toward an opposite side of cylinder 12. For example, piston 50 may be in a south side of cylinder 12 and energy transformer 20 may input power into actuator 300 in a predetermined direction. The predetermined direction may be one tending to cause rack 310 to move upward as shown in FIG. 10B. Input from energy transformer 20 and may cause piston 50 to move upward in cylinder 12 toward the north side. As shown in FIG. 10B, rack 310 may undergo movement 1011 upwards in response to the second condition being satisfied.

FIG. 10C is a chart showing an operation of power system 1 according to the first operation mode. The chart of FIG. 10C may represent a control routine that controller 90 is programmed to execute. As shown in FIG. 10C, a state of "1" of the energy transformer may correspond to setting the energy transformer to power supply mode. An injection state of 0 may indicate that fuel injection is prohibited (e.g., fuel injectors are not allowed to operate to inject fuel). An ignition state of 0 may indicate that ignition is prohibited (e.g., spark plugs are not allowed to fire). In some embodiments, a state of "2" of the energy transformer may correspond to setting the energy transformer to a generator mode (e.g., generation of electrical power by extraction of mechanical energy). In some embodiments, a state of "0" of the energy transformer may correspond to setting the energy transformer to an off state where neither power supply nor electrical generation is performed.

Power system 1 may be configured to perform actions in response to conditions being satisfied. As shown in FIG. 10C, there may be a first condition corresponding to an initial A-position of engine 10. There may be a second condition correspond to an initial B-position of engine 10. The first and second conditions may be based on output of a first sensor, such as sensor 130. When the first condition is satisfied (e.g., that sensor 130 output is 0), an instruction may be issued to move piston 50 from a point where sensor 130 output is 0 to a point where sensor 130 output is 1. For example, energy transformer 20 may input power into actuator 300 so that rack 310 undergoes movement 1010, as discussed above with respect to FIG. 10A.

In some embodiments, power system 1 may be configured to issue an instruction to move piston 50 from a position where sensor 130 output is 0 to a position where sensor 130 output is 1 plus a predetermined further distance. The predetermined further distance may be set as, for example, "X" number of increments. The X increments may correspond to a number of teeth of trigger disk 145. For example, in the first operation mode, controller 90 may be configured to move piston 50 from one side of cylinder 12 to a position where output of sensor 130 changes (e.g., the midpoint of cylinder 12) plus a distance corresponding to four (4) teeth of trigger disk 145. It may be determined that piston 50 has moved the predetermined further distance based on output of sensor 140. Controller 90 may be configured to actuate energy transformer 20 to input power to actuator 300 until a further condition is satisfied. Energy transformer 20 may continue to move actuator 300 and thus piston 50 until the further condition is met. The further condition may be that X increments of trigger disk 145 are detected. Upon the X increments being detected by sensor 140, it may be determined that piston 50 is at a known position and energy transformer 20 may cease to input power to actuator 300. As a result of performing processing consistent with FIG. 10C, a piston position within an engine may be precisely identified.

Figure 10D:
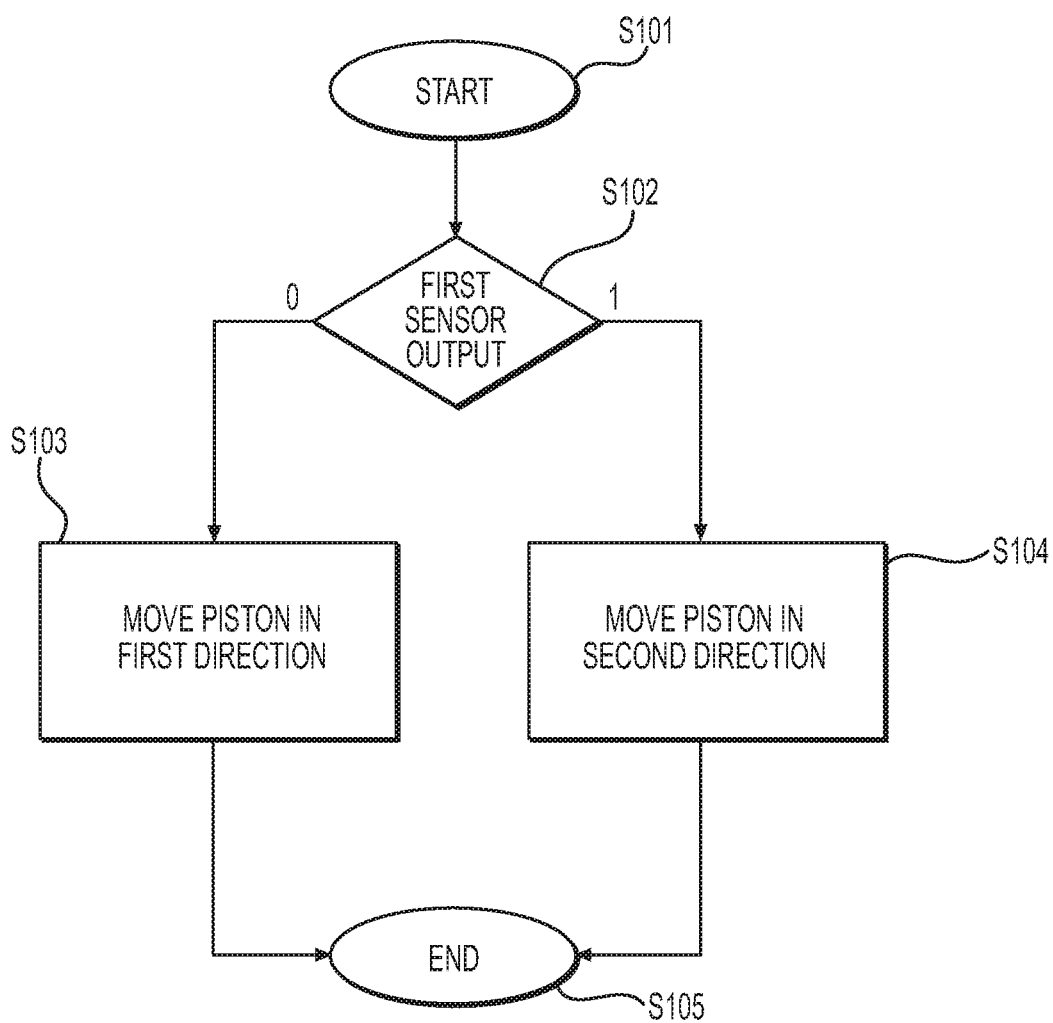
FIG. 10D is a flow chart representing a first operational mode, according to embodiments of the present disclosure.

FIG. 10D is a flowchart illustrating a control routine consistent with the first operation mode. FIG. 10D may be another representation of operation of power system 1 according to the first operation mode. The control routine may be executed continuously. After ending the processing of the control routine of FIG. 10D, subsequent processing may be executed. In some embodiments, the process may return to the start and repeat.

In FIG. 10D, a control routine begins at step S101. At step S102, a determination may be made based on first sensor output. The first sensor output may refer to output of a first position sensor (e.g., a raw detection signal) or its associated circuit (e.g., an event flag detection signal). The first position sensor may include sensor 130. When it is determined that first sensor output is 0 at step S102, the routine may proceed to step S103. First sensor output of 0 may correspond to rack 310 not overlapping with sensor 130. On the other hand, when it is determined that first sensor output is 1 at step S102, the routine may proceed to step S104. First sensor output of 1 may correspond to rack 310 overlapping with sensor 130.

At step S103, a power system may be actuated such that a piston moves in a first direction. Step S103 may include causing energy transformer 20 to move actuator 300 such that piston 50 moves in a first direction. The first direction may correspond to a downward direction in the views of, for example, FIGS. 8A-8C. At step S104, the power system may be actuated such that the piston moves in a second direction. The second direction may be opposite to the first direction. The second direction may correspond to an upward direction in the views of, for example, FIGS. 8A-8C. After step S103 or step S104, the routine may proceed to step S105 where the process may end.

Figure 10E:
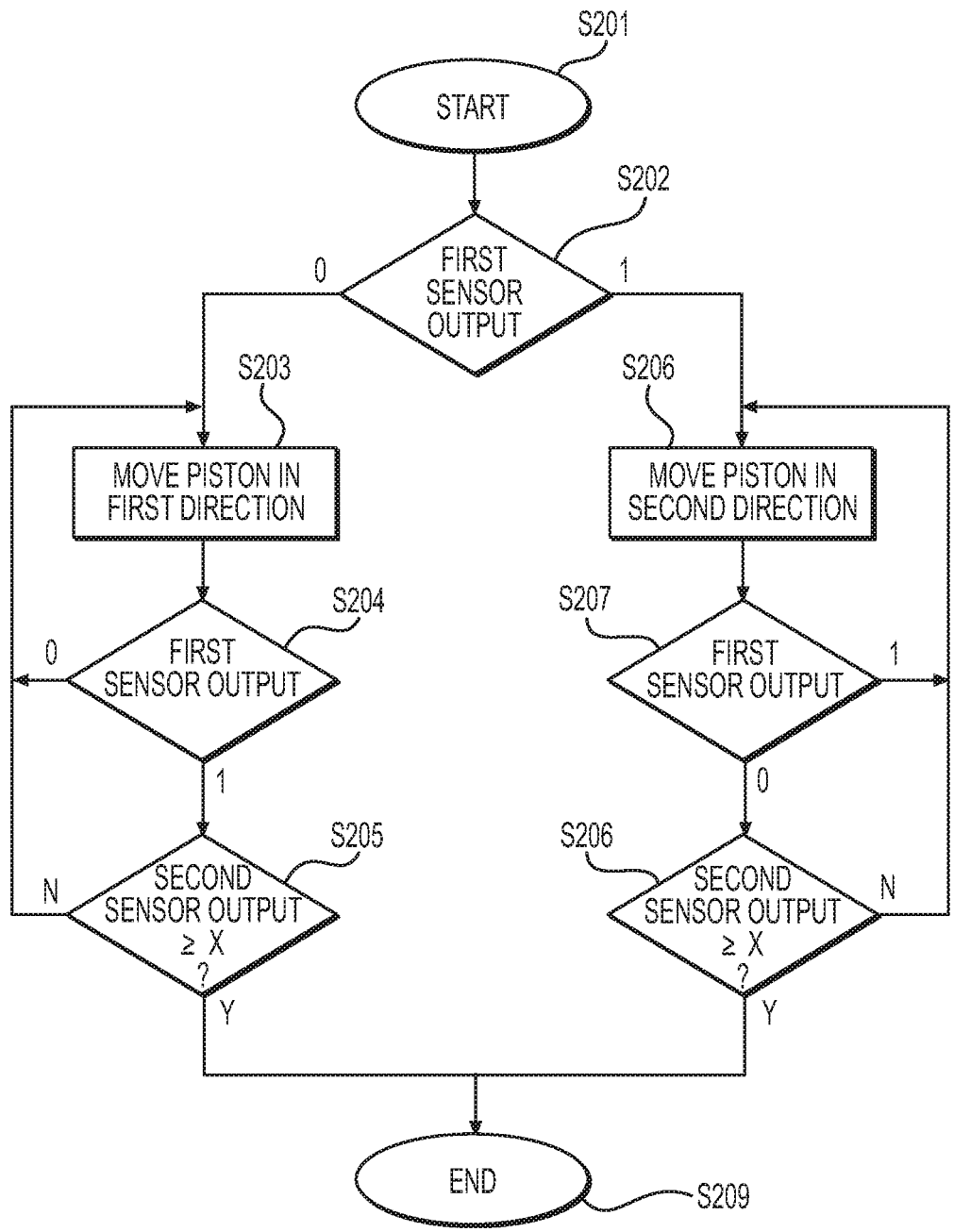
FIG. 10E is a flow chart representing a first operational mode, according to embodiments of the present disclosure.

FIG. 10E is another flowchart illustrating a control routine consistent with the first operation mode. The control routine of FIG. 10E may be similar to that of FIG. 10D but may be modified by including an additional determination step. In the control routine of FIG. 10E, the process may wait until piston 50 has moved at least a distance corresponding to X increments of the second sensor (e.g., sensor 140) before stopping movement initiated by energy transformer 20. As shown in the control routine of FIG. 10E, the process may continue returning to the "move piston" step in respective loops, where energy transformer 20 may input energy into actuator 300 by acting as a power supply. In some embodiments, only after satisfying the condition that piston 50 has moved a distance corresponding to X increments of sensor 140 after crossing the cylinder midpoint may the process end. Energy transformer 20 may be configured to move the piston incrementally. Energy transformer 20 may input small pulses of energy, little by little, so that power system 1 may continue to check sensor status until piston 50 is in the desired position.

In FIG. 10E, a control routine begins at step S201. At step S202, a determination may be made based on first sensor output. The routine may proceed to step S203 or step S206 based on a determination made at step S202.

At step S203, a power system may be actuated such that a piston moves in a first direction. Step S203 may include causing energy transformer 20 to move actuator 300 such that piston 50 moves in a first direction. The first direction may correspond to a downward direction in the views of, for example, FIGS. 8A-8C. On the other hand, at step S206, the power system may be actuated such that the piston moves in a second direction. The second direction may correspond to an upward direction in the views of, for example, FIGS. 8A-8C.

Continuing from step S203, at step S204, a determination may be made based on first sensor output. It may be determined whether first sensor output is still 0, and if so, the routine may return and repeat step S203. It may also be determined at step S204 that first sensor output is 1. At step S204, it may be determined that first sensor output changed, for example, from 0 to 1. Changeover of output signal of the first sensor may correspond to piston 50 reaching a predetermined point in cylinder 12. The predetermined point may be a midpoint of cylinder 12. After determination in step S204 that first sensor output is 1, the routine may proceed to step S205.

At step S205, a determination may be made based on second sensor output. The second sensor output may refer to output of a second position sensor directly (e.g., a raw detection signal) or its associated circuit (e.g., a count determined by a counting circuit). The second position sensor may include sensor 140. When it is determined that second sensor output is less than a value X at step S205, the routine may return and repeat step S203. Second sensor output of less than X may correspond to piston 50 not having moved at least a distance corresponding to X teeth of trigger disk 145. On the other hand, when it is determined that second sensor output is greater than or equal to X at step S202, the routine may proceed to step S209. Second sensor output of X or more may correspond to piston 50 and thus rack 310 moving at least a known amount.

Steps S206 to S208 may be similar to steps S203 to S205 except that a direction of motion is different, and sensor output may be correspondingly reversed. Second sensor output may be based on an absolute value of movement. For example, Sensor 140 may be configured to count a number of increments, such as a number of teeth of trigger disk 145 that move past sensor 140, regardless of the direction of movement.

After step S205 or step S208, the routine may proceed to step S209 where the process may end.

Reference is now made to FIG. 11, which is a table showing system running conditions for a second mode. The second mode may be an operational mode of running power system 1. The second mode may correspond to an engine start mode. FIG. 11 may indicate parameters for the second mode. In the second mode, a parameter may be set such that injection of fuel to engine 10 is enabled, as indicated by a check mark. A parameter may be set such that ignition is enabled by allowing spark plugs of engine 10 to fire. A setting of energy transformer 20 may be set to "energy supply" mode. For example, energy transformer 20 may be configured to run as a motor. Energy transformer 20 may be configured to be a prime mover.

Figure 12A:
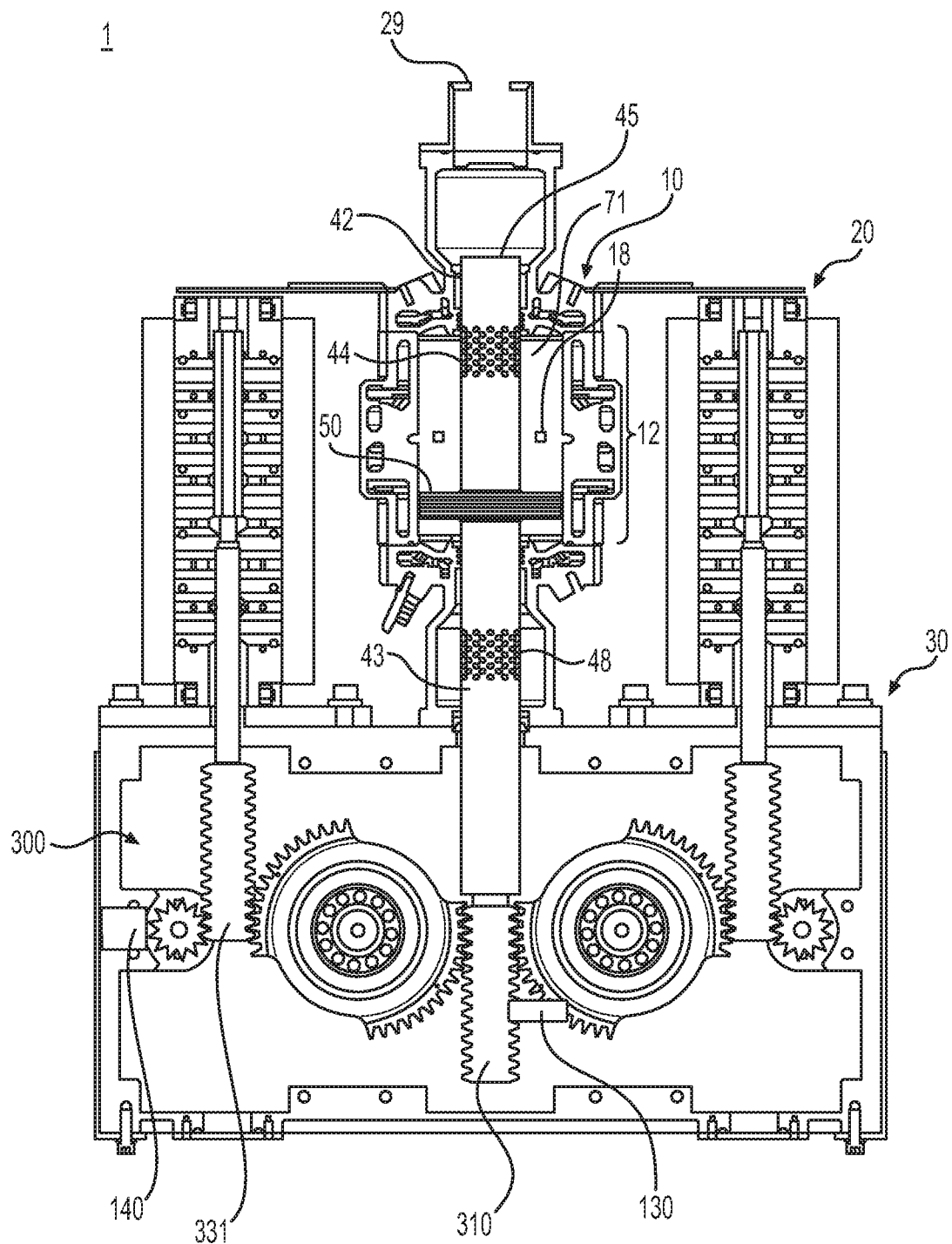
FIGS. 12A-12D are schematic views of a power generation system operating in a second operational mode, according to embodiments of the present disclosure.

FIG. 12A is a schematic representation of operating power system 1 in a second operation mode. Similar to the first operation mode, the engine may initially be in a first position or a second position. The position shown in FIG. 12A may be an A-position in the second operation mode. The A-position in the second operation mode may correspond to a condition that rack 310 of actuator 300 overlaps with sensor 130. In such a condition, output of sensor 130 may be 1.

In the second operation mode, power system 1 may be configured to perform an action in response to a first condition being satisfied. The first condition may be that rack 310 and sensor 130 overlap. Thus, the first condition may be that output of sensor 130 is 1. The action may be that actuator 300 is moved to cause rack 310 to move in the second direction. As discussed above, the second direction may correspond to an upward direction as shown in the figures. Due to action of actuator 300, piston 50 is moved toward an opposite side of cylinder 12. For example, piston 50 may be in a south side of cylinder 12 and energy transformer 20 may input power into actuator 300 in a predetermined direction. The predetermined direction may be one tending to cause rack 310 to move upward as shown in the view FIG. 12A. Input from energy transformer 20 may cause piston 50 to move upward in cylinder 12 toward the north side.

A first combustion chamber 71 may be formed at the north side of cylinder 12. Combustion chamber 71 may have a volume that is determined by a position of piston 50. As piston 50 moves upward in cylinder 12, the volume of combustion chamber 71 may decrease. A combustion chamber may correspond to a variable region that includes a swept volume on either side of piston 50, and which may be compressed as the piston moves from one end of the cylinder to the opposite end of the cylinder. A swept volume may be defined as the volume displaced by piston 50 during at least a part of its reciprocating motion in cylinder 12. Total volume of a cylinder may equal swept volume plus clearance volume.

The second operation mode may involve a process of starting engine 10. Starting engine 10 according to the second operation mode may include initiating compression and ignition phases in engine 10. Power system 1 may be configured to move piston 50 to an opposite side of cylinder 12 to enable an intake phase to proceed. For at least a portion of a time when piston 50 is in the south side of cylinder 12, an opening 44 in piston rod portion 42 may be exposed to combustion chamber 71. Air supplied to engine 10 through inlet opening 29 may be communicated with combustion chamber 71. Air may travel from inlet opening 29 through an opening 45 in piston rod portion 42. Air may travel through a passageway in piston rod portion 42 to opening 44. Air may be supplied into combustion chamber 71 from opening 44. When air is supplied to engine 10, air may be communicated with regions 65 and 67 (see FIG. 4) at different stages of the stroke of piston 50.

At the outset of the second operation mode, for example in FIG. 12A, it may be determined that piston 50 is in a region of cylinder 12. Piston 50 may be determined to be in one half of cylinder 12, e.g., either the north side or south side. In response to a condition being satisfied, such as that piston 50 is on one side of cylinder 12, the second operation mode may start, and an action may be triggered to move piston 50 toward an opposite side of cylinder 12. Due to motion of piston 50, and thus piston rod 40, it may be ensured that at least some air is drawn into cylinder 12. Valves may be configured such that air is communicated into a respective combustion chamber of engine 10 only when piston 50 is on one side or the other of the cylinder midpoint. Engine 10 may comprise a sliding action valve. The sliding action valve may be constituted by piston 50, piston rod 40, and engine heads that bound cylinder 12. In some embodiments, when piston 50 is in the south side of cylinder 12, air flows into a first combustion chamber. When piston 50 is in the north side of cylinder 12, air flows into a second combustion chamber. With at least some air intake having occurred and some air being in a combustion chamber, compression may then occur.

A compression phase may begin when piston 50 moves to a position such that exhaust openings 18 are covered. Compression may begin when a combustion chamber becomes sealed to the exterior, and thus gases within the combustion chamber may be compressed as piston 50 moves to reduce the volume of the combustion chamber.

Figure 12B:
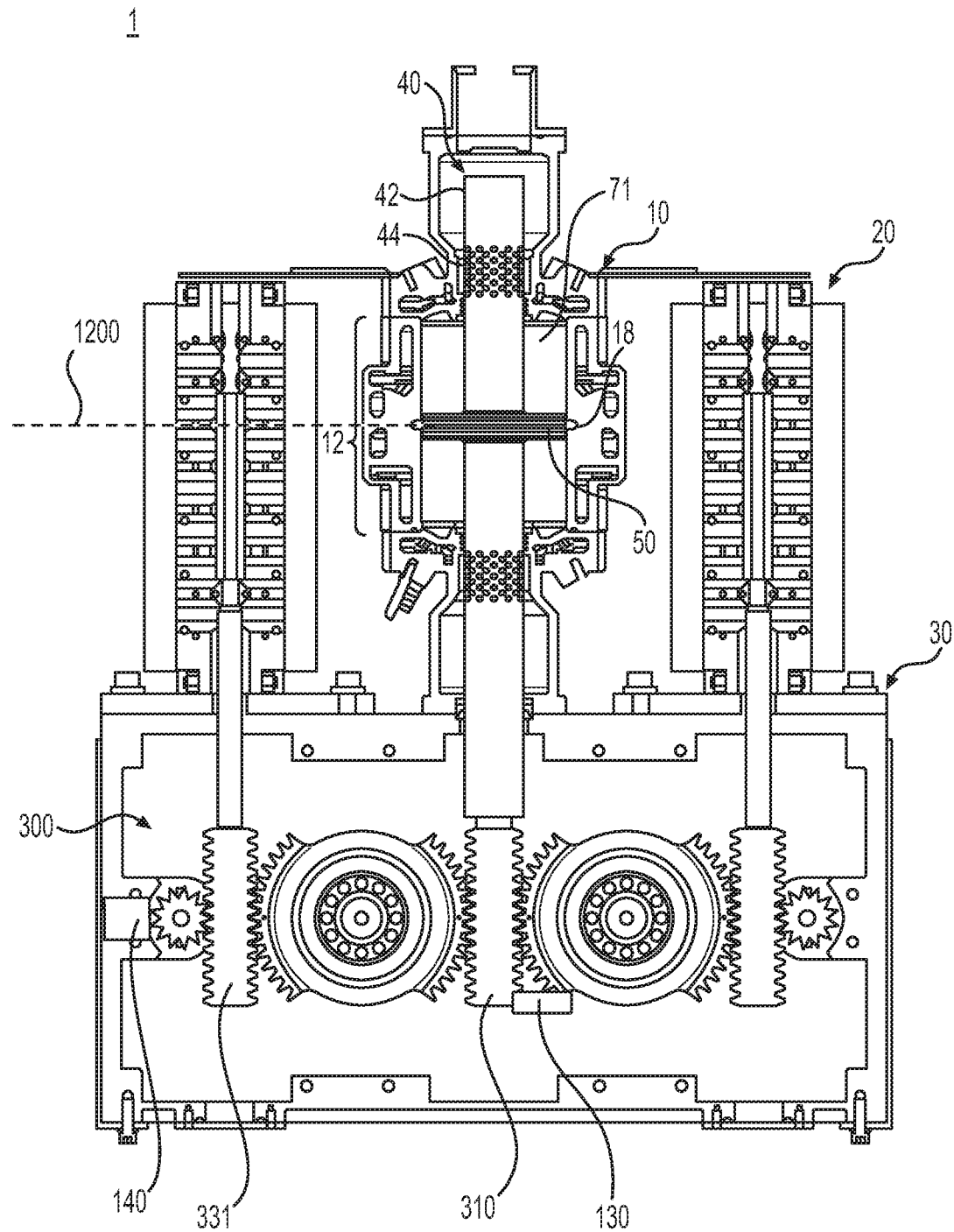

FIG. 12B is a schematic representation of operating power system 1 in the second operation mode in a state where a compression stage in combustion chamber 71 may be beginning. Piston 50 may be at a midpoint of cylinder 12, and exhaust openings 18 may be fully covered by piston 50. A line 1200 may represent the midpoint of cylinder 12. Piston 50 may be aligned with line 1200 such that the axial center of piston 50 coincides with line 1200. At this position, opening 44 of piston rod portion 42 may be outside cylinder 12. The position shown in FIG. 12B may correspond to a condition that the rack 310 of actuator 300 transitions from overlapping with sensor 130 to not overlapping with sensor 130. In such a condition, output of sensor 130 may change from 1 to 0.

As discussed above, power system 1 may be configured to perform an action in response to a first condition being satisfied in the second operation mode, the first condition being that rack 310 and sensor 130 overlap. The action may be that actuator 300 is moved to cause rack 310 to move upward. Due to the action of moving rack 310, and thus piston 50, upward, a compression phase may begin in combustion chamber 71. Next, further actions may be performed in response to other conditions being met.

Power system 1 may be configured to perform an action in response to a second condition being satisfied in the second operation mode. The second condition may be based on output of the first sensor. The second condition may be that rack 310 and sensor 130 change from overlapping to not overlapping, or change from not overlapping to overlapping. The second condition may be that output of sensor 130 changes. The output of sensor 130 may change from 1 to 0 or from 0 to 1 to indicate that piston 50 has reached a predetermined position in cylinder 12, which may be the cylinder midpoint. The action in response to the second condition being met may be that actuator 300 is continued to be moved to cause rack 310 to keep moving in the second direction. The action may be to continue operating energy transformer 20 to supply power to actuator 300. In some embodiments, the action may be to allow piston 50 to continue moving. Piston 50 may have momentum from a previous movement, such as externally supplied energy from energy transformer 20 or internally generated combustion. Allowing piston 50 to continue moving may comprise reducing a level of resistance in energy transformer 20.

Figure 12C:
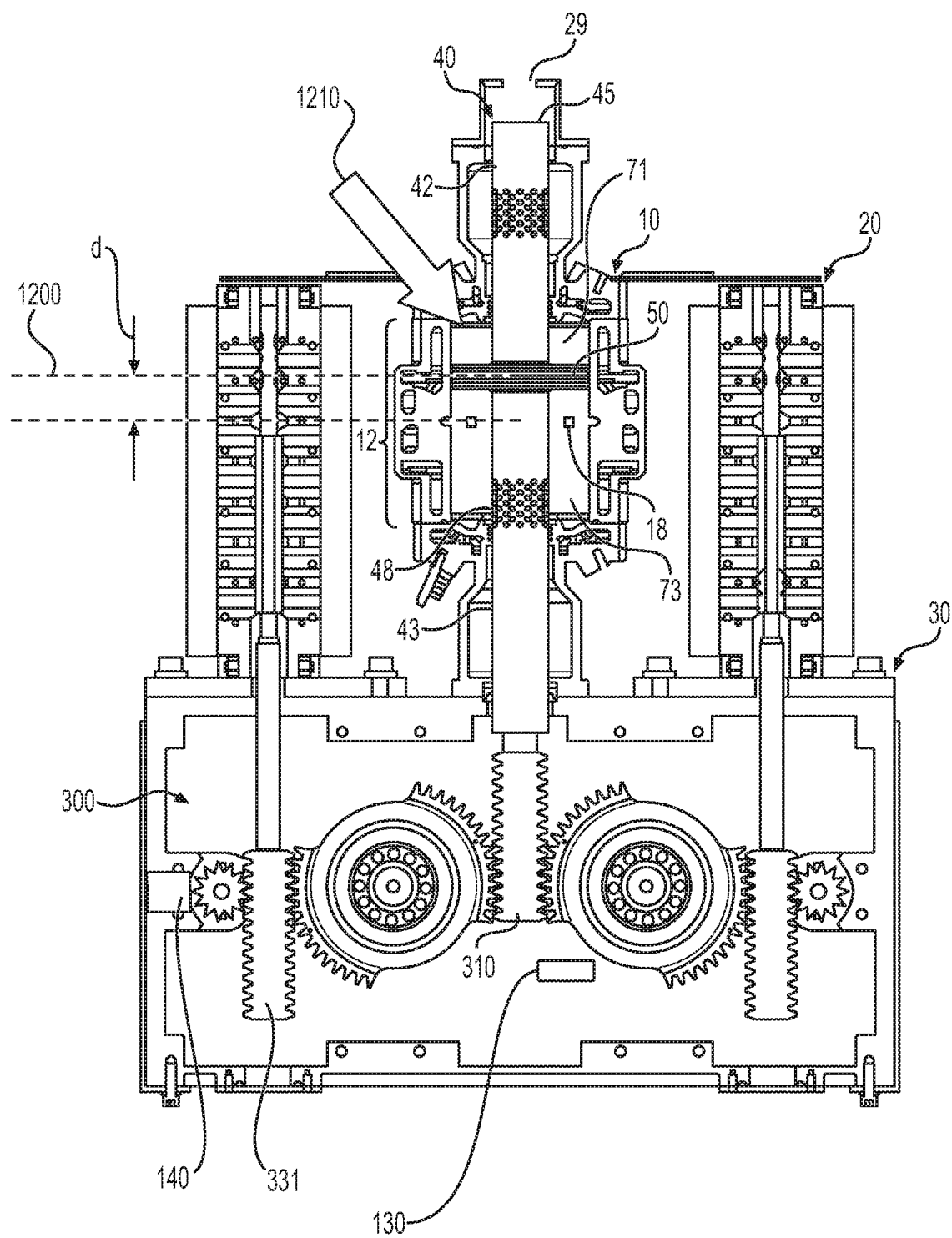

Power system 1 may be configured to perform an action in response to a third condition being satisfied in the second operation mode. The third condition may be based on output of a second sensor, such as sensor 140. The third condition may be that piston 50 has moved a certain distance beyond a position where rack 310 and sensor 130 change from overlapping to not overlapping, e.g., a certain distance beyond the cylinder midpoint. A distance piston 50 has moved may correspond to distance "d" as shown in FIG. 12C. Distance d may be measured from line 1200 to the axial center of piston 50.

FIG. 12C is a schematic representation of continuing to operate power system 1 in the second operation mode. At the point illustrated in FIG. 12C, piston 50 has moved distance d from line 1200. In the second operation mode, when d becomes equal to a predetermined value, fuel injection may occur. The predetermined value may correspond to a predetermined number of teeth of trigger disk 145. The predetermined number of teeth of trigger disk 145 may correspond to a value Y1, which may be set in advance. As shown in FIG. 12C, fuel 1210 may be injected into cylinder 12 in combustion chamber 71. Controller 90 may cause one of fuel injectors 34 (see FIG. 3) to inject a predetermined amount of fuel. The amount of fuel may be determined based on an amount of air flowing into cylinder 12 and a compression ratio, which may be determined based on output from sensors, for example.

The third condition may be based on both output from the first sensor and the second sensor. The third condition may be that output of sensor 140 is determined to be at least Y1 after a point where output of sensor 130 changes. For example, the third condition may be that sensor 140 detects Y1 increments of trigger disk 145, which may correspond to piston 50 having moved a certain distance, after output of sensor 130 transitions from 1 to 0, indicating that piston 50 has crossed the midpoint of cylinder 12.

It may be determined that piston 50 has moved a sufficient distance such that air contained in combustion chamber 71 has been compressed to allow fuel to be added to combustion chamber 71. Fuel may be added to combustion chamber 71 at a point to allow for optimal mixing to create a fuel-air mixture.

In some embodiments, the third condition may be based on sensor output or a duration of time. Power system 1 may be configured to determine a timing of fuel injection. The timing of fuel injection may be relative to a reference point. For example, power system 1 may be configured to inject fuel into combustion chamber 71 in cylinder 12 a predetermined time after piston 50 reaches a point where output of sensor 130 changes from 1 to 0. The timing of fuel injection may be based on other factors, such as piston speed, engine speed (e.g., a rate of reciprocation of an oscillating mass, such as rpm, or Hz), etc.

Figure 12D:
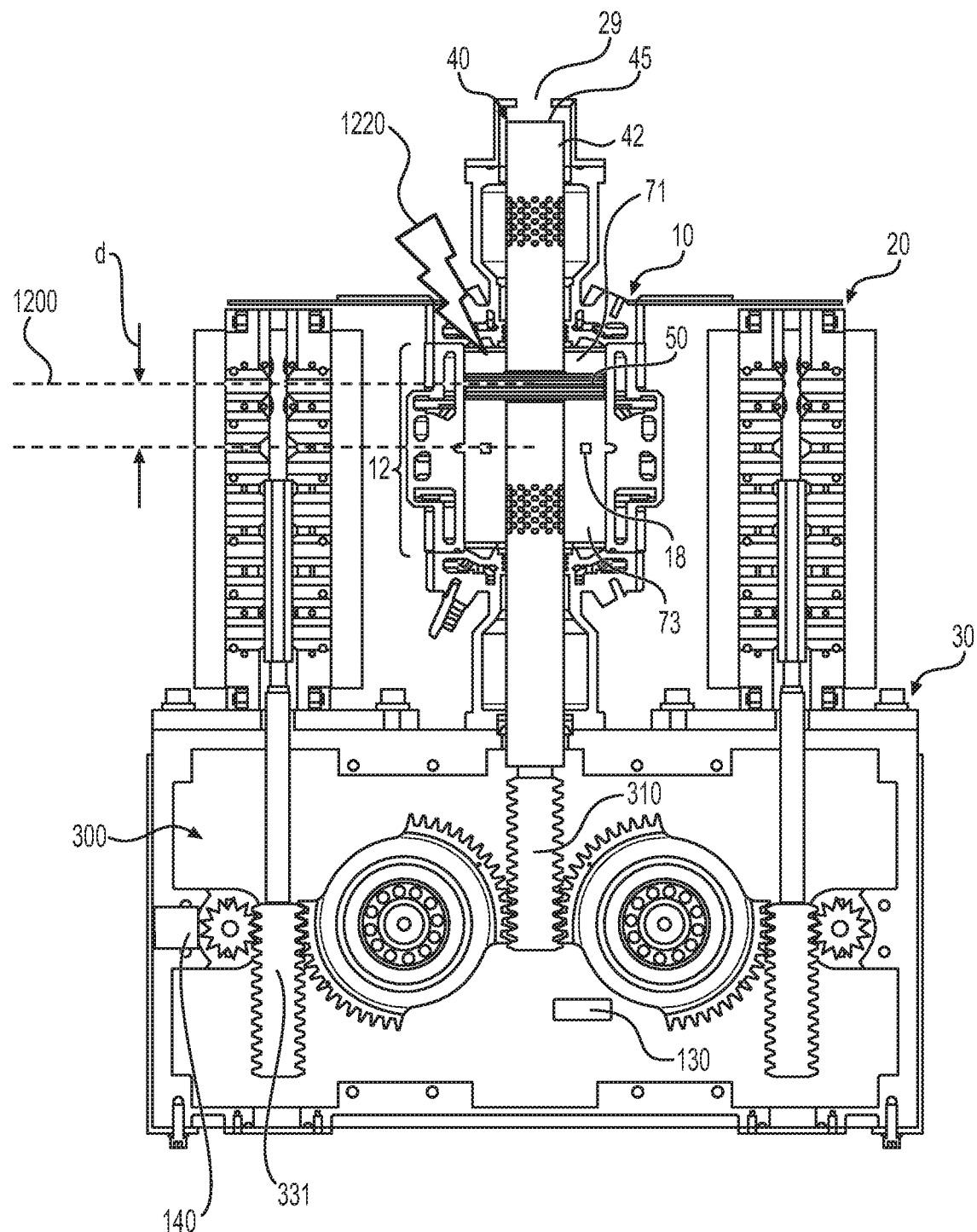

FIG. 12D is a schematic representation of continuing to operate power system 1 in the second operation mode. At the point illustrated in FIG. 12D, piston 50 has moved further past line 1200 as compared to FIG. 12C. Piston 50 may continue to move until a combustion point at which a combustion phase in combustion chamber 71 may begin. When distance d becomes greater than or equal to a predetermined value, such as Y2, ignition may occur. Y2 may be greater than Y1. When distance d becomes greater than or equal to Y2, a spark 1220 may be initiated in cylinder 12 in combustion chamber 71. Controller 90 may cause one of spark plugs 38 (see FIG. 3) to fire. Thus, an expansion phase (also called a combustion phase) may begin. Upon entering the expansion phase, the direction of motion of piston 50 may be changed. The direction of motion of piston 50 may be reversed. The position illustrated in FIG. 12D may correspond to the end of a compression phase in combustion chamber 71.

In some embodiments, determining to initiate a spark in cylinder 12 may be based on sensor output or a duration of time. Power system 1 may be configured to determine a timing of ignition. The timing of ignition may be relative to a reference point. Power system 1 may be configured to cause ignition in combustion chamber 71 a predetermined time after piston 50 reaches a point where output of sensor 130 changes from 1 to 0. The timing of ignition may be later than that of fuel injection.

It will be understood that operation in the second operation mode may occur in an orientation different than, including opposite to, the above. For example, instead of piston 50 traveling in a stroke from the south side to the north side of cylinder 12, piston 50 may travel from the north side to the south side. An "A-position" in the second mode may refer to the situation where an initial position of piston 50 is in the south side of cylinder 12, for example as shown in FIG. 12A. The A-position may correspond to sensor output of sensor 130 of 1 (e.g., rack 310 overlapping with sensor 130). A "B-position" in the second mode may refer to the situation where an initial position of piston 50 is in the north side of cylinder 12. The B-position may correspond to sensor output of sensor 130 of 0 (e.g., rack 310 not overlapping with sensor 130). Operational parameters may be determined based on an initial position of piston 50. For example, different values may be used for determining when to initiate injection or combustion. When piston 50 begins in the A-position, a value of distance d used for determination for injection may be a value Y1. Furthermore, a value of distance d used for determination for combustion may be a value Y2. When piston 50 begins in the B-position, a value of distance d used for determination for injection may be a value Y3. Furthermore, a value of distance d used for determination for combustion may be a value Y4. In some embodiments, cylinder 12 may be symmetric with respect to line 1200. For example, a distance from line 1200 to a first engine head that bounds one side of cylinder 12 may be equal to a distance from line 1200 to an opposite engine head that bounds the other side of cylinder 12. As shown in FIG. 2 and FIG. 3, for example, engine 10 may include similar components, such as fuel injector 34 and spark plug 38 on either side of cylinder 12. Absolute values of sensor output may be used for determination. Thus, in some embodiments, Y1 and Y3 may be equal, and Y2 and Y4 may be equal.

It will also be understood that when motion of power system 1 is reversed as compared to FIGS. 12A-12D, air intake may occur through different components of engine 10. For example, power system 1 may be configured to move piston 50 from the north side of cylinder 12 to an opposite side (e.g., the south side) of cylinder 12 to enable an intake phase to proceed. For at least a portion of a time when piston 50 is in the north side of cylinder 12, an opening 48 in piston rod portion 43 may be exposed to a second combustion chamber 73 (see FIG. 12C). Air supplied to engine 10 through inlet opening 29 may be communicated with combustion chamber 73. Air may travel from inlet opening 29 through opening 45 in piston rod portion 42. Air may travel through a passageway in piston rod portion 42 that extends through piston 50 and through piston rod portion 43 to opening 48. Air may be supplied into combustion chamber 73 from opening 48.

Power system 1 may be configured to perform an action in response to a fourth condition being satisfied in the second operation mode. The fourth condition may be based on output of the second sensor. The action may be to initiate ignition in a combustion chamber, such as combustion chamber 71. The fourth condition may be based on a period of time after which the third condition is satisfied. The fourth condition may be based on output of the second sensor relative to a point after which the third condition is satisfied.

In some embodiments, the fourth condition may be based on both output from the first sensor and the second sensor.

At the point illustrated in FIG. 12D, the distance d that piston 50 has moved from line 1200 is greater than that in FIG. 12C. In the second operation mode, when d becomes equal to a predetermined value, ignition may occur. The predetermined value may correspond to a predetermined number of teeth of trigger disk 145. The predetermined number of teeth of trigger disk 145 may correspond to a value Y2, which may be set in advance. In some embodiments, ignition may be triggered based on a predetermined time interval after the third condition or second condition is met. As shown in FIG. 12D, spark 1220 may be initiated in cylinder 12 in combustion chamber 71. Controller 90 may cause spark plug 28 (see FIG. 3) to fire.

The fourth condition may be based on both output from the first sensor and the second sensor. The fourth condition may be that output of sensor 140 is determined to be at least Y2 after the point where output of sensor 130 changes. For example, the fourth condition may be that sensor 140 detects Y2 increments of trigger disk 145, which may correspond to piston 50 having moved a certain distance, after output of sensor 130 transitions from 1 to 0, indicating that piston 50 has crossed the midpoint of cylinder 12.

It may be determined that piston 50 has moved to a point such that a compression ratio in combustion chamber 71 is appropriate for combustion. The point may be determined in consideration of optimal conditions for starting engine 10. The third condition and the fourth condition may be determined in consideration of optimal starting conditions. For example, conditions may be set such that engine 10 operates with a rich air-fuel mixture so as to ease starting.

FIG. 12E is a chart showing an operation of power system 1 according to the second operation mode. The chart of FIG. 12E may represent a control routine that controller 90 is programmed to execute. As shown in FIG. 12E, the state of "1" of the energy transformer may correspond to setting the energy transformer to power supply mode. An injection state of 1 may indicate that fuel injection is allowed (e.g., fuel injectors are allowed to operate to inject fuel). An ignition state of 1 may indicate that ignition is allowed (e.g., spark plugs are allowed to fire).

Power system 1 may be configured to perform actions in response to conditions being satisfied in the second mode. As shown in FIG. 12E, there may be a first condition corresponding to an initial A-position of engine 10. There may be a second condition corresponding to an initial B-position of engine 10. The first and second conditions may be based on output of the first sensor, which may be sensor 130. When the first condition is satisfied (e.g., that sensor 130 output is 0), an instruction may be issued to move piston 50 from a point where sensor 130 output is 0 to a point where sensor 130 output is 1. For example, energy transformer 20 may input power into actuator 300 so that rack 310 undergoes movement tending to cause piston 50 to move from the south side of cylinder 12 to the north side.

Power system 1 may be configured to perform actions such as injection and ignition based on output from the second sensor. Output of the second sensor may be determined as "Y," as shown in FIG. 12E. When Y reaches certain values, such as Y1, Y2, Y3, Y4, as discussed above, certain actions may be performed. As a result of performing processing consistent with FIG. 12E, an engine may be started from a stationary state, and combustion may proceed. Processing consistent with FIG. 12E may be performed after processing consistent with FIG. 10C.

In some embodiments, a state of "0" of the energy transformer may be used, which may correspond to setting the energy transformer to an off state. In the state of 0, the energy transformer may cease to provide energy input to actuator 300. Piston 50 may be caused to move due to combustion alone.

Figure 12F:
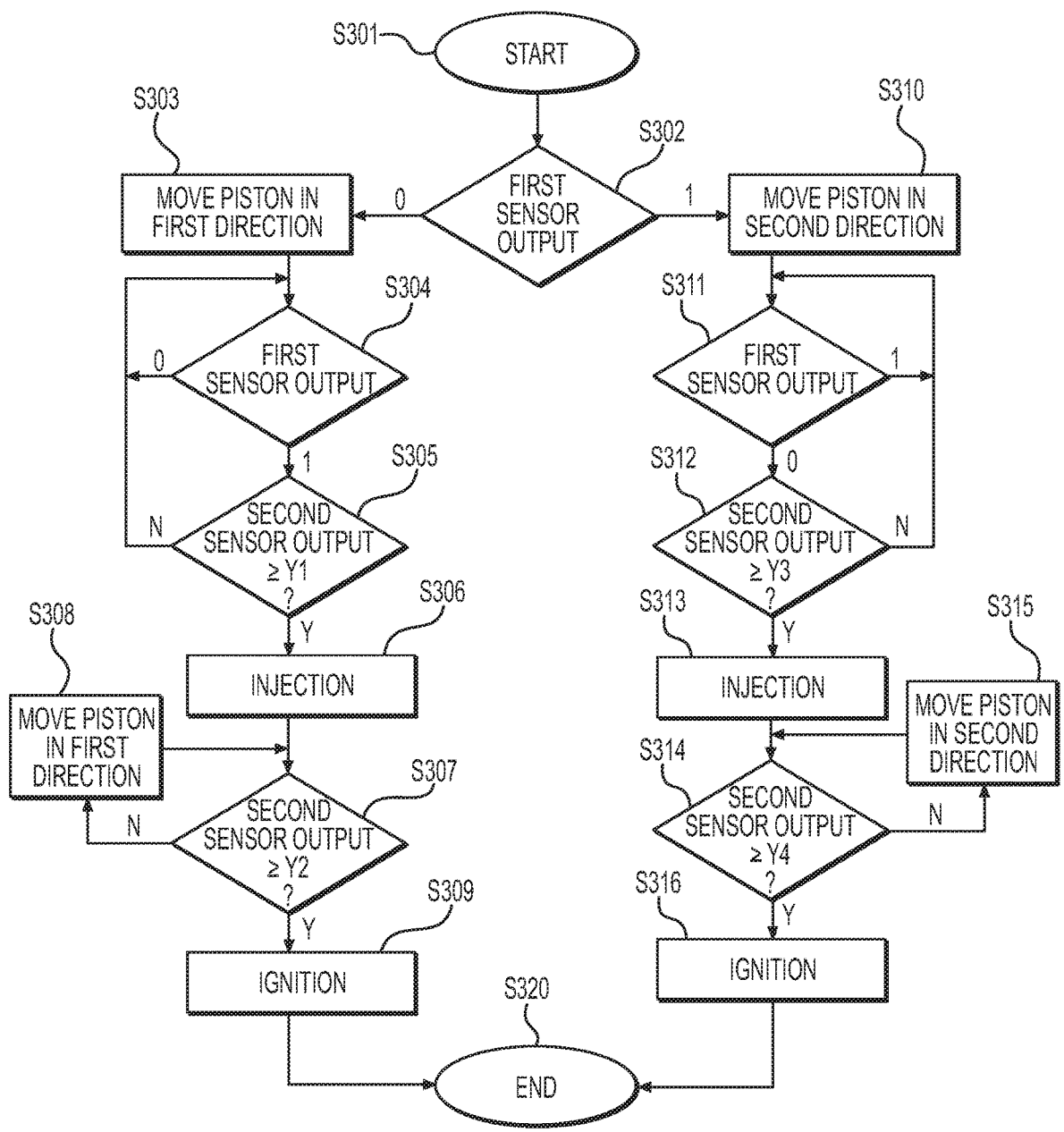
FIG. 12F is a flow chart representing a second operational mode, in accordance with embodiments of the present disclosure.

FIG. 12F is a flowchart illustrating a control routine consistent with the second operation mode. FIG. 12F may be another representation of operation of power system 1 according to the second operation mode. The control routine may be executed continuously. After ending the processing of the control routine of FIG. 12F, subsequent processing may be executed. In some embodiments, the process may return to the start and repeat.

In FIG. 12F, a control routine begins at step S301. At step S302, a determination may be made based on first sensor output. The first sensor output may refer to output of a first position sensor or its associated circuit. The first position sensor may include sensor 130. When it is determined that first sensor output is 0 at step S302, the routine may proceed to step S303. First sensor output of 0 may correspond to rack 310 not overlapping with sensor 130. On the other hand, when it is determined that first sensor output is 1 at step S302, the routine may proceed to step S310. First sensor output of 1 may correspond to rack 310 overlapping with sensor 130.

At step S303, a power system may be actuated such that a piston moves in a first direction. Step S303 may include causing energy transformer 20 to move actuator 300 such that piston 50 moves in a first direction. The first direction may correspond to a downward direction in the views of, for example, FIGS. 12A-12D. At step S310, the power system may be actuated such that the piston moves in a second direction. The second direction may be opposite to the first direction. The second direction may correspond to an upward direction in the views of, for example, FIGS. 12A-12D. After step S303 or step S310, the routine may proceed to a respective branch of processing.

Continuing from step S303, at step S304, a determination may be made based on first sensor output. It may be determined whether first sensor output is still 0, and if so, the routine may return and repeat step S303. It may also be determined at step S304 that first sensor output is 1. At step S304, it may be determined that first sensor output changed, for example, from 0 to 1. Changeover of output signal of the first sensor may correspond to piston 50 reaching a predetermined point in cylinder 12. The predetermined point may be a midpoint of cylinder 12. After determination in step S304 that first sensor output is 1, the routine may proceed to step S305.

At step S305, a determination may be made based on second sensor output. The second sensor output may refer to output of a second position sensor or its associated circuit. The second position sensor may include sensor 140. When it is determined, for example, that second sensor output is less than a value Y1 at step S305, the routine may return and repeat step S303. Second sensor output of less than Y1 may correspond to piston 50 not having moved at least a distance corresponding to Y1 teeth of trigger disk 145. On the other hand, when it is determined that second sensor output is greater than or equal to Y1 at step S305, the routine may proceed to step S306. Second sensor output of Y1 or more may correspond to piston 50 and thus rack 310 moving at least a known amount. The amount of movement of piston 50 may correspond with reducing a volume of a combustion chamber, and compressing air contained within the combustion chamber.

At step S306, the power system may perform injection. Step S306 may comprise power system 1 issuing an instruction to a fuel injector, such as fuel injector 34 in combustion chamber 71, to inject an amount of fuel. The amount of fuel may be determined based on sensor output, or may be a predetermined amount, for example an amount used for a cold engine starting routine. After step S306, the routine may proceed to step S307.

At step S307, a determination may be made based on second sensor output. A value used for determination in step S307 may be the same or different from that used in step S305. For example, a value Y2 may be used, which is greater than Y1. When it is determined that second sensor output is less than the value Y2 at step S307, the routine may proceed to step S308 and move the piston in the first direction. Step S308 may be similar to step S303. Step S308 may comprise moving the piston an amount less than that in step S303. After step S308, the routine may return to step S307. When it is determined that second sensor output is greater than or equal to Y2 at step S307, the routine may proceed to step S309. Second sensor output of Y2 or more may correspond to piston 50, and thus rack 310, moving at least a known amount. The amount of movement of piston 50 may correspond with reducing a volume of a combustion chamber, and compressing air contained within the combustion chamber further to a point where combustion may be enabled.

At step S309, the power system may perform ignition. Step S309 may comprise power system 1 issuing an instruction to an igniter, such as spark plug 28 in combustion chamber 71, to fire. Step S309 may include turning off energy transformer 20 such that it does not work against the motion of piston 50 following combustion. After step S309, the routine may proceed to step S320, where processing may end.

In steps S303, S308, S310, and S315, power system 1 may be configured to drive piston 50 using energy transformer 20. Output of energy transformer 20 may be limited, and thus, an amount of compression achievable in the combustion chamber in the second mode may be limited to a certain amount. Nevertheless, some compression sufficient to enable combustion may still be achievable. The value Y2 or Y4 may be determined based on a maximum amount of compression achievable by energy transformer 20.

Steps S310 to S316 may be similar to steps S303 to S309 except that a direction of motion is different, and sensor output may be correspondingly reversed. Second sensor output may be based on an absolute value of movement. For example, Sensor 140 may be configured to count a number of increments, such as a number of teeth of trigger disk 145 that move past sensor 140, regardless of the direction of movement. The value Y1 or Y2 may be equal to Y3 or Y4, respectively.

After step S309 or step S316, the routine may proceed to step S320 where the process may end. Following step S320, the routine may start over at step S301.

Repetition of the routine of FIG. 12F may be beneficial to build up speed in piston 50 and enable enhanced engine start up. From a stationary condition, energy transformer 20 may be able to generate only a relatively small amount of compression in cylinder 12. However, each time the routine is repeated, piston 50 may build momentum and a greater amount of compression may be achieved, thus enabling stronger combustion. For example, after a first cycle, piston 50 may change (e.g., reverse) direction due to combustion. Power system 1 may continue to be operated in the second operation mode. In the next cycle, energy transformer 20 may again move piston 50 using electrical energy. Because piston 50 may already be moving due to combustion, energy transformer 20 works to assist the motion of piston 50. With each stroke, as piston speed increases, greater compression may be achieved. With greater piston speed, efficiency may also be enhanced. At a point, engine 10 may be able to self-sufficiently run using only combustion and no electrical assist.

For each stroke of piston 50, a different value of Y may be used for determination steps. When piston speed is higher, a large value of Y may be used such that piston 50 travels a greater distance in cylinder 12 and achieves higher compression.

Concurrent with the flowchart of FIG. 12F, a routine may be running in the background in which the second sensor, such as sensor 140, is constantly outputting data. Controller 90 may analyze data from the second sensor. Controller 90 may be configured to continuously update a value of Y used for determination steps. Controller 90 may also be configured to determine a most recent measurement of piston speed. Piston speed may be determined by counting a number of increments detected by the second sensor over a time period. The time period may be a predetermined duration. Determination of piston speed may occur when piston 50 reaches a reference point. The determined piston speed may be stored at this time. In some embodiments, the time period may begin upon piston 50 reaching the reference point. In some embodiments, the time period may end upon piston 50 reaching the reference point. The reference point may coincide with a location of sensor 130. Determination of piston speed may occur at a time that first sensor output is detected to have changed. For example, in response to output of sensor 130 transitioning from 1 to 0, or from 0 to 1, controller 90 may be configured to determine piston speed based on output of sensor 140. In some embodiments, piston speed, or other values (such as a motion parameter, as will be discussed below), may be determined when piston 50 reaches a reference point, and the reference point may be variable. Controller 90 may be configured to determine the reference point. For example, controller 90 may be configured to determine that the reference point will be at a location a predetermined time after output of sensor 130 transitions, or at a location displaced from the position of sensor 130, or some arbitrary location. Controller 90 may be configured to determine piston speed after a time delay after the transition of output of sensor 130. The time delay may be a predetermined duration, or may be variable depending on, for example, previously stored piston speed. Controller 90 may also be configured to determine piston speed after a number of increments are detected by sensor 140 after the output of sensor 130 transitions. Controller 90 may update the value of Y while other processing, such as the processing of FIG. 12F, is ongoing.

Reference is now made to FIG. 13, which is a table showing system running conditions for a third mode. The third mode may be an operational mode of running power system 1. The third mode may correspond to an engine running mode. FIG. 13 may indicate parameters for the third mode. In the third mode, a parameter may be set such that injection of fuel to engine 10 is enabled. A parameter may be set such that ignition is enabled by allowing spark plugs of engine 10 to fire. A setting of energy transformer 20 may be set to "generator" mode. For example, energy transformer 20 may be configured to extract power and generate electrical energy from mechanical motion of engine 10.

Figure 14A:
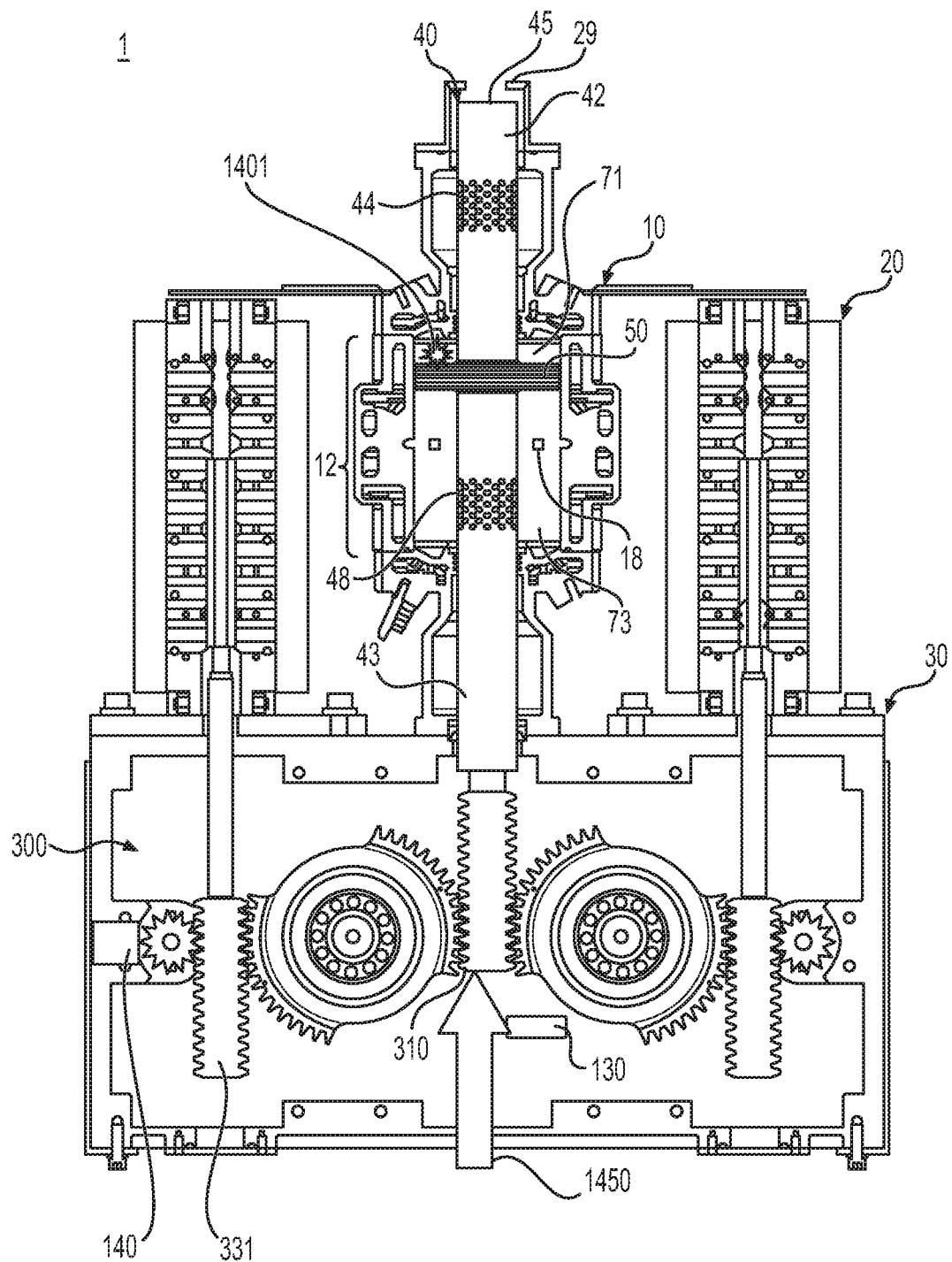
FIGS. 14A-14D are schematic views of a power generation system operating in a third operational mode, according to embodiments of the present disclosure.

FIG. 14A is a schematic representation of operating power system 1 in a third operation mode. Similar to the first and second operation modes, the engine may initially be in a first position or a second position. The position shown in FIG. 14A may be a B-position in the third operation mode. The B-position in the third operation mode may correspond to a condition in which rack 310 of actuator 300 does not overlap with sensor 130. In such a condition, output of sensor 130 may be 0.

In the third operation mode, power system 1 may already be in motion. For example, piston 50 may be in motion due to coming directly from the process of FIGS. 12A-12D. Because piston 50 is already in motion, power system 1 may begin extracting energy from engine 10. Energy transformer 20 may be configured to harvest energy from engine 10 by resisting motion of piston 50 through actuator 300. Energy transformer 20 may be configured to operate with a load. As shown in FIG. 14A, energy transformer 20 may apply a resistive force 1450 acting against the motion of piston 50. For example, piston 50 may be urged to travel in the first direction (e.g., downward in FIG. 14A) by a combustion 1401 occurring in the north side of cylinder 12. Resistive force 1450 may act in the opposite direction to the first direction. Resistive force 1450 may be varied in accordance with engine operating conditions. For example, resistive force 1450 may be determined based on measured speed of piston 50. The measured speed may be determined at a reference point. In some embodiments, resistive force 1450 may be zero so as to not impede motion of piston 50. For example, it may be determined that speed of piston 50 in engine 10 should be increased, and thus, resistance to reciprocating motion of piston 50 should be minimized.

In the third operation mode, power system 1 may be configured to perform an action in response to a first condition being satisfied. The first condition may be that rack 310 and sensor 130 do not overlap. Thus, the first condition may be that output of sensor 130 is 0. The action may be that actuator 300 is moved to cause rack 310 to move in the first direction. In some embodiments, the action may be that actuator 300 is allowed to continue moving. As discussed above, piston 50 may already be in motion due to, for example, combustion 1401 occurring in cylinder 12. Combustion 1401 in combustion chamber 71 may correspond to the end of one stroke of piston 50 and the beginning of another stroke in an opposite direction. Piston 50 may be caused to move downward toward the south side of cylinder 12. When the first condition is satisfied, e.g., that sensor 130 and rack 310 do not overlap, power system 1 may allow piston 50 to continue moving downward.

In the third operation mode, power system 1 may also be configured to apply resistive force against the motion of piston 50. Power system 1 may be configured to resist the motion of an oscillating mass. The oscillating mass may include piston 50, piston rod 40, and moving parts of actuator 300. Because the oscillating mass may be moving under power from engine 10, energy transformer 20 may act to generate electrical power from mechanical motion of engine 10.

As piston 50 moves in cylinder 12, air intake into engine 10 may be carried out. Power system 1 may be configured to move piston 50 to an opposite side of cylinder 12 to enable an intake phase to proceed. As shown in FIG. 14A, for at least a portion of a time when piston 50 is in the north side of cylinder 12, opening 48 in piston rod portion 43 may be exposed to combustion chamber 73. Air supplied to engine 10 through inlet opening 29 may be communicated with combustion chamber 73. Air may travel from inlet opening 29 through opening 45 in piston rod portion 42. Air may travel through a passageway in piston rod portion 42 that extends through piston 50 and through piston rod portion 43 to opening 48. Air may be supplied into combustion chamber 73 from opening 48.

Figure 14B:
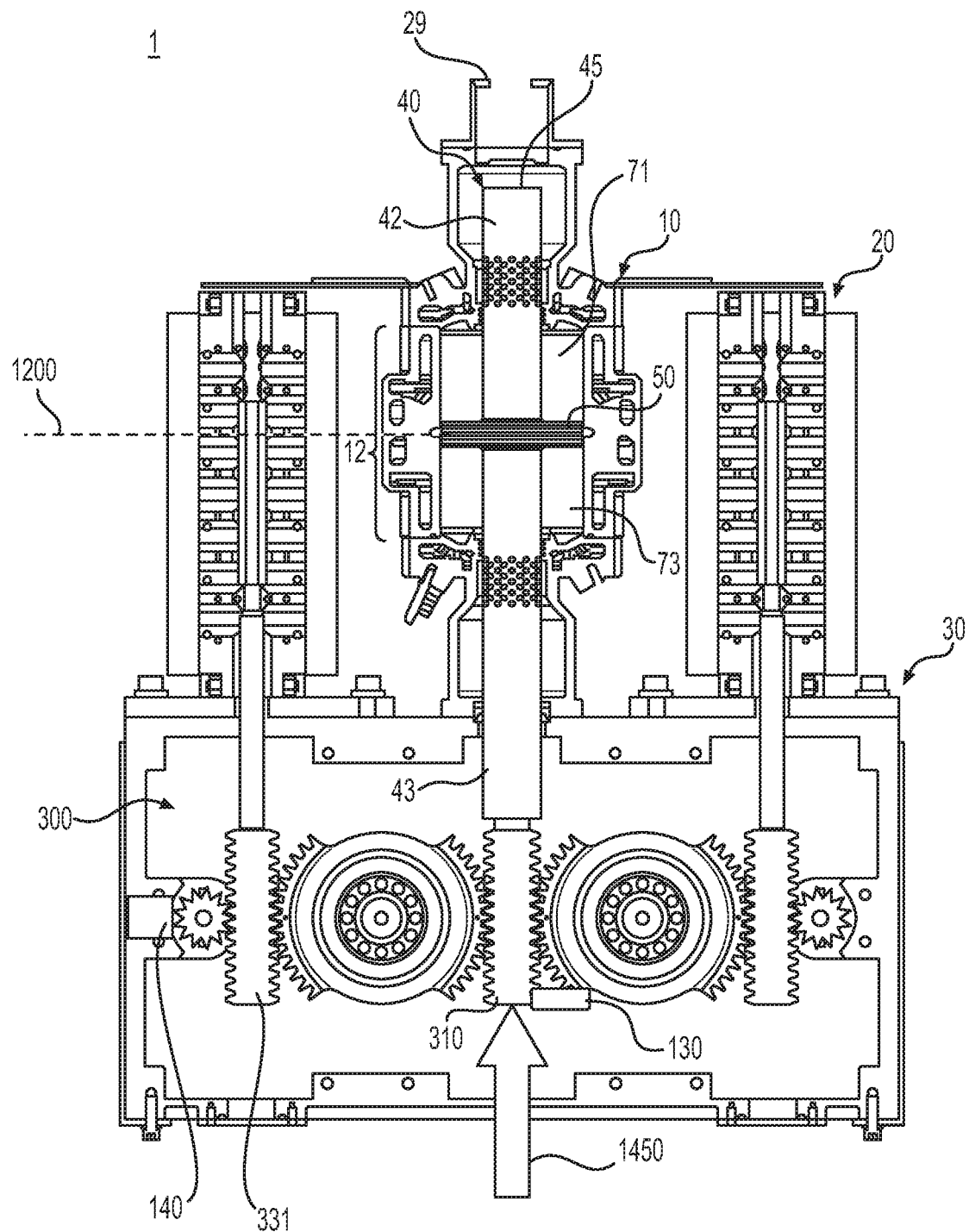

Air may be supplied into combustion chamber 73 until a point where opening 48 is no longer exposed to the interior of cylinder 12. Meanwhile, on an opposite side of piston 50, an expansion phase of combustion chamber 71 may proceed until piston 50 reaches a point where exhaust ports 18 begin to become exposed to combustion chamber 71. As shown in FIG. 14B, piston 50 may reach line 1200, which may correspond to the midpoint of cylinder 12, and exhaust ports 18 may be covered. Thereafter, piston 50 may continue moving and exhaust ports may be exposed. Then, an exhaust phase may begin in combustion chamber 71. The exhaust phase may coincide with a momentum phase. The momentum phase may refer to a phase of operating engine 10 in which piston 50 further travels beyond a predetermined point in cylinder 12. The predetermined point may indicate the end point of the expansion phase. The predetermined point may be the position at which a face of piston 50 moves past exhaust ports 18 thereby exposing at least a portion of an exhaust path towards an outside of cylinder 12. For example, combustion of fuel in combustion chamber 71 may cause piston 50 to move in the first direction (downward in FIG. 14B) in the expansion phase. Piston 50 may have enough energy that it continues to travel beyond exhaust ports 18 even when the expansion phase ends (e.g., even after reaching the predetermined point). Further travel of piston 50 beyond the end of the expansion phase may refer to "overshoot" of piston 50. Piston overshoot may be useful because additional work may be harnessed from engine 10 after the end of an expansion phase. Concurrently with the end of the expansion phase (and beginning of the momentum phase), or shortly before the exhaust phase begins, a compression phase may begin in combustion chamber 73. Momentum of piston 50 in the momentum phase may be useful for compressing gases in combustion chamber 73 on the opposite side of piston 50.

FIG. 14B is a schematic representation of continuing to operate power system 1 in the third operational mode in a state where the compression stage in combustion chamber 73 may be beginning. At this point, piston 50 may be at the midpoint in cylinder 12. The position of piston 50 may be determined by output of sensor 130 changing from 0 to 1. Resistive force 1450 may continue to act in the opposite direction to the first direction and resist the motion of piston 50. At the stage shown in FIG. 14B, resistive force 1450 may be the same magnitude as that in FIG. 14A.

Power system 1 may be configured to perform an action in response to a second condition being satisfied in the third operation mode. The second condition may be based on output of sensor 130 or sensor 140. The action may be that resistive force 1450 is applied by energy transformer 20. The second condition may be that piston 50 is determined to be in motion. The second condition may be based on sensor data from previous cycles. In some embodiments, the second condition may be based on sensor output analyzed in real time. For example, power system 1 may be configured such that sensor 130 or sensor 140 is constantly outputting data that is analyzed by controller 90. Controller 90 may determine that engine 10 has been successfully started under the second operation mode, for example. In some embodiments, controller 90 may determine that engine 10 has been successfully started when sensor output from sensor 130 or sensor 140 indicates that piston 50 is moving with at least a certain speed. Due to the movement of piston 50, a compression phase may proceed in a combustion chamber. Next, further actions may be performed in response to other conditions being met.

In some embodiments, a moving direction of piston 50 may be determined based on previous output of sensor 130. Determination of the moving direction may also be based on current output of sensor 130. For example, it may be determined that piston 50 is moving in the first direction when current output of sensor 130 is 1 and previous output of sensor 130 is 0. It may be determined that piston 50 is moving in the second direction when current output of sensor 130 is 0 and previous output of sensor 130 is 1.

Figure 14C:
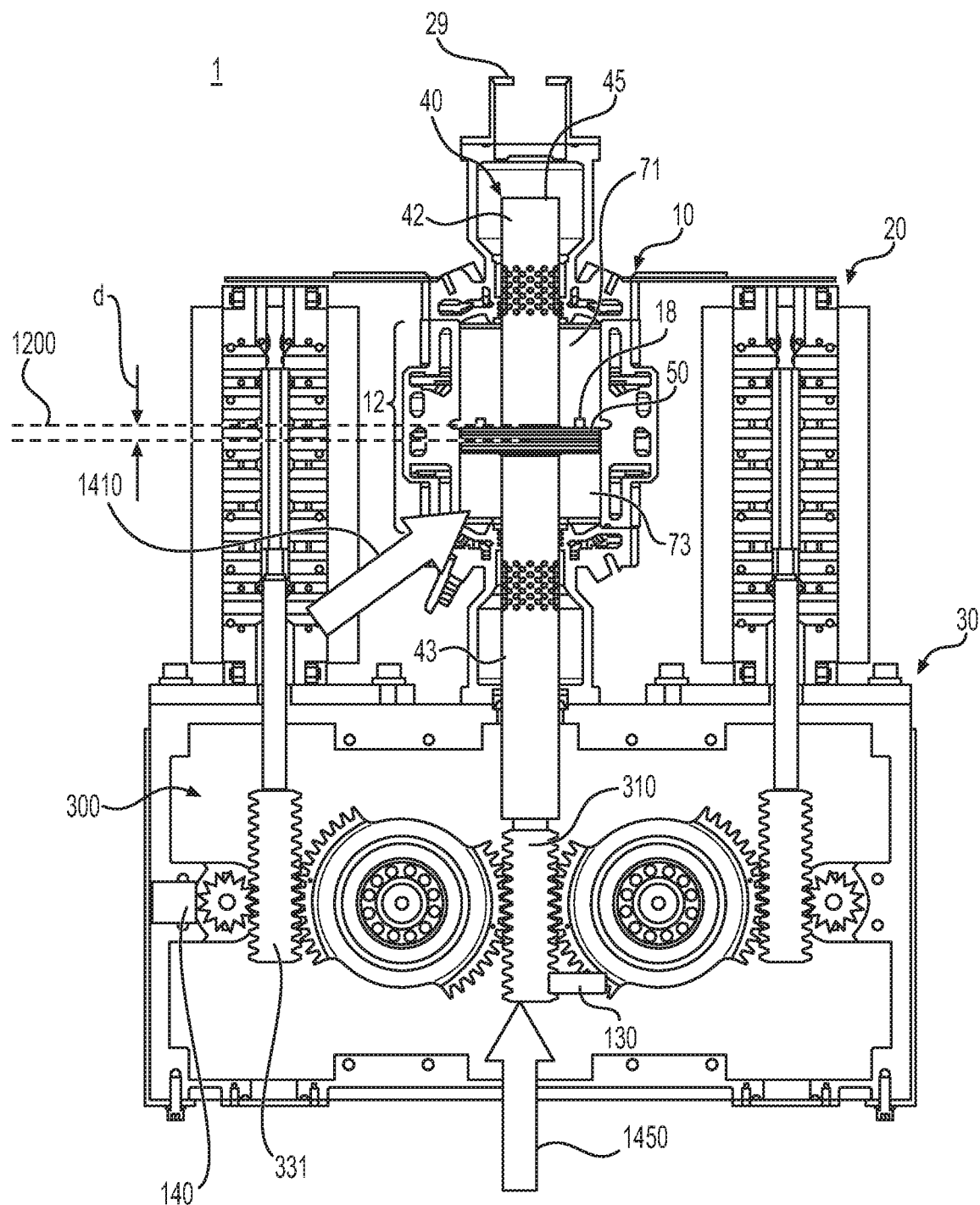

FIG. 14C is a schematic representation of continuing to operate power system 1 in the third operation mode. As piston 50 continues to move in the first direction (downward in FIG. 14C), a momentum phase on a first side of piston 50 (e.g., at combustion chamber 71) may be continuing, and the compression phase on a second side of piston 50 (e.g., the opposite side of piston 50, which may correspond to a location at combustion chamber 73) may be continuing.

At the point illustrated in FIG. 14C, piston 50 has moved distance d from line 1200. Similar to the second operation mode, in the third operation mode, when d becomes equal to a predetermined value, fuel injection may occur. The predetermined value may correspond to a predetermined number of teeth of trigger disk 145. The predetermined number of teeth of trigger disk 145 may correspond to a value Y1, which may be the same or different from that discussed above with respect to the second operation mode. As shown in FIG. 14C, fuel 1410 may be injected into cylinder 12 in combustion chamber 73. Controller 90 may cause one of fuel injectors 34 (see FIG. 3) to inject a predetermined amount of fuel. The amount of fuel may be determined based on an amount of air flowing into cylinder 12 and a compression ratio, which may be determined based on output from sensors, for example. The amount of fuel may be modified based on output from other sensors (e.g., sensor 130 or sensor 140). For example, the amount of fuel may be adjusted based on a determined parameter of piston 50. Resistive force 1450 may continue to act in the opposite direction to the first direction and resist the motion of piston 50. At the stage shown in FIG. 14C, resistive force 1450 may be the same magnitude as that in FIG. 14A, or the same magnitude as that in FIG. 14B.

Power system 1 may be configured to perform an action in response to a third condition being satisfied in the third operation mode. The third condition may be based on output of a second sensor, such as sensor 140. The third condition may be that piston 50 has moved a certain distance beyond a position where rack 310 and sensor 130 change from overlapping to not overlapping, e.g., a certain distance beyond the cylinder midpoint. In some embodiments, the third condition may be based on both output from the first sensor and the second sensor. The third condition may be that output of sensor 140 is determined to be at least Y1 after a point where output of sensor 130 changes. For example, the third condition may be that sensor 140 detects Y1 increments of trigger disk 145, which may correspond to piston 50 having moved a certain distance, after output of sensor 130 transitions from 1 to 0, indicating that piston 50 has crossed the midpoint of cylinder 12.

It may be determined that piston 50 has moved a sufficient distance such that air contained in combustion chamber 73 has been compressed to allow fuel to be added to combustion chamber 73. Fuel may be added to combustion chamber 73 at a point to allow for optimal mixing to create a fuel-air mixture. The value Y1 may be determined as a point for optimal mixing that may be based on engine running conditions. The value Y1 may be determined based on a map.

Figure 14D:
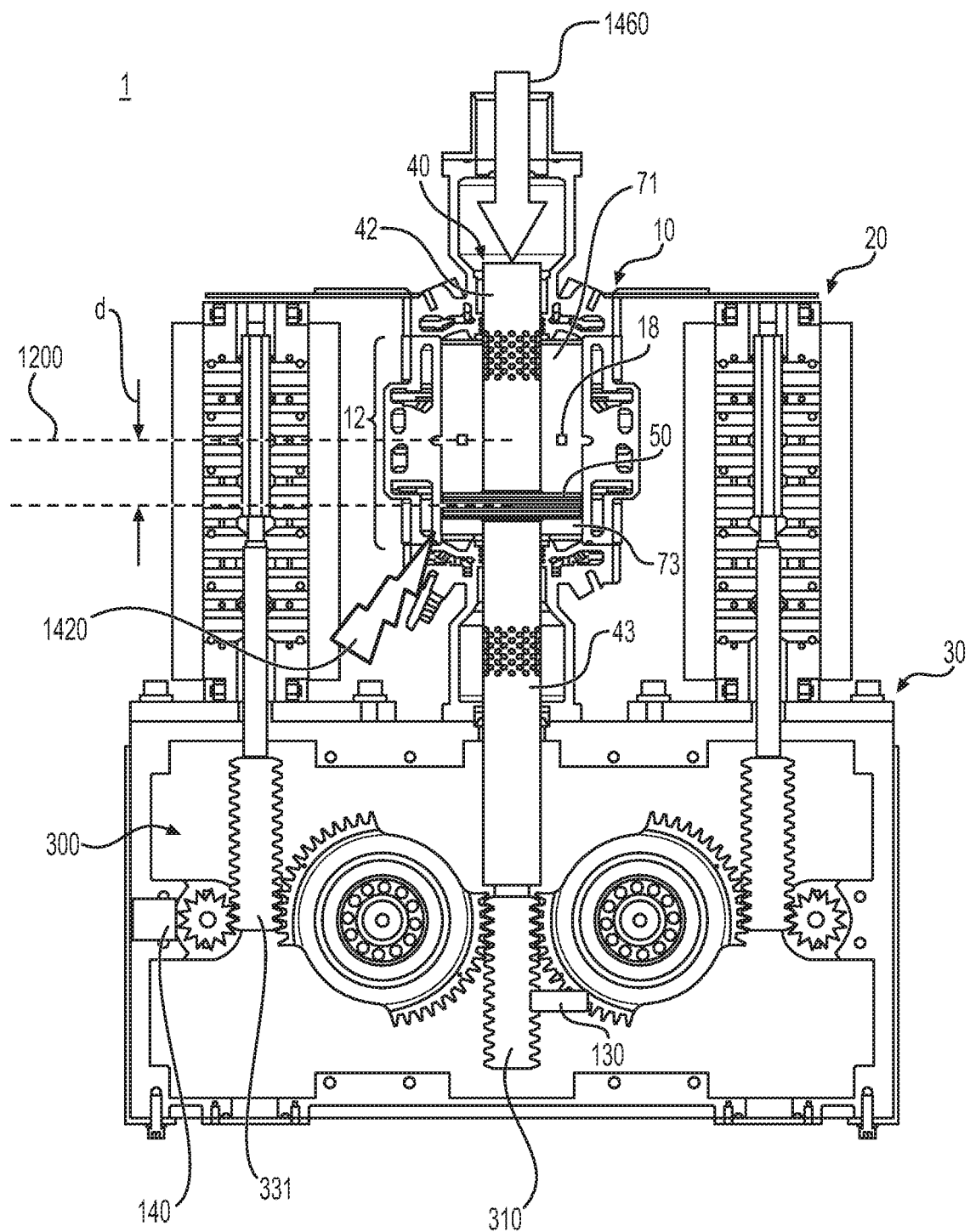

FIG. 14D is a schematic representation of continuing to operate power system 1 in the third operation mode. At the point illustrated in FIG. 14D, piston 50 has moved further past line 1200 as compared to FIG. 14C. Piston 50 may continue to move until a combustion point at which a combustion phase in combustion chamber 73 may begin. When distance d becomes greater than or equal to a predetermined value, such as Y2, ignition may occur. Y2 may be greater than Y1. When distance d becomes greater than or equal to Y2, a spark 1420 may be initiated in cylinder 12 in combustion chamber 73. Controller 90 may cause one of spark plugs 38 (see FIG. 3) to fire. Thus, an expansion phase may begin in combustion chamber 73. Upon entering the expansion phase, the direction of motion of piston 50 may be changed. The direction of motion of piston 50 may be reversed. The position illustrated in FIG. 14D may correspond to the end of a compression phase in combustion chamber 73. Along with applying spark 1420, resistive force 1450 may be turned off. Concurrently, a resistive force 1460 may begin to be applied that is in a direction opposite to that of resistive force 1450.

It will be understood that operation in the third operation mode may occur in an orientation different from, including opposite to, the above. For example, instead of piston 50 traveling in a stroke from the north side to the south side of cylinder 12, piston 50 may travel from the south side to the north side. An "A-position" in the third mode may refer to the situation where an initial position of piston 50 is in the south side of cylinder 12, for example as shown in FIG. 14D. The A-position may correspond to sensor output of sensor 130 of 1 (e.g., rack 310 overlapping with sensor 130). A "B-position" in the third mode may refer to the situation where an initial position of piston 50 is in the north side of cylinder 12, for example as shown in FIG. 14A. The B-position may correspond to sensor output of sensor 130 of 0 (e.g., rack 310 not overlapping with sensor 130). Operational parameters may be determined based on an initial position of piston 50. For example, different values may be used for determining when to initiate injection or combustion. When piston 50 begins in the A-position, a value of distance d used for determination for injection may be a value Y1. Furthermore, a value of distance d used for determination for combustion may be a value Y2. When piston 50 begins in the B-position, a value of distance d used for determination for injection may be a value Y3. Furthermore, a value of distance d used for determination for combustion may be a value Y4. In some embodiments, cylinder 12 may be symmetric with respect to line 1200. Absolute values of sensor output may be used for determination. Thus, in some embodiments, Y1 and Y3 may be equal, and Y2 and Y4 may be equal.

It will also be understood that when motion of power system 1 is reversed as compared to FIGS. 14A-14D, air intake may occur through different components of engine 10.

Power system 1 may be configured to perform an action in response to a fourth condition being satisfied in the third operation mode, similar to the second operation mode. The fourth condition may be based on output of the second sensor, such that distance d becomes equal to a predetermined value. The action may be to initiate ignition in a combustion chamber, such as combustion chamber 73.

In the third operation mode, it may be determined that piston 50 has moved to a point such that a compression ratio in combustion chamber 71 is appropriate for combustion.

The point may be determined in consideration of optimal conditions for stable running of engine 10. The third condition and the fourth condition may be determined in consideration of optimal running conditions. For example, conditions may be set such that engine 10 operates according to a map to maximize power generation. In some embodiments, a map for sustained, long-duration running may be used.

FIG. 14E is a chart showing an operation of power system 1 according to the third operation mode. The chart of FIG. 14E may represent a control routine that controller 90 is programmed to execute. As shown in FIG. 14E, a state of "2" of energy transformer may correspond to setting the energy transformer to a generator mode (e.g., generation of electrical power by extraction of mechanical energy). An injection state of 1 may indicate that fuel injection is allowed (e.g., fuel injectors are allowed to operate to inject fuel). An ignition state of 1 may indicate that ignition is allowed (e.g., spark plugs are allowed to fire).

Power system 1 may be configured to perform actions in response to conditions being satisfied in the third mode. As shown in FIG. 14E, there may be a first condition corresponding to an initial A-position of engine 10. There may be a second condition correspond to an initial B-position of engine 10. The first and second conditions may be based on output of the first sensor, which may be sensor 130. When the first condition is satisfied (e.g., that sensor 130 output is 0), an instruction may be issued to move piston 50 from a point where sensor 130 output is 0 to a point where sensor 130 output is 1. When piston 50 is already moving, the instruction may be ignored. In some embodiments, power system 1 may simply allow engine 10 to continue its current state of motion. For example, no alteration in operation conditions may occur.

There may be a further condition that may be based on output of the first or second sensors. The further condition may indicate that piston 50 is already moving. When the further condition is satisfied (e.g., that sensor 140 detects at least a certain number of increments over a time period), it may be determined that piston 50 is moving with a sufficient speed, and energy transformer 20 may be activated to generate electrical energy by applying a resistive force against the motion of piston 50.

Power system 1 may be configured to perform actions such as injection and ignition based on output from the second sensor. Output of the second sensor may be determined as "Y," as shown in FIG. 14E. When Y reaches certain values, such as Y1, Y2, Y3, Y4, as discussed above, certain actions may be performed. Further control of operations of engine 10, such as determining an amount of fuel to inject, or an amount of load to apply to energy transformer 20 (e.g., affecting resistive force 1450), may be based on determinations occurring at a reference point. As a result of performing processing consistent with FIG. 14E, an engine may be run while electrical energy can be generated. Processing consistent with FIG. 14E may be performed after processing consistent with FIG. 12E.

Figure 14F:
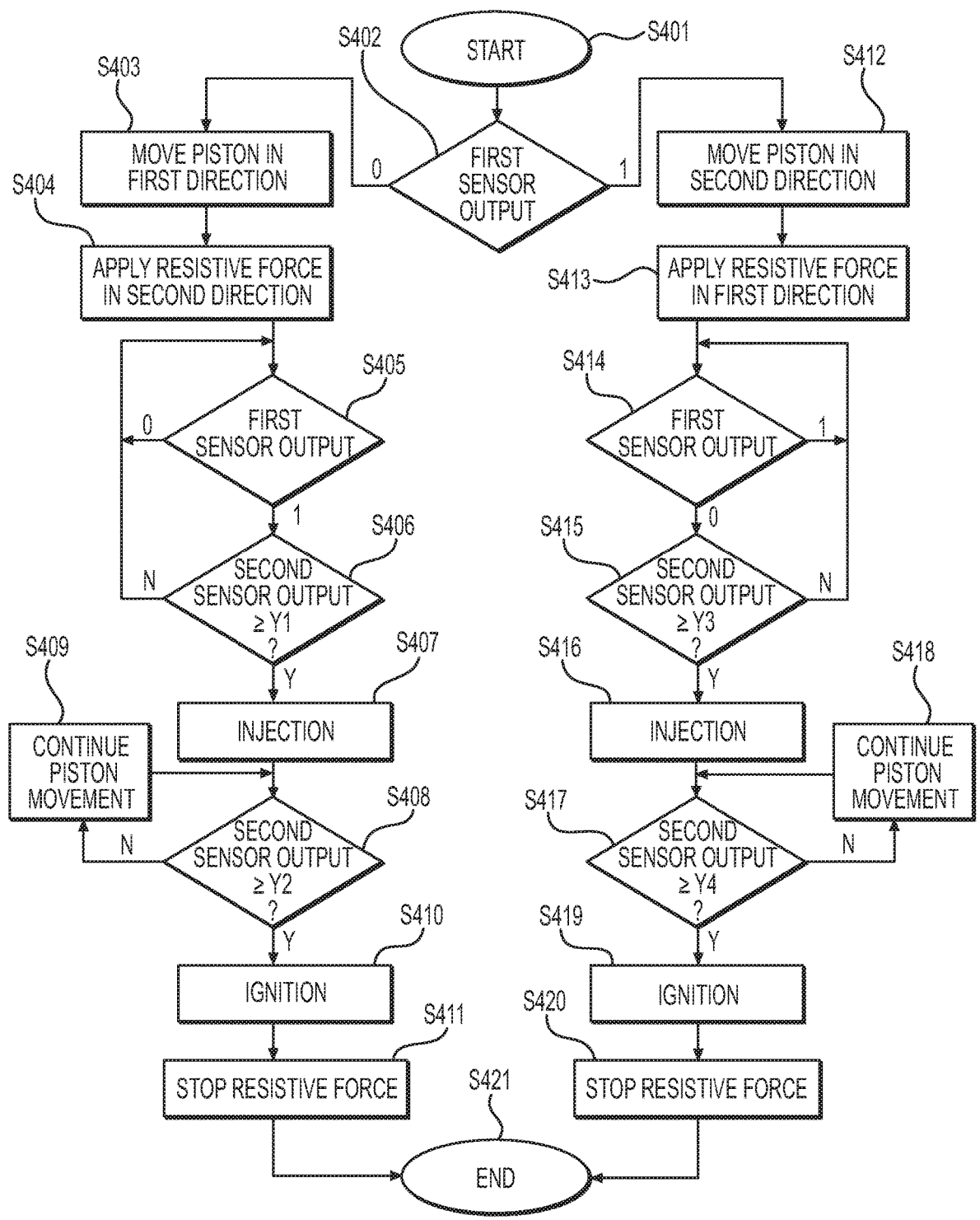
FIG. 14F is a flow chart representing a first operational mode, according to embodiments of the present disclosure.

FIG. 14F is a flowchart illustrating a control routine consistent with the third operation mode. FIG. 14F may be another representation of operation of power system 1 according to the third operation mode. The control routine may be executed continuously. After ending the processing of the control routine of FIG. 14F, subsequent processing may be executed. In some embodiments, the process may return to the start and repeat.

In FIG. 14F, a control routine begins at step S401. Starting the control routine of FIG. 14F may be dependent on a condition that a component of an oscillating mass of an engine is moving with at least a predetermined speed. For example, in response to making a determination, which may be based on output of sensor 140, that piston 50 is moving with at least a certain speed, the control routine may enter step S401. Next, at step S402, a determination may be made based on first sensor output. The first sensor output may refer to output of a first position sensor or its associated circuit. The first position sensor may include sensor 130. When it is determined that first sensor output is 0 at step S402, the routine may proceed to step S403. First sensor output of 0 may correspond to rack 310 not overlapping with sensor 130. On the other hand, when it is determined that first sensor output is 1 at step S402, the routine may proceed to step S412. First sensor output of 1 may correspond to rack 310 overlapping with sensor 130.

At step S403, a power system may be actuated such that a piston moves in a first direction. In some embodiments, step S403 may include allowing piston 50, which is already in motion, to continue to move in the first direction. The first direction may correspond to a downward direction in the views of, for example, FIGS. 14A-14D. At step S412, the power system may be actuated such that the piston moves in a second direction. The second direction may be opposite to the first direction. The second direction may correspond to an upward direction in the views of, for example, FIGS. 14A-14D. After step S403 or step S412, the routine may proceed to a respective branch of processing.

Continuing from step S403, at step S404, a resistive force may be applied in the second direction. Step S404 may comprise applying resistive force 1450 by energy transformer 20. Step S404 may include determining a magnitude of resistive force 1450 based on a motion parameter, such as measured piston speed. The measured piston speed may be determined at a reference point.

Next, at step S405, a determination may be made based on first sensor output. It may be determined whether first sensor output is still 0, and if so, the routine may return and repeat step S405. The routine may repeat step S405 after a predetermined time period. It may also be determined at step S405 that first sensor output is 1. At step S405, it may be determined that first sensor output changed, for example, from 0 to 1. Changeover of output signal of the first sensor may correspond to piston 50 reaching a predetermined point in cylinder 12. The predetermined point may be a midpoint of cylinder 12. After determination in step S405 that first sensor output is 1, the routine may proceed to step S406.

At step S406, a determination may be made based on second sensor output. The second sensor output may refer to output of a second position sensor or its associated circuit. The second position sensor may include sensor 140. When it is determined, for example, that second sensor output is less than a value Y1 at step S406, the routine may return and repeat step S405. The routine may repeat step S405 after a predetermined time period. Second sensor output of less than Y1 may correspond to piston 50 not having moved at least a distance corresponding to Y1 teeth of trigger disk 145. On the other hand, when it is determined that second sensor output is greater than or equal to Y1 at step S406, the routine may proceed to step S407. Second sensor output of Y1 or more may correspond to piston 50 and thus rack 310 moving at least a known amount. The amount of movement of piston 50 may correspond with reducing a volume of a combustion chamber, and compressing air contained within the combustion chamber.

At step S407, the power system may perform injection. Step S407 may comprise power system 1 issuing an instruction to a fuel injector, such as fuel injector 34 in combustion chamber 71, to inject an amount of fuel. The amount of fuel may be determined based on sensor output, or may be a predetermined amount, for example an amount used for a cold engine starting routine. After step S407, the routine may proceed to step S408.

At step S408, a determination may be made based on second sensor output. A value used for determination in step S408 may be the same or different from that used in step S406. For example, a value Y2 may be used, which is greater than Y1. When it is determined that second sensor output is less than the value Y2 at step S408, the routine may proceed to step S409 and the piston may continue to be moved in the first direction. Step S409 may be similar to step S403. After step S409, the routine may return to step S408. When it is determined that second sensor output is greater than or equal to Y2 at step S408, the routine may proceed to step S410. Second sensor output of Y2 or more may correspond to piston 50 and thus rack 310 moving at least a known amount. The amount of movement of piston 50 may correspond with reducing a volume of a combustion chamber, and compressing air contained within the combustion chamber further to a point where combustion may be enabled.

At step S410, the power system may perform ignition. Step S410 may comprise power system 1 issuing an instruction to an igniter, such as spark plug 28 in combustion chamber 73, to fire. At step S411, the power system may stop resistive force working against the motion of the piston. Step S411 may comprise turning off resistive force 1450. Step 411 may include reversing the direction that the resistive force acts. For example, resistive force 1450 may be taken off and resistive force 1460 may be applied.

Steps S412 to S420 may be similar to steps S403 to S411 except that a direction of motion is different, and sensor output may be correspondingly reversed. Second sensor output may be based on an absolute value of movement. For example, Sensor 140 may be configured to count a number of increments, such as a number of teeth of trigger disk 145 that move past sensor 140, regardless of the direction of movement. The value Y1 or Y2 may be equal to Y3 or Y4, respectively.

After step S411 or step S420, the routine may proceed to step S421 where the process may end.

A method may include elements of the flowcharts of FIG. 10D, FIG. 10E, FIG. 12F, or FIG. 14F, with or without various modifications. In some embodiments, a method of operating an engine may include implementing the flowcharts of FIG. 10E, FIG. 12F, and FIG. 14F. In some embodiments, multiple piston movement steps may be carried out. For example, a first method may be implemented to identify the position of the piston, then the piston may be moved by an electric power supply by, e.g., a certain number of teeth of trigger disk 145, as in the first operation mode. Next, a second method may be implemented to inject fuel and continue to move the piston. When the piston has moved a further amount, e.g., when distance d reaches a point of optimal compression, or the furthest distance the piston can be moved based on operating conditions, ignition may be triggered.

Energy transformer 20 may be configured to accomplish various functions. For example, energy transformer 20 may move engine components, such as piston 50, from location to location, as in the first mode. Energy transformer 20 may slow the engine down or speed it up, for example as discussed above with respect to the second mode. Energy transformer may also generate electricity by resisting the engine, for example as discussed above with respect to the third mode.

In some embodiments, an energy transformer may apply a variable resistance. Resistance applied to engine 10 via actuator 300 may be varied based on operating conditions of engine 10 or other components.

Figure 15:
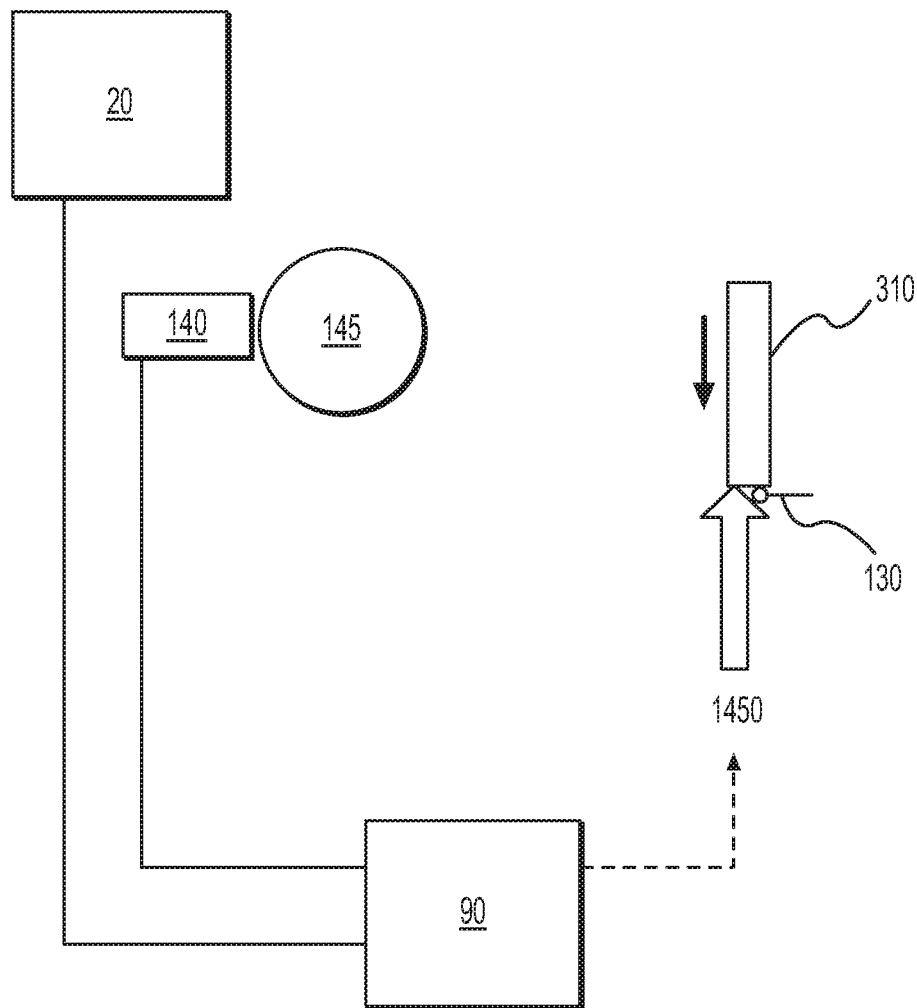
FIG. 15 is a schematic view of a power generation system using variable resistance, according to embodiments of the present disclosure.

Reference is now made to FIG. 15, which illustrates a configuration of power system 1 operating with variable resistance. Based on sensor output, a level of resistance applied from energy transformer 20 to actuator 300 may be variable. For example, information may be derived from sensor 140 that is configured to monitor trigger disk 450. Controller 90 may determine the speed of piston 50. Speed of piston 50 may be determined in real time.

Controller 90 may be configured to constantly monitor output from sensor 140 and calculate a level of resistance to apply via energy transformer 20. Controller 90 may be configured to update a value of resistance based on a most recent determination of piston speed. Updating of the resistance may occur immediately, after a predetermined delay, or at the next stroke, for example. Piston speed may be determined by counting a number of increments detected by the second sensor over a time period. Determination of piston speed may occur at a time that first sensor output is detected to have changed. For example, in response to output of sensor 130 transitioning from 1 to 0, or from 0 to 1, controller 90 may be configured to determine piston speed based on output of sensor 140, and may determine a level of resistance based on the determined piston speed. Controller 90 may be configured to determine piston speed after a predetermined time delay after the transition of output of sensor 130.

A point at which controller 90 is configured to determine piston speed may be variable. In some embodiments, controller 90 may be configured to determine piston speed when it is determined that piston 50 has reached a point where output of sensor 130 transitions. In some embodiments, controller 90 may be configured to determine piston speed when piston 50 is at the midpoint of cylinder 12. In some embodiments, controller 90 may be configured to determine piston speed when piston 50 reaches a point some distance beyond the midpoint of cylinder 12, such as a predetermined number of increments of sensor 140. The point at which piston speed is determined may be selected in consideration of the effects of thermodynamics. For example, it may be beneficial to determine piston speed at a point after a combustion phase ends because it may more accurately represent kinetic energy of piston 50.

Combustion may be a process that inherently involves randomness. There may be stochastic behavior associated with combustion of fuel in an engine cylinder. For example, in some strokes, unburned fuel may remain in a combustion chamber at the time a combustion phase ends, whereas in some strokes, fuel may be completely consumed. The amount of fuel consumed may affect the energy imparted into the piston. Thus, the effect of combustion may vary from stroke to stroke. In some embodiments of the disclosure, piston speed may be determined every stroke, and operation parameters of power system 1 may be adjusted accordingly. For example, each stroke may be optimized such that a maximum amount of resistance is applied by energy transformer 20 to extract a proper amount of energy from piston 50 imparted by combustion. At one optimal point, for example, piston 50 may be slowed by resistance from energy transformer 20 so as to reach the end point of a stroke with no kinetic energy left (e.g., a "zero speed"

point). At the end point of the stroke, ignition may be triggered so as to begin the next stroke wherein the piston may travel in the opposite direction.

Using information relating to piston speed, controller 90 may calculate momentum of the oscillating mass of engine 10. Properties of components making up the oscillating mass may be known in advance. Piston position may be determined as discussed herein. Therefore, a remaining amount of work that can be extracted from the piston can be calculated. Load to be applied by energy transformer 20 may be determined based on the remaining amount of work that can be extracted from the piston. As shown in FIG. 15, rack 310 may be in motion, e.g., moving downward. Sensor 140 may output data that indicates a number of teeth of trigger disk 145 counted after rack 310 starts to overlap with sensor 130. Thus, the position of the piston can be determined. Furthermore, the piston speed can be determined. In real time, information may be fed into controller 90 and used to set the level of resistance 1450. Controller 90 may be configured to determine piston speed and calculate resistance when the piston crosses the midpoint. Controller 90 may calculate resistance at predetermined intervals. Controller 90 may update resistance constantly. Resistance level may change even during one stroke. As shown in FIG. 15, energy transformer 20 and sensor 140 may be communicatively coupled to controller 90 (as shown by solid lines). Controller 90 may output an instruction to cause energy transformer 20 to adjust the level of resistance 1450 (as shown by dashed lines).

Controller 90 may be configured to determine a motion parameter of an oscillating mass at a reference point, which may be a predetermined point. For example, controller 90 may determine a quantity of momentum of the oscillating mass at a first point. The first point may be a known position. The first point may coincide with a location of a sensor, such as sensor 130. The first point may be the midpoint of a cylinder of a linear reciprocating engine. The first point may be a point at which a sensor output transitions. For example, the first point may be a point at which output of sensor 130 changes value. Controller 90 may be configured to determine the motion parameter in response to output of sensor 130 changing value. In some embodiments, the predetermined point may be a second point. The second point may be a predetermined distance away from the first point. The motion parameter may be determined based on output of multiple sensors. For example, controller 90 may be configured to determine the motion parameter in response to a determination that sensor 140 has detected a predetermined number of increments after the output of sensor 130 has changed value. Thus, the second point may be displaced by a predetermined distance past the first point. In some embodiments, the motion parameter may be determined based on a speed of the piston at the first point, or at the second point. In response to determining the motion parameter, a level of resistance of energy transformer 20 may be adjusted. A load of energy transformer 20 may be based on the motion parameter.

In some embodiments, the reference point itself may be determined based on information relating to the operation of the engine. Controller 90 may be configured to determine the location of the reference point in real-time as engine 10 is running. For example, the reference point may be further away from the first point the faster piston 50 is traveling. In some embodiments, the reference point may be further away from the first point the slower piston 50 is traveling.

Power system 1 may operate in a mixed mode. A mixed mode may include aspects of the first to third modes, or other modes. In a mixed mode, power system 1 may use energy transformer 20 both to move piston 50 (e.g., as a starter) and to resist the piston (e.g., as a generator). Power system 1 may be configured to operate in an assist mode. For example, in addition to adjusting resistance 1450, controller 90 may be configured to control other operations in response to certain conditions being satisfied. In some embodiments, controller 90 may turn off the resistance completely. Controller 90 may advance ignition timing. Controller 90 may be configured to cause a spark plug to fire before the piston has reached a point of optimal compression in order to keep the engine running. Assist mode may be used to maintain engine running so as to avoid encountering misfiring or other abnormalities.

For example, it may be determined that piston 50 does not have enough energy, based on its current position and speed, to reach a point of optimal compression at which combustion is planned to occur. Controller 90 may turn off resistance 1450 and may change the operation mode of energy transformer 20 to power supply mode. Then, energy transformer 20 may input energy to enable piston 50 to reach the point of optimal compression, or some other point, at which combustion may occur. Power system 1 may be configured such that piston 50 continues reciprocating with no lost strokes.

As discussed above, energy transformer may be configured to set a load. The load may be a resistive force. For example, the load may act against motion of piston 50. The load may include resistance 1450. In some embodiments, the load may be an assistive force. Energy transformer 20 may be configured to assist the motion of piston 50. The load may correspond to energy transformer 20 generating an output so as to move piston 50.

In a mixed mode, energy transformer 20 may be configured to change from assisting the motion of piston 50 to resisting the motion of piston 50, or vice versa. Energy transformer 20 may be configured to change from assisting or resisting within one stroke of piston 50. A stroke of piston 50 may proceed from a combustion point on one side of cylinder 12 and may end at another combustion point on an opposite side of cylinder 12. It may be determined mid-stroke that a parameter of piston 50 is such that energy transformer 20 should change from resisting or assisting the motion of piston 50. For example, energy transformer 20 may be configured to extract energy from piston 50, but when speed of piston 50 drops to such a level that piston 50 will not have sufficient energy to reach the next combustion point at the end of the current stroke, energy transformer 20 may be changed to a starter and may assist the motion of piston 50 so that it reaches the next combustion point.

Figure 16:
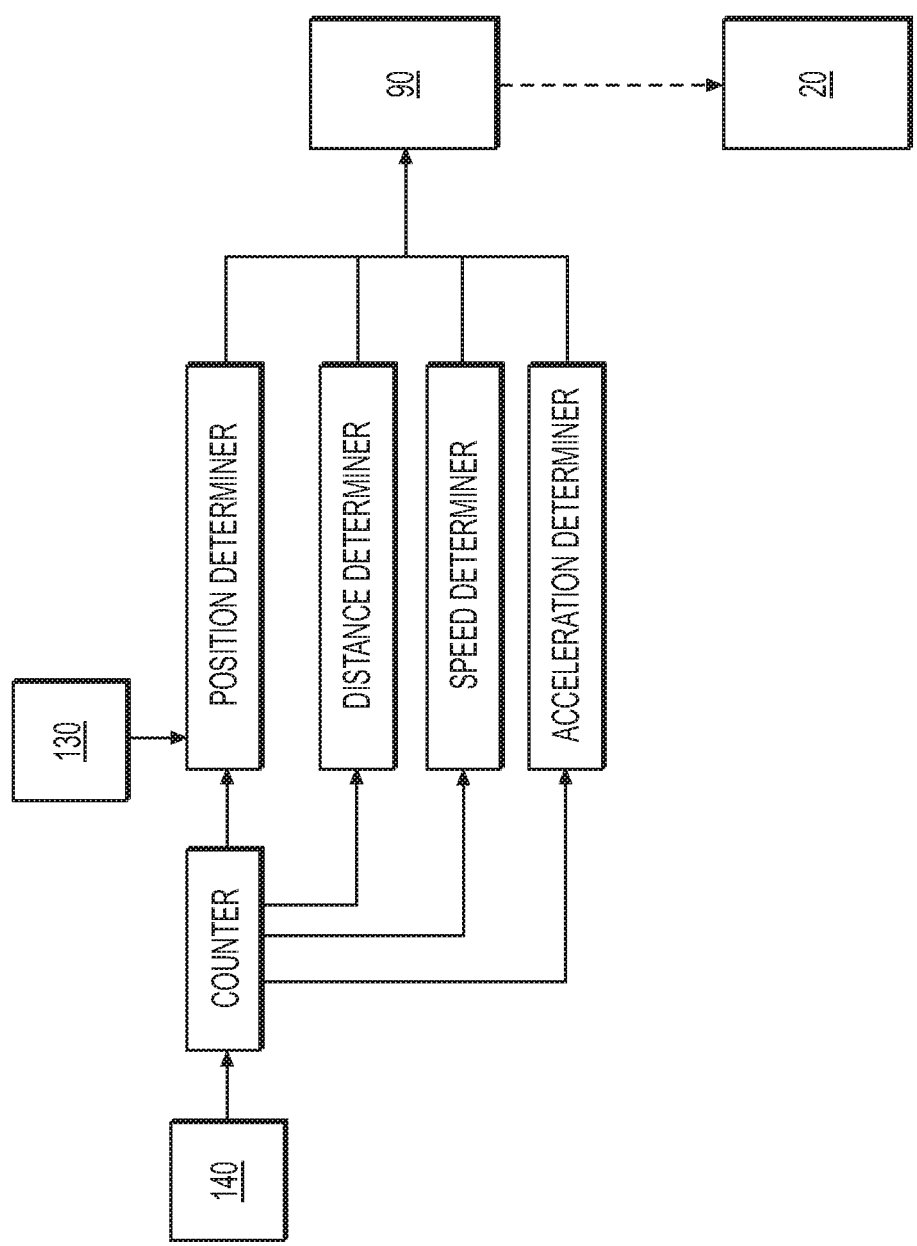
FIG. 16 is a view representing informational processing of sensors of a power generation system, according to embodiments of the present disclosure.

FIG. 16 is a diagram representing informational processing of output of sensors. Output from sensor 130 or sensor 140 may be used to determine a parameter, such as a motion parameter. Sensor 140 may output data to a counter. The counter may be configured to count a number of increments detected by sensor 140. For example, an event detector may be configured to determine a number of events, each of which may correspond to a tooth of trigger disk 145 passing by face 143 of sensor 140. The counter may include a clock. The counter may be configured to label each event with a time stamp. Time stamps may also be associated with other events, such as a point at which output of sensor 130 transitions. In some embodiments, sensors 130 or 140 may be sampled at a clock rate.

As shown in FIG. 16, output of the counter may be input to various other units. For example, a position determiner may be provided that uses input from the counter and sensor 130. The position determiner may be configured to determine a position of piston 50 in cylinder 12. The position determiner may determine the position of piston 50 based on output of sensor 130 that may indicate the piston has reached a known position, and based on output of sensor 140 (e.g., via the counter) that may indicate the piston has further moved a certain distance. The position determiner may determine that piston 50 is in a first side or a second side of cylinder 12. Determining that piston 50 is in the first or second side may be based on current output of sensor 130. In some embodiments, determining that piston 50 is in the first or second side may be based on previous data.

Like the position determiner, various other quantities may be determined by other units. For example, a distance determiner may be provided. The distance determiner may be configured to determine a distance that piston 50 has moved in a time period. A speed determiner may be provided that is configured to determine the speed of piston 50. An acceleration determiner may be provided that is configured to determine the acceleration of piston 50. The acceleration determiner may include a differentiator. The acceleration determiner may be configured to determine the derivative of speed determined by the speed determiner. In some embodiments, the speed determiner may be configured to determine the derivative of distance determined by the distance determiner.

Figure 17:
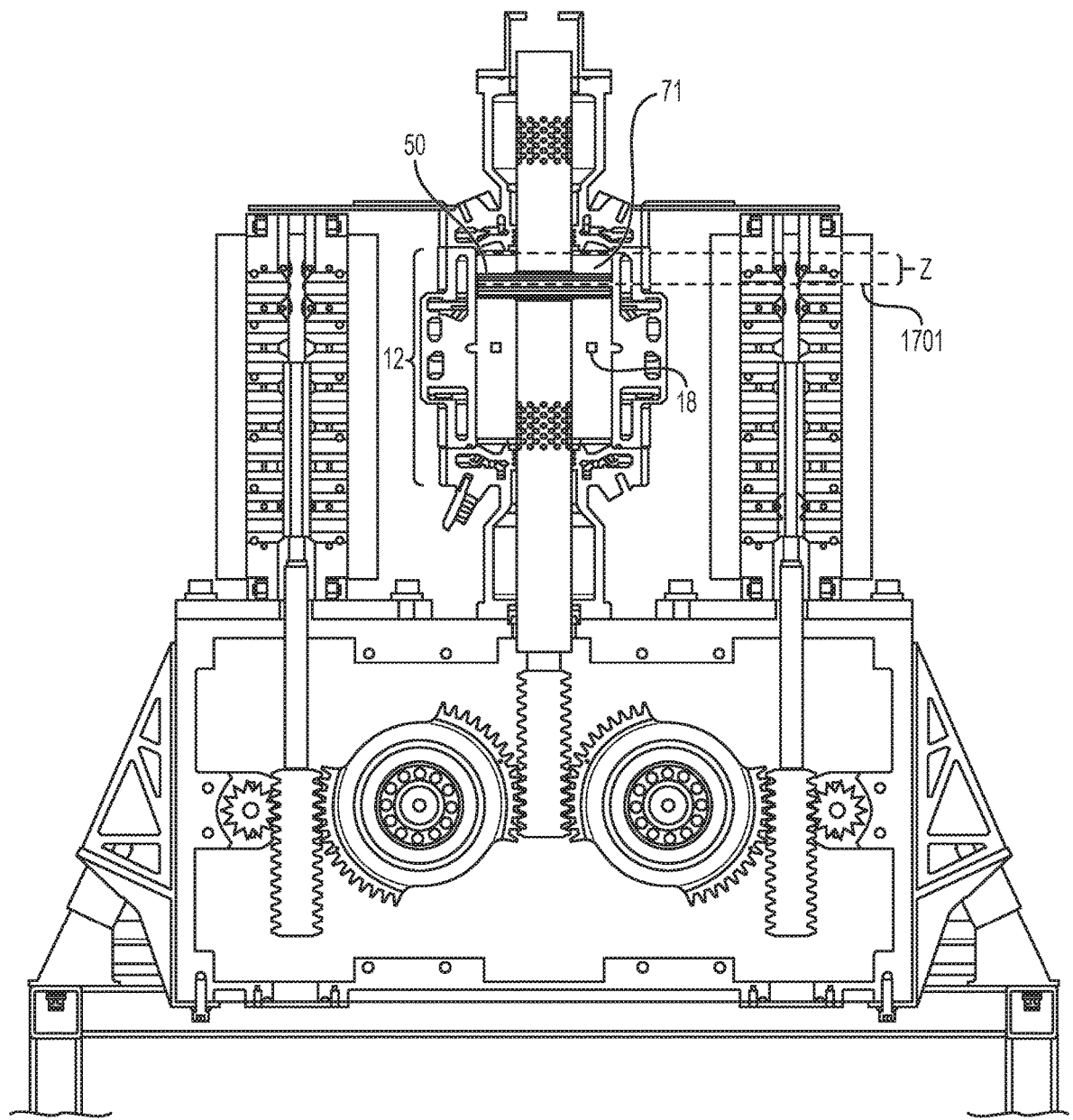
FIG. 17 is a partial cutaway view of a power generation system showing a portion of cylinder volume that may be used in a spontaneous combustion mode of operation, according to embodiments of the present disclosure.

In some embodiments, a power system may be configured to run in a spontaneous combustion mode. FIG. 17 illustrates an example of an instance of power system 1 running in spontaneous combustion mode. In the spontaneous combustion mode, ignition may be disabled except for being a backup. In the spontaneous combustion mode, fuel may be injected during the intake stroke, however, instead of using electrical discharge (e.g., a spark from a spark plug) to ignite a fuel-air mixture, piston 50 may be allowed to continue traveling in cylinder 12, increasing the density and temperature of the fuel-air mixture until the mixture reacts spontaneously.

In a comparative example, fuel may be injected with air in a combustion chamber of an engine, and at least a part of the volume of the combustion chamber may contain fuel. When ignition is triggered by, e.g., spark ignition, combustion may begin to occur in the combustion chamber at a location near the spark. Combustion may begin in a region where fuel and air are well mixed and may spread to other locations in the combustion chamber. It may be important to have fuel and air fully mixed before a compression stage begins.

In contrast to the comparative example, an engine may operate with spontaneous combustion as follows. Fuel may be injected and air may be supplied to a combustion chamber, such as combustion chamber 71. Piston 50 may move toward the north side of cylinder 12, causing gases in combustion chamber 71 to be compressed. Piston 50 may be allowed to continue traveling closer and closer toward a head of cylinder 12. Air and fuel contained in combustion chamber 71 continue to mix by diffusion, or other phenomena. Eventually, piston 50 may reach a position where the fuel-air mixture in combustion chamber 71 can react by autoignition due to elevated heat and density. As shown in FIG. 17, a line 1701 may indicate a point beyond which spontaneous combustion may occur in combustion chamber 71. A volume of combustion chamber 71 may be reduced to a value such that conditions for spontaneous combustion are satisfied. The fuel-air mixture in combustion chamber 71 may be well mixed at this point. In spontaneous combustion, combustion may occur uniformly in combustion chamber 71, and thus emissions may be improved. For example, in some embodiments, there may be no flame front when spontaneous combustion occurs in combustion chamber 71. Homogenous charge compression ignition (HCCI) may be one example of operating power system 1 in spontaneous combustion mode.

Using HCCI, for example, relatively higher compression may be achieved in a combustion chamber. In some embodiments, combustion may be initiated at 200 bar or above, rather than, e.g., 65 bar, which may be typical in conventional ignition. In comparative examples, a spark may be initiated before a piston has expended all of its kinetic energy imparted by a previous combustion. Thus, the piston may be caused to change direction prematurely while it still has energy left. If spark ignition is disabled, the piston would tend to continue traveling in the compression stroke. In some embodiments of the disclosure, HCCI may be used and at an optimal point, all kinetic energy in the piston may be used to compress gas in the combustion chamber. In some embodiments, any excess energy of the piston may be extracted as work input to the generator.

As shown in FIG. 17, piston 50 may be allowed to travel a further distance after reaching a combustion point such as that used in the second or third operational modes discussed above. Line 1701 may represent a plane beyond which the piston usually does not cross when spark ignition is normally used in the second or third operational modes. FIG. 17 shows that piston 50 may be at a position in cylinder 12 in which some distance Z still remains between the engine head and the proximal face of the piston. This may be referred to as the clearance volume. Thus, there is still some volume into which gases can be further compressed. Increased compression may allow for stronger combustion. Power system 1 may take advantage of this distance by allowing piston 50 to further travel beyond a predetermined normal combustion point until spontaneous combustion occurs.

Figure 18:
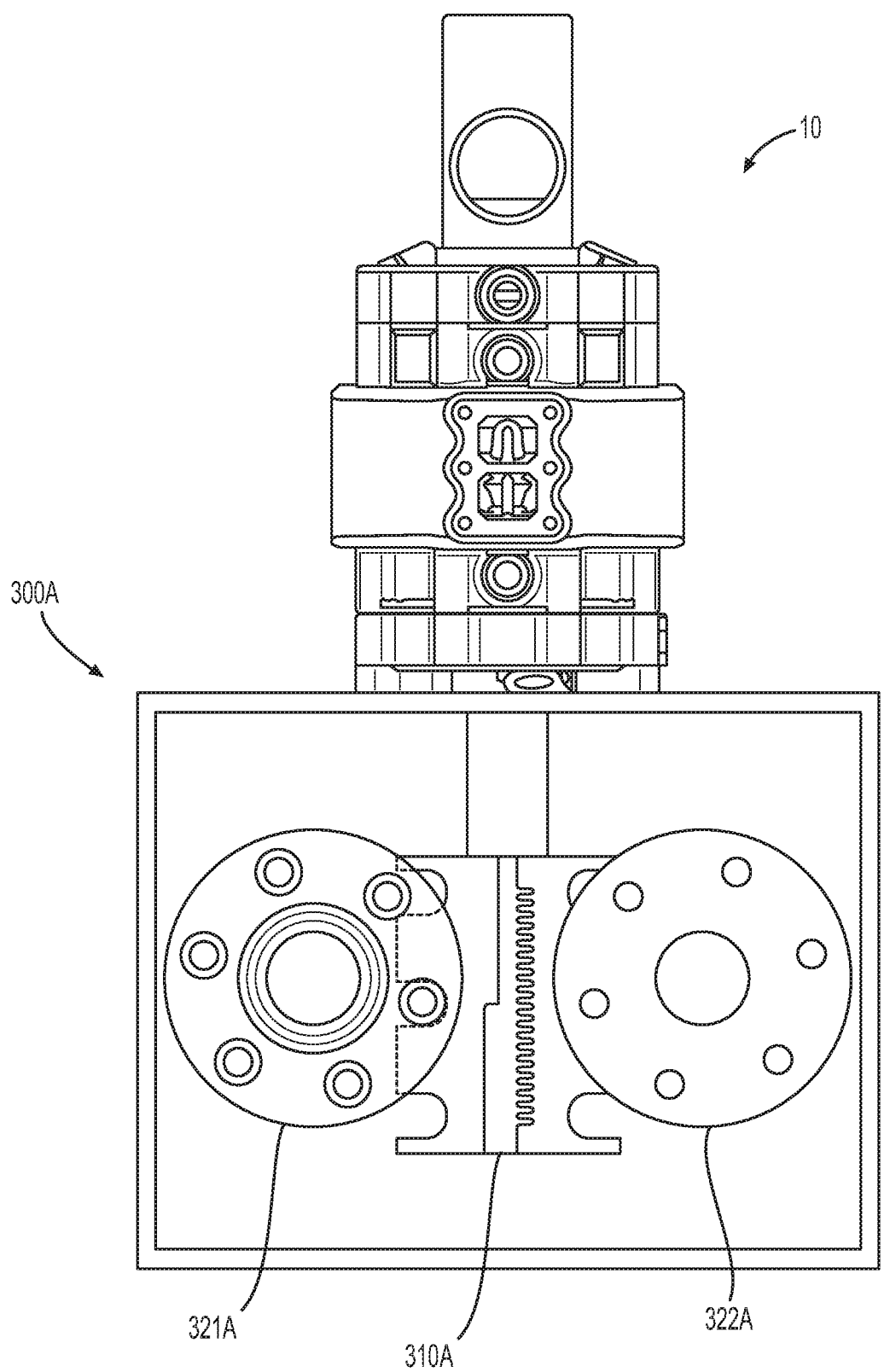
FIG. 18 is a view showing an alternative configuration of an actuator, according to embodiments of the present disclosure.

FIG. 18 illustrates an alternative configuration of an actuator. FIG. 18 shows engine 10 connected to actuator 300A. Actuator 300A includes a rack 310A, a wheel 321A, and a wheel 322A.

Figure 19:
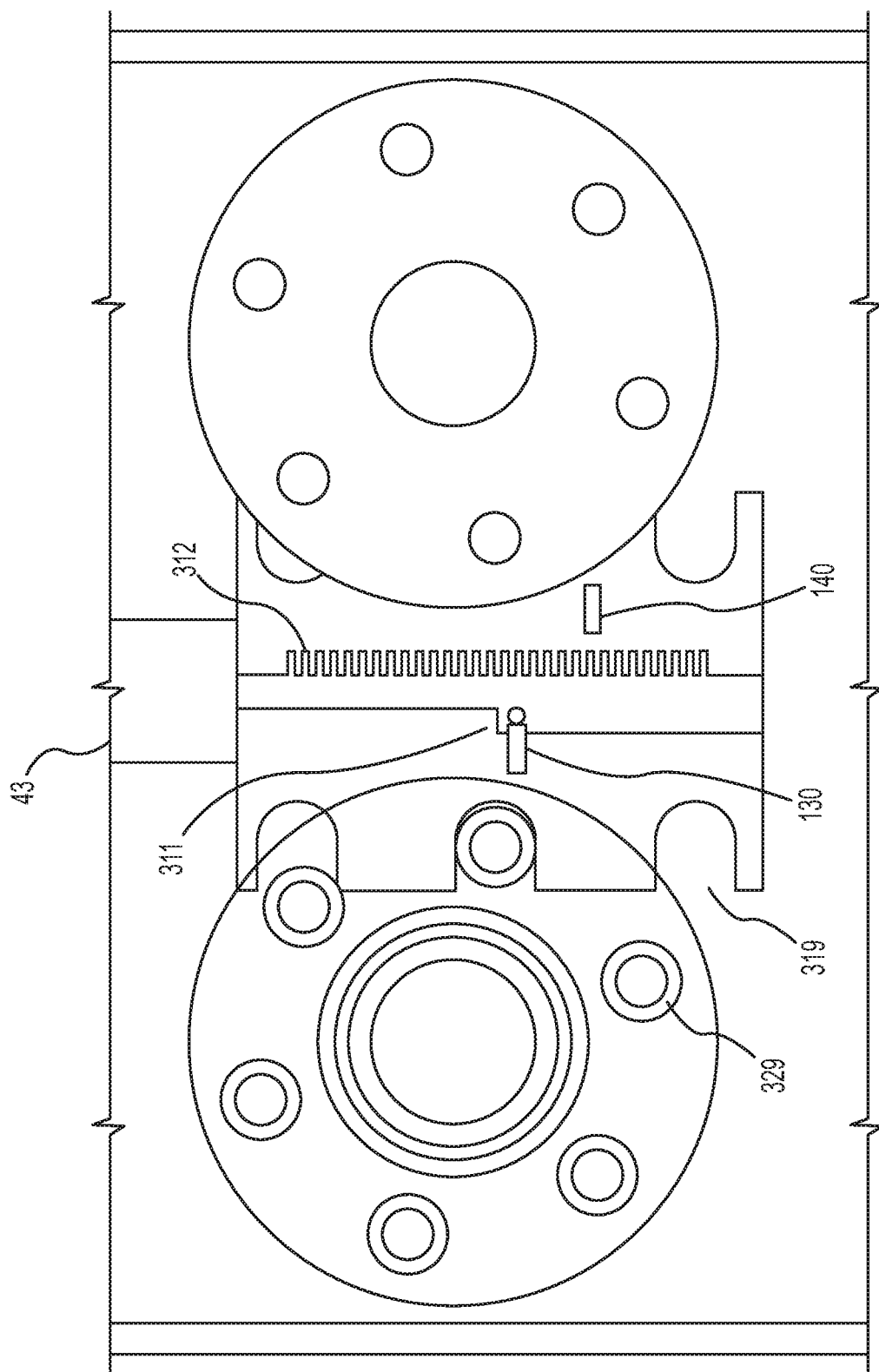
FIG. 19 is a detailed view of an actuator, according to embodiments of the present disclosure.

FIG. 19 is an enlarged view of a portion of actuator 300A, consistent with embodiments of the disclosure. Rack 310A includes a notch 311. Sensor 130 may be configured to detect when notch 311 overlaps with sensor 130. Sensor 130 and notch 311 may be used for a rough determination, e.g., that piston 50 is in north or south halves of cylinder 12. On a side opposite notch 311, rack 310A may include a toothed section 312 that may be used for more precise determination. Sensor 140 may be configured to detect individual teeth of toothed section 312.

For transfer of power, wheel 321A may include pins 329 that engage with grooves 319 in rack 310A. Wheel 321A and wheel 322A may be coupled to an energy transformer that operates rotationally. Mechanical motion of rotation of wheels 321A and 322A may be used for power transfer. Actuator 300A may be useful for converting linear reciprocating motion of engine 10 to rotational energy.

Figure 20:
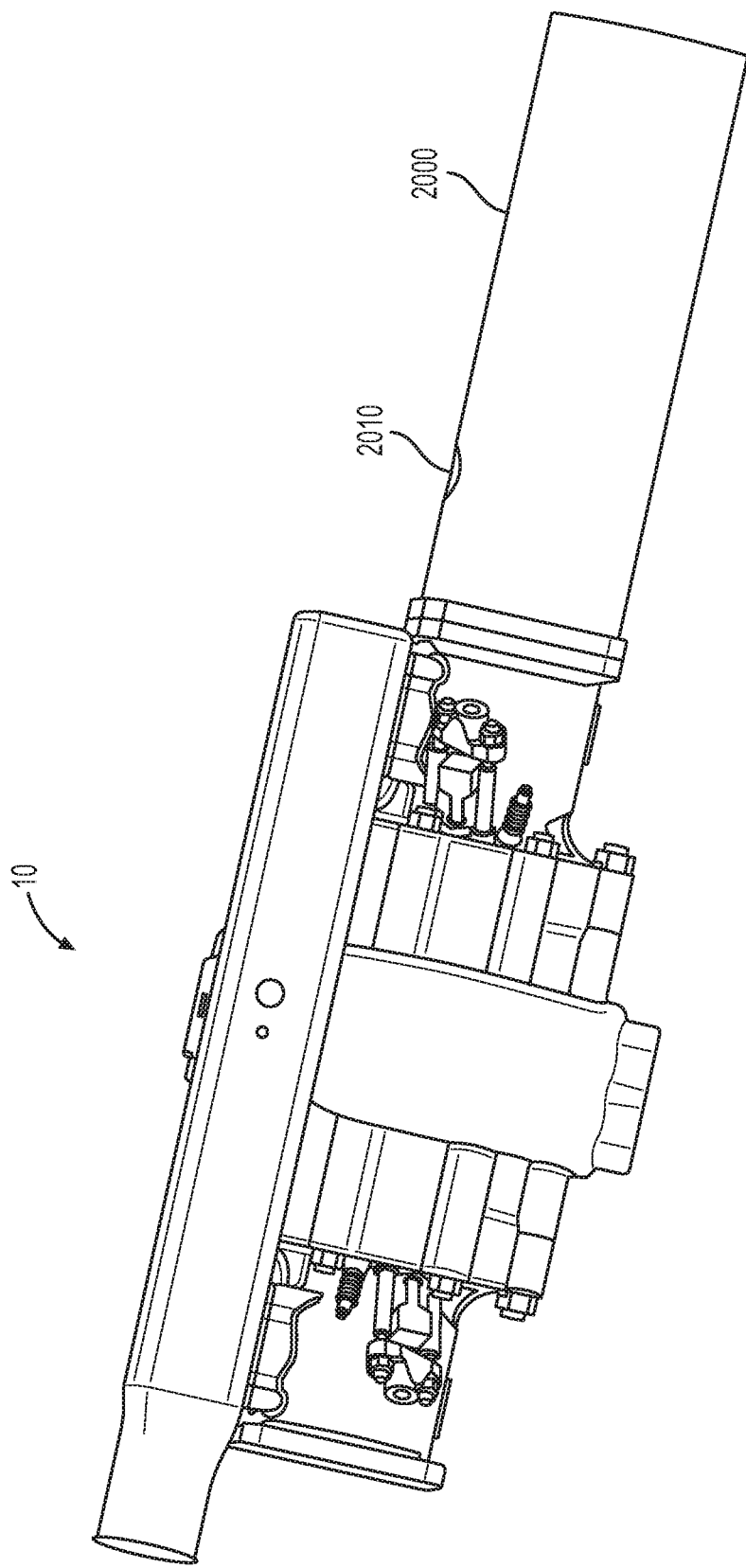
FIG. 20 is a view of another embodiment of a power generation system including an engine, according to embodiments of the present disclosure.
Figure 21:
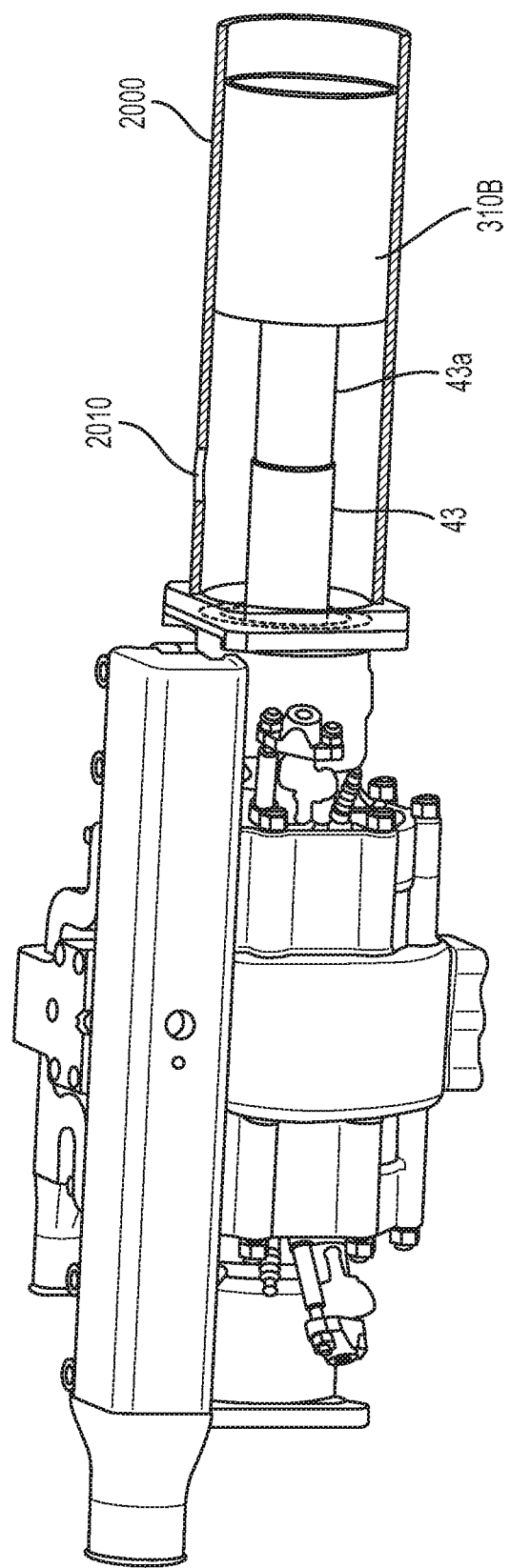
FIG. 21 is a view of the engine of FIG. 20 with a cutaway view of a tube and its contents, according to embodiments of the present disclosure.

FIG. 20 shows another variation of power system 1. Engine 10 may be connected to a tube 2000. Tube 2000 may include an opening 2010. FIG. 21 is a partially transparent view showing an interior of tube 2000. Piston rod portion 43 may be connected to a mass 310B. Piston rod portion 43 may be connected to mass 310 via a stepped rod portion 43a.

Figure 22:
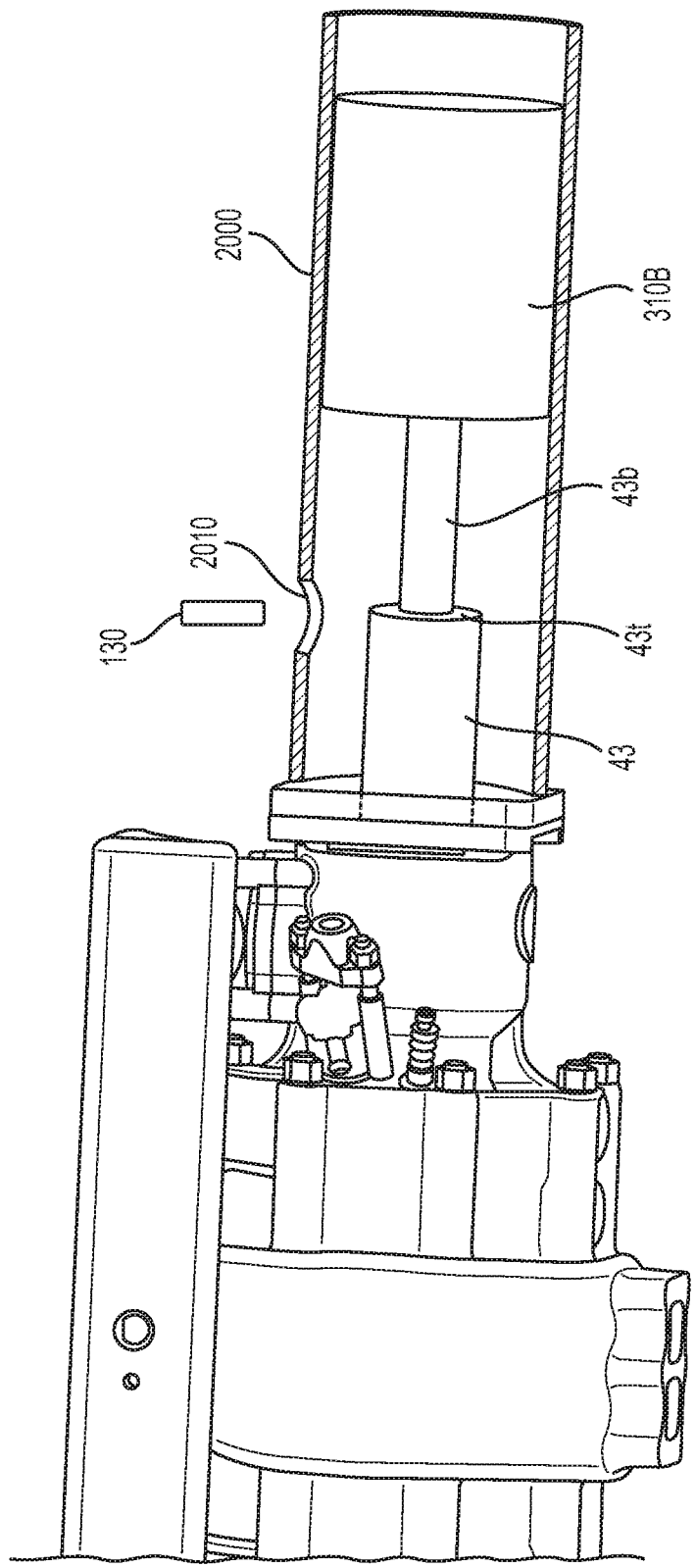
FIG. 22 is a detailed view showing the tube of FIG. 21 and its contents, according to embodiments of the present disclosure.

Sensor 130 may be configured to monitor a structure connected to piston 50 through opening 2010. In some embodiments, the stepped rod portion may have a significantly reduced diameter compared to rod 43. For example, as shown in FIG. 22, there may be provided rod portion 43*b*. Sensor 130 may be configured to observe a discontinuity in piston rod portion 43. Sensor 130 may detect when a transition portion 43*t* crosses a position of sensor 130.

A power generation system in accordance with exemplary embodiments of the disclosure may produce various advantages. For example, relatively simple and economical sensors may be used to derive information on the position of a piston in the engine. Sensor output may be simple and may be delivered quickly to a processing system, such as a controller. The controller may adjust operating conditions of the power generation system that may allow enhanced energy extraction from the engine. Fast processing and high bandwidth may also be achieved.

An engine in accordance with exemplary embodiments of the disclosure may produce further benefits. For example, an engine may facilitate nearly continuous scavenging of hot exhaust gases from the cylinder while continuously supplying fresh air for combustion. The nearly continuously introduced fresh pre-compressed air may decrease the temperature within the cylinder and increase the engine efficiency and engine service life.

Various alterations and modifications may be made to the disclosed exemplary embodiments without departing from the spirit or scope of the disclosure. For example, the burned gases produced by the engine 10 may be used for driving a turbo charger. The compressed air introduced into the cylinder may be pressurized by an external compressor that is driven by the reciprocating piston rod portions extending from opposite ends of the cylinder. Other variations may include imparting a swirl effect to the gases introduced into the cylinder by changing the angle of inlet ports or outlet ports so that gases are not directed radially into or out of the cylinder.

An engine including a double-sided cylinder bounded by an engine head at each end, an exhaust unit positioned at each end, and a freely-sliding piston within the cylinder may also be used. Two piston rods may be aligned with a longitudinal axis of the engine, with each piston rod connected at a different side of the piston. Each of the piston rods may have a cavity extending to an exhaust opening. The exhaust openings may constitute exhaust valves that are an integral part of the piston rods. The piston rods may constitute a sliding valve. An example of such an engine is discussed in U.S. Pat. No. 9,995,212.

While examples of a first and a second sensor, such as sensor 130 and sensor 140, have been discussed, a power system may include only one or a plurality of sensors that may accomplish similar functionality. In some embodiments, sensors 130 and 140 may be combined. Multiple sensors may be provided that may correspond to multiple moving parts, such as multiple pistons or piston rods.

Block diagrams in the figures may illustrate the architecture, functionality, and operation of possible implementations of systems, methods, and computer hardware/software products according to various exemplary embodiments of the present disclosure. In this regard, each block in a schematic diagram may represent certain arithmetical or logical operation processing that may be implemented using hardware such as an electronic circuit. Blocks may also represent a module, segment, or portion of code that comprises one or more executable instructions for implementing the specified logical functions. It should be understood that in some alternative implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted. For example, steps S410 and S411 of FIG. 14F may be executed simultaneously. It should also be understood that each block of the block diagrams, and combination of the blocks, may be implemented by special purpose hardware-based systems that perform the specified functions or acts, or by combinations of special purpose hardware and computer instructions.

To expedite the foregoing portion of the disclosure, various combinations of elements are described together. It is to be understood that aspects of the disclosure in their broadest sense are not limited to the particular combinations previously described. Rather, embodiments of the invention, consistent with this disclosure, and as illustrated by way of example in the figures, may include one or more of the following listed features, either alone or in combination with any one or more of the following other listed features, or in combination with the previously described features.

For example, there may be provided a system including an engine. The engine may include a cylinder having a first combustion chamber and a second combustion chamber; and a piston slidably mounted within the cylinder. There may also be provided the following elements:

- a first sensor provided on a base configured to be connected to the engine.
- a second sensor provided on the base.
- wherein the first sensor is configured to generate a signal in response to a component coupled to the piston being in a region of the first sensor.
- wherein the second sensor is configured to generate a signal in response to a component coupled to the piston being in a region of the second sensor.
- wherein the base includes an energy transformer configured to transform motion of the engine into work.
- wherein the energy transformer is configured to transform motion of the engine into electricity.
- wherein the engine is a linear reciprocating engine.
- wherein the energy transformer is configured to transform linear reciprocating motion of the linear reciprocating engine into electrical power.
- wherein the cylinder has a first end where the first combustion chamber may be formed, and a second end where the second combustion chamber may be formed, the first end opposing the second end.
- a first cylinder head located at an end of the first combustion chamber; and a second cylinder head located at an end of the second combustion chamber.
- a piston rod including at least one piston rod portion extending through the first combustion chamber and the second combustion chamber, the at least one piston rod portion having at least one first port located on a first side of the piston and at least one second port located on a second side of the piston, opposite the first side of the piston.
- wherein the engine is an opposed piston engine.

Furthermore, for example, there may be provided a linear reciprocating engine including a cylinder having a first combustion chamber at a first end of the cylinder and a second combustion chamber at an opposing second end of the cylinder; a first cylinder head located at an end of the first combustion chamber; a second cylinder head located at an end of the second combustion chamber; a piston slidably mounted within the cylinder; and a piston rod including a first piston rod portion extending through the first combustion chamber and a second piston rod portion extending through the second combustion chamber, the first piston rod portion having a first port located on a first side of the piston and the second piston rod portion having a second port located on a second side of the piston, opposite the first side of the piston. There may also be provided the following elements:

an energy transformer configured to transform mechanical motion into electrical power.

a base including an actuator configured to transfer mechanical motion of the linear reciprocating engine to the energy transformer.

a controller configured to operate the linear reciprocating engine or the energy transformer in one of a plurality of modes.

wherein the actuator includes a first rack coupled to the linear reciprocating engine, a gear, and a second rack coupled to the energy transformer.

wherein the actuator includes a rack coupled to the linear reciprocating engine and a wheel coupled to the energy transformer.

Furthermore, for example, there may be provided a method for operating a linear reciprocating engine including a cylinder having a first combustion chamber at a first end thereof and a second combustion chamber at an opposing second end thereof; a first cylinder head located at an end of the first combustion chamber; a second cylinder head located at an end of the second combustion chamber; a piston slidably mounted within the cylinder; and a piston rod including at least one piston rod portion extending through the first combustion chamber and the second combustion chamber, the at least one piston rod portion having at least one first port located on a first side of the piston and at least one second port located on a second side of the piston, opposite the first side of the piston. There may also be provided the following elements:

determining, by a first sensor, whether a piston of the linear reciprocating engine is in a first half of a cylinder or a second half of the cylinder.

determining a distance traveled by the piston based on a number of increments detected by a second sensor.

determining a speed of the piston based on the number of increments detected in a time period.

determining an energy of an oscillating mass connected to the piston based on the speed of the piston.

determining a load of an energy transformer configured to transform linear reciprocating motion of the linear reciprocating engine to electrical power based on the determined energy of the oscillating mass.

Furthermore, for example, there may be provided a method of determining a position of a piston in an internal combustion engine including a cylinder having a first combustion chamber at a first end thereof and a second combustion chamber at an opposing second end thereof; a piston slidably mounted within the cylinder; and a piston rod extending from the piston through the combustion chamber and into an area external to the cylinder. There may also be provided the following elements:

determining, by a first sensor, whether a piston of the linear reciprocating engine is in a first region of a cylinder or a second region of the cylinder;

determining a distance traveled by the piston based on a number of increments detected by a second sensor.

determining a motion parameter of an oscillating mass at a first point or a second point.

wherein the first point corresponds to a point at which output of the first sensor transitions.

wherein the second point corresponds to a point that is a predetermined distance away from the first point.

wherein determining the motion parameter includes determining a speed of the piston based on a number of increments detected by the second sensor in an interval.

wherein the motion parameter is based on a speed of the piston determined at the first point.

determining a load of an energy transformed based on the motion parameter.

wherein the load is configured to resist motion of the piston.

wherein the load is configured to assist motion of the piston.

What is claimed is:

1. A method for controlling a linear reciprocating engine, the method comprising:

determining, by a first sensor, a first output or a second output, the first output corresponding to a piston of the linear reciprocating engine being in a first half of a cylinder, and the second output corresponding to the piston being in a second half of the cylinder;

determining a moving direction of the piston based on a change between the first output and the second output of the first sensor; and injecting fuel into the first half of the cylinder or the second half of the cylinder based on the change between the first output and the second output of the first sensor.

2. The method of claim 1, further comprising:

determining a distance traveled by the piston based on a first number of increments detected by a second sensor;

determining a reference point in the cylinder;

determining a position of the piston in the cylinder as a location displaced from the reference point by the distance traveled, wherein the reference point divides the cylinder into the first half and the second half, wherein the distance traveled is determined upon the second sensor detecting the first number of increments.

3. The method of claim 1 further comprising:

determining a speed of the piston based on a number of increments detected by a second sensor in a time period;

determining an energy of an oscillating mass connected to the piston based on the speed of the piston, determining a load of an energy transformer configured to transform linear reciprocating motion of the linear reciprocating engine to electrical power based on the determined energy of the oscillating mass, and setting the load to a value such that the piston decelerates to a stop at a position where spontaneous combustion takes place in the cylinder.

4. The method of claim 1, wherein the first sensor includes a Hall effect sensor.

5. The method of claim 1, further comprising:

determining that the piston has reached a midpoint of the cylinder based on the change between the first output and the second output of the first sensor, wherein fuel is injected into the first half of the cylinder or the second half of the cylinder upon the piston reaching the midpoint.

6. The method of claim 1, further comprising:

determining a distance traveled by the piston or a speed of the piston based on one or more increments detected by a second sensor;

wherein the second sensor is configured to determine the increments in response to a tooth of a wheel rotated by a rack passing a region of the second sensor.

7. The method of claim 1, further comprising:
determining a speed of the piston based on one or more increments detected by a second sensor in a time period; and
sending a signal to cause a spark in the cylinder in response to determining that the speed of the piston is insufficient to reach a predetermined position at an end of the cylinder.

8. The method of claim 1, further comprising:
in an engine starting mode, generating an output from an energy transformer to move the piston in a direction toward an opposite one of the first half and the second half based on output of the first sensor.

9. The method of claim 1, further comprising:
determining a speed of the piston based on one or more increments detected by a second sensor in a time period; and
in an engine starting mode, determining a position in the cylinder where the piston will generate a maximum amount of compression based on the speed of the piston and an amount of air introduction; and sending a signal to cause a spark in the cylinder in response to determining that the piston has reached the position based on output from the second sensor.

10. The method of claim 1, further comprising
determining a distance traveled by the piston or a speed of the piston based on one or more increments detected by a second sensor;
in a generating mode, incrementing a variable resistance in an energy transformer based on output of the second sensor.

11. The method of claim 10, further comprising:
in the generating mode, in response to determining that the speed of the piston is insufficient to reach the position where spontaneous combustion takes place in the cylinder, decrementing the variable resistance.

12. The method of claim 1, further comprising:
determining a speed of the piston based on one or more increments detected by a second sensor in a time period; and
determining an amount of fuel to inject into the first half of the cylinder or the second half of the cylinder based on the speed.

13. The method of claim 12, wherein the speed is determined at a reference point, the reference point being variable and adjusted based on a prior operation of the engine.

14. A system for determining a position of a piston in an engine, the system comprising:
a sensor configured to determine whether the piston is in a first region of a cylinder or a second region of the cylinder;
a controller configured to determine a parameter of the engine based on output from the sensor,
wherein the controller is configured to determine a moving direction of the piston based on a change of output of the sensor.

15. The system of claim 14, wherein
the controller is configured to control an operation of the system based on the parameter,
the operation includes fuel injection, and
the controller is configured to determine to inject fuel into the first region of the cylinder or the second region of the cylinder based on the change of output of the sensor.

16. The system of claims 14, further comprising a component coupled to the engine, wherein the sensor is configured to determine a first output when the component is in a region of the sensor and to determine a second output when the component is not in a region of the sensor.

17. The system of claim 16, wherein
the component includes a rack attached to a piston rod, and
the rack extends along a length of the piston such that the sensor is configured determine the first output while the piston is in the first region and determine the second output while the piston is in the second region.

18. The system of any of claims 14, wherein the sensor is arranged at a location corresponding to a reference point, and the controller is configured to determine the parameter upon the piston reaching the reference point.

19. The system of claim 14, wherein the sensor is configured such that the change of output occurs at a midpoint of the cylinder.

20. The system of claim 14, wherein the engine is configured such that injected fuel ignites in the cylinder by spontaneous combustion.

21. A system for determining a state of an engine, the system comprising:
a first sensor configured to determine a parameter related to the state of the engine with a first granularity;
an electronic control unit configured to determine the state of the engine,
wherein the electronic control unit is configured to:
determine that a piston of the engine is in a first region of the engine when output of the first sensor is a first value, and to determine that the piston is in a second region of the engine when output of the first sensor is a second value, and
determine a moving direction of the piston based on a change between the first value and the second value.

22. The system of claim 21, further comprising
a second sensor configured to determine a parameter related to the state of the engine with a second granularity, wherein the second granularity is finer than the first granularity,
wherein the moving direction is determined solely based on output of the first sensor.

23. The system of claim 21, wherein
the engine includes a linear reciprocating engine,
the first sensor is provided on a base configured to be connected to the linear reciprocating engine, the first sensor configured to generate a signal in response to a component coupled to the piston being in a region of the first sensor, the signal including a first signal corresponding to the piston being in a first half of a cylinder or a second signal corresponding to the piston being in a second half of the cylinder, and
the electronic control unit is configured to determine to inject fuel into the first half of the cylinder or the second half of the cylinder based on a change in output of the first sensor.

24. The system of claim 17, wherein
the rack includes a notch on a first side and a toothed section on a second side.

* * * * *